United States Patent
Morimoto

(10) Patent No.: US 7,360,456 B2
(45) Date of Patent: Apr. 22, 2008

(54) SIX-AXIS SENSOR

(75) Inventor: Hideo Morimoto, Nara (JP)

(73) Assignee: Nitta Corporation, Osaka-shi, Osaka (JP)

( * ) Notice: Subject to any disclaimer, the term of this patent is extended or adjusted under 35 U.S.C. 154(b) by 129 days.

(21) Appl. No.: 10/560,995

(22) PCT Filed: Jun. 16, 2004

(86) PCT No.: PCT/JP2004/008438

§ 371 (c)(1),
(2), (4) Date: Dec. 16, 2005

(87) PCT Pub. No.: WO2004/111592

PCT Pub. Date: Dec. 23, 2004

(65) Prior Publication Data

US 2006/0174718 A1  Aug. 10, 2006

(30) Foreign Application Priority Data

Jun. 17, 2003 (JP) ............................. 2003-172045
Dec. 19, 2003 (JP) ............................. 2003-422687

(51) Int. Cl.
*G01L 1/22* (2006.01)
*G01D 7/00* (2006.01)
(52) U.S. Cl. .............................. 73/862.044; 73/862.041
(58) Field of Classification Search ............ 73/862.044
See application file for complete search history.

(56) References Cited

U.S. PATENT DOCUMENTS

| | | | | | |
|---|---|---|---|---|---|
| 4,094,192 A | * | 6/1978 | Watson et al. | ......... | 73/862.044 |
| 4,745,812 A | * | 5/1988 | Amazeen et al. | ...... | 73/862.041 |
| 5,035,148 A | * | 7/1991 | Okada | ................... | 73/862.044 |
| 5,295,386 A | * | 3/1994 | Okada | ......................... | 73/1.07 |
| 5,823,278 A | * | 10/1998 | Geringer | ..................... | 177/144 |
| 6,159,761 A | * | 12/2000 | Okada | ......................... | 438/53 |
| 7,121,147 B2 | * | 10/2006 | Okada | ......................... | 73/760 |
| 7,219,561 B2 | * | 5/2007 | Okada | .................. | 73/862.043 |

FOREIGN PATENT DOCUMENTS

| | | |
|---|---|---|
| CA | 938810 | 12/1973 |
| DE | 2119193 | 11/1971 |
| FI | 45099 | 11/1971 |
| FR | 2089990 | 1/1972 |
| GB | 1284055 | 8/1972 |

(Continued)

OTHER PUBLICATIONS

International Search Report for PCT/JP2004/008438 dated Sep. 21, 2004 (2 pages).

*Primary Examiner*—Edward Lefkowitz
*Assistant Examiner*—Jonathan Dunlap
(74) *Attorney, Agent, or Firm*—Osha Liang LLP

(57) ABSTRACT

A sensor strain causer can be made into a simple shape, and the attachment work for strain gauges is made easy. In a multiaxial sensor 1 for measuring one or more of multiaxial force, moment, acceleration, and angular acceleration, externally applied, a plurality of strain gauges R11 to R48 disposed on one plane are provided. Thereby, because the time for the attachment work for the strain gauges R11 to R48 can be shortened, the mass productivity can be improved and the cost can be reduced.

15 Claims, 47 Drawing Sheets

FOREIGN PATENT DOCUMENTS

| | | |
|---|---|---|
| JP | 54-9074 | 4/1979 |
| JP | 63-78032 | 4/1988 |
| JP | 07130263 A * | 5/1995 |
| JP | 7-174786 | 7/1995 |
| JP | 2581820 | 2/1997 |
| JP | 10132668 A * | 5/1998 |
| JP | 2838361 | 10/1998 |
| SE | 376799 | 6/1975 |

* cited by examiner $V_1 = e1 - e2$ $V_2 = e3 - e4$ $V_3 = e5 - e6$ $V_4 = e7 - e8$ $V_5 = e9 - e10$ $V_6 = e11 - e12$ ax ay az αx αx αz

SIX-AXIS SENSOR

TECHNICAL FIELD

The present invention relates to a multiaxial sensor capable of measuring at least one of multiaxial force, moment, acceleration, and angular velocity, externally applied to a first member and a second member.

BACKGROUND ART

As shown in FIG. 49, Patent Document 1 discloses a force-moment sensor 103 comprising a first member 100 and a second member 101 provided as a pair of opposed circular plates; annular bridge elements 102 connecting the first and second members 100 and 101 to each other; and a strain gauge attached to each bridge element 102.

In the sensor 103, each bridge element 102 is disposed perpendicularly to the first and second members 100 and 101. A strain gauge is attached with an adhesive to the outer circumferential surface of each bridge element 102 or the inner surface of a hole 104. A force or moment applied between the first and second members 100 and 101 is calculated by detecting the direction and magnitude of the strain of the annular shape of each bridge element 102 caused by the force or moment.

Patent Document: JP-A-63-78032 (FIG. 1; page 5, lower right column, line 12 to page 6, upper left column, line 14; and page 7, upper left column, line 20 to upper right column, line 12)

DISCLOSURE OF THE INVENTION

Problem that the Invention is to Solve

In the technique disclosed in Patent Document 1, each bridge element 102 as a sensor strain causer to which a strain gauge is attached, has a complicated three-dimensional shape. This causes an increase in cost for assembling and processing the first and second members 100 and 101 and the bridge elements 102. In addition, because each strain gauge must be three-dimensionally attached to a curved surface or the like of a bridge element 102, this brings about an increase in time for the attachment work, deterioration of mass productivity, and an increase in cost.

An object of the present invention is to provide a multiaxial sensor in which a sensor strain causer can be made into a simple shape and the attachment work for a strain gauge can be made easy.

Means for Solving the Problem and the Effect of the Invention

A multiaxial sensor of the present invention is for measuring one or more of multiaxial force, moment, acceleration, and angular acceleration, externally applied, and comprises a plurality of strain gauges disposed on one plane.

According to this feature, because the strain gauges are disposed on one plane, the time for the attachment work can be shortened in comparison with a conventional case wherein the strain gauges are three-dimensionally attached to a curved surface or the like of a bridge element. Therefore, the mass productivity can be improved and the cost can be reduced.

The multiaxial sensor of the present invention may further comprise a first diaphragm to which the plurality of strain gauges are attached. According to this feature, because the sensor strain causer to which the strain gauges are attached is simple in shape, the cost for assembling the multiaxial sensor can be reduced.

In the multiaxial sensor of the present invention, first diaphragms may be arranged around a central point of the plane at regular angular intervals and at the same distance from the central point. According to this feature, a multiaxial force, moment, acceleration, or angular acceleration, can be calculated by a relatively easy calculation from changes in the resistance values of the strain gauges of each first diaphragm.

In the multiaxial sensor of the present invention, the angular interval may be 90 degrees. According to this feature, forces, moments, accelerations, or angular accelerations, on the X and Y axes of Cartesian coordinates with its origin being set at the central point of the plane, can be easily calculated.

In the multiaxial sensor of the present invention, the diaphragms may be disposed in positive and negative directions on X and Y axes with an origin being defined at the central point. According to this feature, forces, moments, accelerations, or angular accelerations, on the X and Y axes, can be very easily calculated.

In the multiaxial sensor of the present invention, the angular interval may be 120 degrees. According to this feature, because multiaxial forces, moments, accelerations, or angular accelerations, can be calculated on three first diaphragms, the construction of the multiaxial sensor can be further simplified.

In the multiaxial sensor of the present invention, a thin portion of each first diaphragm may be annular and provided with eight strain gauges, and the strain gauges may be disposed at outer and inner edge portions of the first diaphragm on a line extending between a central point of the first diaphragm and the central point of the plane, and at outer and inner edge portions of the first diaphragm on a line perpendicular to the former line at the central point of the first diaphragm. According to this feature, because the strain gauges can be attached to portions of the first diaphragm where the largest strains are generated, the sensitivity can be improved.

The multiaxial sensor of the present invention may further comprise an operative body provided on a central portion of the first diaphragm, for measuring multiaxial accelerations and angular accelerations applied to the multiaxial sensor. According to this feature, when an acceleration is applied to the multiaxial sensor, an inertial force acts on the operative body. Thus, the operative body is displaced and a strain is generated in the first diaphragm. By detecting the strain of the first diaphragm, multiaxial accelerations and angular accelerations can be measured.

The multiaxial sensor of the present invention may further comprise a first member comprising the first diaphragm; a second member comprising a second diaphragm opposed to the first diaphragm and provided with no strain gauges; and a connecting shaft connecting the opposed first and second diaphragms, for measuring multiaxial forces and moments applied between the first and second members. According to this feature, multiaxial forces and moments can be measured with the strain gauges attached on only one plane.

The multiaxial sensor of the present invention may further comprise a first member comprising the first diaphragm; a second member comprising a second diaphragm opposed to the first diaphragm and provided with a plurality of strain gauges disposed on one plane, and a connecting shaft connecting the opposed first and second diaphragms, for measuring multiaxial forces and moments applied between the first and second members. According to this feature, because there are independent two groups of electric signals indicating components of the same force or moment, the sensor outputs can be doubled to intend to make the accuracy higher.

In the multiaxial sensor of the present invention, the strain gauges of the first member and the strain gauges of the second member may be disposed symmetrically with respect to a barycentric point of the multiaxial sensor. According to this feature, because two groups of electric signals can be equally treated, the accuracy is further improved.

In the multiaxial sensor of the present invention, either outputs of the strain gauges of the first member and the strain gauges of the second member may be adopted if the other outputs are out of a predetermined range. According to this feature, even if either strain gauges become abnormal by some cause, the multiaxial sensor can continue to be used by using the other strain gauges. Thus, a very highly reliable control system can be constructed.

In the multiaxial sensor of the present invention, only one diaphragm may be disposed on the plane. According to this feature, because a plurality of first diaphragms need not be provided on one plane, the multiaxial sensor can be reduced in size. In addition, because the shape of the multiaxial sensor is simplified, the cost required for cutting can be reduced.

The multiaxial sensor of the present invention may further comprise operative bodies being in contact with the first diaphragms at positions arranged around the central point of the plane at regular angular intervals and at the same distance from the central point, for measuring multiaxial accelerations and angular accelerations applied to the multiaxial sensor. According to this feature, when an acceleration is applied to the multiaxial sensor, an inertial force acts on each operative body. Thus, the operative body is displaced and a strain is generated in the first diaphragm. By detecting the strain of the first diaphragm, multiaxial accelerations and angular accelerations can be measured.

The multiaxial sensor of the present invention may further comprise a first member comprising the first diaphragm; a second member comprising only one second diaphragm provided with no strain gauges; and operative bodies connecting the first and second diaphragms; the first and second members may be disposed so that a central point of the first diaphragm of the first member is opposed to a central point of the second diaphragm of the second member; and the operative bodies may connect the first and second diaphragms at positions arranged around the central points of the first and second diaphragms at regular angular intervals and at the same distance from the central points, for measuring multiaxial forces and moments applied between the first and second members. According to this feature, multiaxial forces and moments can be measured with the strain gauges attached on only one plane.

The multiaxial sensor of the present invention may further comprise a first member comprising the first diaphragm; a second member comprising a second diaphragm provided with a plurality of strain gauges disposed on one plane; and operative bodies connecting the first and second diaphragms; the first and second members may be disposed so that a central point of the first diaphragm of the first member is opposed to a central point of the second diaphragm of the second member; and the operative bodies may connect the first and second diaphragms at positions arranged around the central points of the first and second diaphragms at regular angular intervals and at the same distance from the central points, for measuring multiaxial forces and moments applied between the first and second members. According to this feature, because there are independent two groups of electric signals indicating components of the same force or moment, the sensor outputs can be doubled to intend to make the accuracy higher.

In the multiaxial sensor of the present invention, the strain gauges of the first member and the strain gauges of the second member may be disposed symmetrically with respect to a barycentric point of the multiaxial sensor. According to this feature, because two groups of electric signals can be equally treated, the accuracy is further improved.

In the multiaxial sensor of the present invention, either outputs of the strain gauges of the first member and the strain gauges of the second member are adopted if the other outputs are out of a predetermined range. According to this feature, even if either strain gauges become abnormal by some cause, the multiaxial sensor can continue to be used by using the other strain gauges. Thus, a very highly reliable control system can be constructed.

In the multiaxial sensor of the present invention, the angular interval may be 90 degrees. According to this feature, forces, moments, accelerations, or angular accelerations, on the X and Y axes of Cartesian coordinates with its origin being set at the central point of the first diaphragm, can be easily calculated.

In the multiaxial sensor of the present invention, the operative bodies may be disposed in positive and negative directions on X and Y axes with an origin being defined at the central point of the first diaphragm. According to this feature, forces, moments, accelerations, or angular accelerations, on the X and Y axes of Cartesian coordinates with its origin being set at the central point of the first diaphragm, can be easily calculated.

In the multiaxial sensor of the present invention, the angular interval may be 120 degrees. According to this feature, because multiaxial forces, moments, accelerations, or angular accelerations, can be calculated on three operative bodies formed on the first diaphragm, the construction of the multiaxial sensor can be further simplified.

In the multiaxial sensor of the present invention, the strain gauges may be disposed at edge portions of the operative bodies on a line extending between a central point of a portion on the plane corresponding to the operative bodies, and the central point of the first diaphragm; at edge portions of the operative bodies on a line perpendicular to the former line at the central point of the portion on the plane corresponding to the operative bodies; and at either of edge portions of the operative bodies and edge portions of the first diaphragm, at positions arranged around the central point of the first diaphragm at regular angular intervals and at the same distance from the central point. According to this feature, because the strain gauges can be attached to portions of the first diaphragm where the largest strains are generated, the sensitivity can be improved. In addition, multiaxial forces, moments, accelerations, or angular accelerations, can be calculated with less strain gauges in comparison with a case wherein a plurality of first diaphragms are provided on one plane. Thus, the cost for the strain gauges and the cost for wiring can be reduced.

In the multiaxial sensor of the present invention, each of the strain gauges may be made of a piezoresistance element. According to this feature, because the piezoresistance element is ten times or more higher in gauge factor than a foil strain gauge, the sensitivity can be improved ten times or more in comparison with a case wherein the foil strain gauge is used.

In the multiaxial sensor of the present invention, each of the strain gauges may be made of a thin film of chromium oxide formed on an insulating film. According to this feature, because the gauge is ten times or more higher in gauge factor than a general foil strain gauge, the sensitivity can be improved ten times or more in comparison with a case wherein such a general foil strain gauge is used.

BEST FORM FOR CARRYING OUT THE INVENTION

Hereinafter, preferred embodiments of the present invention will be described with reference to drawings. FIG. 1A is a plan view showing the arrangement of strain gauges when a multiaxial sensor 1 according to a first embodiment of the present invention is Z-axially transparently viewed from the position of a second member 3. FIG. 1B is a central vertical sectional front view of the multiaxial sensor 1. The multiaxial sensor 1 is for measuring one of multiaxial force, moment, acceleration, and angular acceleration, externally applied to a first member 2 and a second member 3. The multiaxial sensor 1 has therein a plurality of strain gauges R11 to R48 disposed on one plane. Each of the first and second members 2 and 3 is made into a disk-shaped flange. The strain gauges R11 to R48 are attached only to the front surface 2a of the first member 2.

In this embodiment, an X-Y-Z three-dimensional coordinate system is defined as a matter of explanatory convenience, and the disposition of each component will be described with reference to the coordinate system. In FIG. 1B, the origin O is defined at the center of the front surface 2a of the first member 2; the X axis is defined to extend horizontally rightward; the Y axis is defined to extend frontward perpendicularly to FIG. 1B; and the Z axis is defined to extend vertically downward. Thus, the front surface 2a of the first member 2 is on the X-Y plane, and the Z axis extends through the center of the first member 2.

Each of the first and second members 2 and 3 has four diaphragms 4, 5, 6, and 7. The corresponding diaphragms of the first and second members 2 and 3 are opposed to each other. Each of the diaphragms 4 to 7 is made into a thin portion. A central shaft 8 is formed at the center of each of the diaphragms 4 to 7. The central shafts 8 of the diaphragms opposed to each other are connected by a bolt 9. Thereby, the first and second members 2 and 3 are united. In each of the diaphragms 4 to 7, the thin portion is annular because of the presence of the central shaft 8.

The diaphragms 4 to 7 of the first member 2 are arranged around the origin O at regular angular intervals and at the same distance from the origin O. In this embodiment, they are arranged at angular intervals of 90 degrees. The diaphragms 4 to 7 of the first member 2 are disposed at positive and negative positions on the X and Y axes. The diaphragms 4 to 7 of the second member 3 are disposed so as to be opposed to the respective diaphragms 4 to 7 of the first member 2. Thus, the multiaxial sensor 1 functions as a 6-axis force sensor for measuring forces of perpendicular three axes in three-dimensional space, and moments around the respective axes. FIG. 2 shows the directions of the X, Y, and Z axes, and the directions of moments Mx, My, and Mz around the respective axes.

Each of the diaphragms 4 to 7 of the first member 2 has thereon eight strain gauges. As shown in FIG. 1A, the strain gauges R11 to R48 are disposed at outer and inner edges of the thin portions of the diaphragms 4 to 7 along the X and Y axes. Thus, the strain gauges R11 to R48 are attached at where the largest strains are generated in the multiaxial sensor 1. Leads for the strain gauges are omitted in FIG. 1A.

As each of the strain gauges R11 to R48, a metallic foil strain gauge or a metallic wire strain gauge is used. Each of the strain gauges R11 to R48 is a kind of resistor, and a detector used by being attached at where strain is generated. Because the resistance value changes by generation of strain, the strain epsilon can be measured. In general, such a strain gauge has a proportional characteristic in which the resistance value increases to strain epsilon by tension while the resistance value decreases to strain epsilon by compression. In general, such a strain gauge is used within the elastic region of the material in which the stress sigma is proportional to the strain epsilon. Also in this embodiment, the strain gauges are used within the elastic region of the first member 2.

The diaphragms 4 to 7 are the same in size and thickness. Thus, they are the same in rigidity. Therefore, for example, when the first and second members 2 and 3 are deformed to form four sides of a parallelogram as a whole as shown in FIG. 3, strains corresponding to the directions and magnitudes of forces are generated on the strain gauges R11 to R48 of the diaphragms 4 to 7, and the forces and moments can be detected with high accuracy. To simplify the attachment work for the strain gauges or intend to protect the strain gauges, a step may be formed at each attachment position. A tap hole or holes for attachment to another member may be formed at portions other than the diaphragms 4 to 7. Although the first and second members 2 and 3 are united by the central shafts 8 being connected with the bolt 9, they may be formed directly from one body by cutting, or the central shafts 8 may be connected by welding.

Next, a principle for detecting a force or moment for each axis will be described. In the below description, it is assumed that the first member 2 is fixed and the force or moment is applied to the second member 3.

FIG. 3 shows a state when an X-axial force Fx is applied. In this state, all the diaphragms 4 to 7 of the first and second members 2 and 3 have been displaced as shown in FIG. 3, and strains are detected. FIG. 4 shows changes in the strain gauges R11 to R48. In FIG. 4, (+) indicates an increase in resistance value, and (−) indicates a decrease in resistance value. In the strain gauges denoted by neither of the symbols, their resistance values hardly changed.

Next, the description of a case wherein a Y-axial force Fy is applied is omitted here because it can be understood by sifting by 90 degrees the state when the X-axial force Fx is applied.

FIG. 5 shows a state of the multiaxial sensor 1 when a Z-axial force Fz is applied. FIG. 6 shows changes in the strain gauges in the state of FIG. 5.

FIG. 7 shows a state of the multiaxial sensor 1 when an X-axial moment Mx is applied. FIG. 8 shows changes in the strain gauges in the state of FIG. 7.

Next, the description of a case wherein a Y-axial moment My is applied is omitted here because it can be understood by sifting by 90 degrees the state when the X-axial moment Mx is applied.

When a Z-axial moment Mz is applied, the second member 3 is rotated around the Z axis. FIG. 9 shows changes in the strain gauges in this state.

Table 1 shows changes in the strain gauges R11 to R48 to the above-described forces and moments. In Table 1, + indicates an increase in resistance value; − indicates a decrease in resistance value; and no symbol indicates that the resistance value hardly changed. In the case of a force or moment in the reverse direction, the symbol is reversed.

TABLE 1

| Force | R11 | R12 | R13 | R14 | R15 | R16 | R17 | R18 | R21 | R22 | R23 | R24 | R25 | R26 | R27 | R28 |
|---|---|---|---|---|---|---|---|---|---|---|---|---|---|---|---|---|
| Fx | − | + | − | + |   |   |   |   | − | + | − | + |   |   |   |   |
| Fy |   |   |   |   | − | + | − | + |   |   |   |   | − | + | − | + |
| Fz | − | + | + | − | − | + | + | − | − | + | + | − | − | + | + | − |
| Mx |   |   |   |   |   |   |   |   | + | − | − | + | + | − | − | + |
| My | + | − | − | + | + | − | − | + |   |   |   |   |   |   |   |   |
| Mz |   |   |   |   | − | + | − | + | − | + | − | + |   |   |   |   |

| Force | R31 | R32 | R33 | R34 | R35 | R36 | R37 | R38 | R41 | R42 | R43 | R44 | R45 | R46 | R47 | R48 |
|---|---|---|---|---|---|---|---|---|---|---|---|---|---|---|---|---|
| Fx | − | + | − | + |   |   |   |   | − | + | − | + |   |   |   |   |
| Fy |   |   |   |   | − | + | − | + |   |   |   |   | − | + | − | + |
| Fz | − | + | + | − | − | + | + | − | − | + | + | − | − | + | + | − |
| Mx |   |   |   |   |   |   |   |   | − | + | + | − | − | + | + | − |
| My | − | + | + | − | − | + | + | − |   |   |   |   |   |   |   |   |
| Mz |   |   |   |   | + | − | + | − | + | − | + | − |   |   |   |   |

Using the above nature, the forces and moments can be detected by the calculation of Equation 1.

$$Fx = (R22+R42) - (R23+R43)$$

$$Fy = (R16+R36) - (R17+R37)$$

$$Fz = (R13+R26+R32+R47) - (R11+R28+R34+R45)$$

$$Mx = (R25+R46) - (R27+R48)$$

$$My = (R14+R33) - (R12+R31)$$

$$Mz = (R18+R24+R35+R41) - (R15+R21+R38+R44) \quad \text{[Equation 1]}$$

In this calculation, there is no waste because each of the strain gauges R11 to R48 is used one time, and this calculation is convenient for a case wherein the calculation is carried out by an OP amplifier after the resistances are converted into voltages. In addition, as for Fz and Mz, in which the rigidity increases on the structure to decrease the sensitivity, the sensitivity can be improved because eight strain gauges, which is twice the number of strain gauges in the other cases. As a matter of course, the calculation method is not limited to Equation 1.

The calculation of Equation 1 may be carried out by an OP amplifier after the resistance values are converted into voltages by known or novel means, or carried out by a micro controller or a computer using an AD converter.

Otherwise, a force or moment can be detected by bridge circuits constructed as shown in FIG. 10, to which a constant voltage or a constant current is applied. Further, a force or moment can be detected even by half bridges constructed to reduce the number of strain gauges, though not shown. As a matter of course, the combination of strain gauges is not limited to that shown in FIG. 10.

In this embodiment, each of the diaphragms 4 to 7 of the first member 2 is disposed on the X or Y axis. However, the present invention is not limited to that. That is, the arrangement directions on the multiaxial sensor 1 having the same construction may be changed so that each of the diaphragms 4 to 7 of the first member 2 is not disposed on any axis. In this case, the sensor does not function as a 6-axis sensor, and it is a 5-axis sensor. In this embodiment, the multiaxial sensor is used as a 6-axis sensor. However, the present invention is not limited to that. For example, the sensor may be used as 2-axis sensor that detects only X- and Y-axial forces.

Next, a second embodiment of the present invention will be described with reference to FIG. 11. As shown in FIG. 11, in the second embodiment, a piezoresistance element 10 is used as each strain gauge. Piezoresistance elements 10 necessary for one diaphragm are integrated on one semiconductor Si wafer 11 by using a semiconductor manufacturing process, and the wafer is fixed to the diaphragm by die bonding. Such a piezoresistance element 10 is ten times or more higher in gauge factor than a foil strain gauge. Thus, the sensitivity can be improved ten times or more in comparison with a case wherein a foil strain gauge is used.

Next, a third embodiment of the present invention will be described with reference to FIG. 12. In the third embodiment, although the construction of the multiaxial sensor 1 is the same as that of the first embodiment, the construction of each bridge is changed. As shown in FIG. 12, each bridge is constructed by four strain gauges linearly arranged on each of the diaphragms 4 to 7. Thereby, the condition of generation of strain on each of the diaphragms 4 to 7 can be directly output as eight voltages.

In this case, a force or moment can be calculated by Equation 2.

$$Fx = V4 - V2$$

$$Fy = V3 - V1$$

$$Fz = V5 + V6 + V7 + V8$$

$$Mx = V8 - V6$$

$$My = V7 - V5$$

$$Mz = V1 + V2 + V3 + V4 \quad \text{[Equation 2]}$$

The calculation of Equation 2 may be carried out by an OP amplifier after the resistance values are converted into voltages by known or novel means, or carried out by a micro controller or a computer using an AD converter.

Next, a fourth embodiment of the present invention will be described with reference to FIGS. 13 and 14. In the fourth embodiment, the strain gauges R11 to R48 are attached to the first member 2 like the first embodiment, and strain gauges R111 to R148 are attached to the second member 3 at positions symmetrical with respect to the barycentric point O' as shown in FIG. 13. Because of such mechanical symmetry, when a force or moment is applied to the multiaxial sensor 1, a symmetrical strain in accordance with the kind of force is generated in each of the diaphragms 4 to 7. That is, a characteristic feature is utilized that two sets of strain gauges R11 to R48 and R111 to R148 can be disposed at symmetrical positions because strain gauges are disposed on one plane in the multiaxial sensor 1 of the present invention.

The strain gauges R11 to R48 constitute the same circuits as those shown in FIG. 10 to output voltages Vfx1, Vfy1, Vfz1, Vmx1, Vmy1, and Vmz1 corresponding to forces Fx, Fy, and Fz and moments Mx, My, and Mz. The strain gauges R111 to R148 also constitute the same circuits as those shown in FIG. 10 to output voltages Vfx2, Vfy2, Vfz2, Vmx2, Vmy2, and Vmz2 corresponding to forces Fx, Fy, and Fz and moments Mx, My, and Mz. Settings on the circuits have been made so that increases/decreases in the voltages Vfx1, Vfy1, Vfz1, Vmx1, Vmy1, and Vmz1 coincide with increases/decreases in the voltages Vfx2, Vfy2, Vfz2, Vmx2, Vmy2, and Vmz2 when a force or moment is applied.

As described above, in this embodiment, there are independent two groups of electric signals indicating components of the same force or moment, thereby intending to double the sensor outputs.

FIG. 14 shows examples of amplifier circuits 12 for amplifying Vfx1, Vfy1, Vfz1, Vmx1, Vmy1, Vmz1, Vfx2, Vfy2, Vfz2, Vmx2, Vmy2, and Vmz2, which are signals of the bridges to detect each force or moment. In this embodiment, adjustment has been made so that voltage values within the range of 25 to 75% of the power supply voltage can be obtained in the range of the rated load. Further, the amplified outputs are input to AD converter ports 14 of a micro controller 13.

In general, because a change in the output of a bridge circuit constituted by strain gauges is very little as several mV, it must be amplified to several hundred times or more by an amplifier or the like. Even when a high-sensitive piezoresistance element 10 is used, the output sensitivity is about ten times of that of a metallic foil strain gauge. Therefore, if a strain gauge constituting the bridge circuit is broken by some cause, the balance is disrupted and deviation to the vicinity of the lower or upper limit of the power supply voltage may occur.

For this reason, using the feature that the output signals of the sensors have been doubled, the following procedure is carried out as shown in FIG. 14.

Suppose that the lower power supply voltage of the amplifiers is Vee and the higher one is Vcc. Suppose that a lower voltage that is considered not to be output by the multiaxial sensor 1 in the range of normal use, is VL, and a larger one is VH. Vee is lower than VL, and VH is lower than Vcc. VL and VH are A/D-converted values. VL and VH may be determined for each output in accordance with the characteristics of the multiaxial sensor 1.

In the case of the X-axial force Fx, the micro controller judges whether or not VL is not higher than Vfx1 and Vfx1 is not higher than VH; and VL is not higher than Vfx2 and Vfx2 is not higher than VH, in S1 and S2. When both are within the ranges, that is, Yes in S1 and Yes in S2, the signal of Vfx1 is preferentially adopted as a control signal, in S3.

If Vfx1 is out of the range, that is, No in S1, it is judged to be an abnormal output, and Vfx2 is checked, in S4. When Vfx2 is within the range, that is, Yes in S2, Vfx2 is processed as the signal of the force Fx in place of Vfx1. If Vfx2 is also out of the range, that is, No in S2, both outputs are judged to be abnormal, and processing for trouble, such as emergency stop, is performed, in S5.

The same process is carried out for a force or moment other than Fx.

According to this embodiment, by doubling the output signal, even if one output is abnormal due to break of a strain gauge, the multiaxial sensor 1 can continue to be used by using the other output. Thus, a very highly reliable control system can be constructed.

Next, a fifth embodiment of the present invention will be described with reference to FIG. 15. FIG. 15 is a plan view showing the arrangement of strain gauges R11 to R38 when a multiaxial sensor 1 according to the fifth embodiment is Z-axially transparently viewed from the position of a second member 3. In the fifth embodiment, each of first and second members 2 and 3 has three diaphragms 4 to 6. The corresponding diaphragms of the first and second members 2 and 3 are opposed to each other. This multiaxial sensor 1 is a 6-axis force sensor for measuring forces of perpendicular three axes in three-dimensional space, and moments around the respective axes.

The diaphragms 4 to 6 of the first member 2 are arranged around the origin O at regular angular intervals and at the same distance from the origin O. In this embodiment, they are arranged at angular intervals of 120 degrees. The diaphragms 4 to 6 of the second member 3 are disposed so as to be opposed to the respective diaphragms 4 to 6 of the first member 2. Each of the diaphragms 4 to 6 of the first member 2 has thereon eight strain gauges. The strain gauges R11 to R38 are disposed on the front surface of the first member 2 at outer and inner edges of the diaphragms 4 to 6 on straight lines extending from the centers of the diaphragms 4 to 6 to the origin O, and at outer and inner edges of the diaphragms 4 to 6 on straight lines perpendicular to the above straight lines at the centers of the diaphragms 4 to 6.

More specifically, the strain gauges R11 to R14 are disposed on a segment OC extending from the origin O so as to form an angle of 120 degrees from the Y-axial negative direction to the X-axial positive direction. The strain gauges R31 to R34 are disposed on a segment OD extending from the origin O so as to form an angle of 120 degrees from the Y-axial negative direction to the X-axial negative direction. The strain gauges R15 to R18 are disposed perpendicularly to the segment OC. The strain gauges R35 to R38 are disposed perpendicularly to the segment OD. The strain gauges R21 to R28 are the same as those of the first embodiment.

Each strain gauge may be a metallic foil strain gauge like the first embodiment, or a piezoresistance element 10 like the second embodiment. The other construction is the same as that of the first embodiment, and thus the description thereof is omitted.

A principle for detecting a force or moment for each axis according to this embodiment will be described. In the below description, it is assumed that the first member 2 is fixed and the force or moment is applied to the second member 3. A strain gauge group constituted by four strain gauges arranged on a straight line becomes the highest in rate of the change in resistance value and increases in sensitivity to a strain when the tensile or compressive strain is applied along the line of the arrangement. As shown in FIG. 15, six strain gauge groups exist, which differ from one another in direction in which the sensitivity increases. However, when the sensitivity of each strain gauge group is considered by resolving into X-, Y-, and Z-axial vectors, a force or moment having 6-axial components can be detected.

Bridge circuits as shown in FIG. 16 are constructed for the strain gauges R11 to R38 shown in FIG. 15, and a constant voltage or a constant current is applied to them. Thereby, the strain gauges R15 to R18 can detect as a voltage V1 a force component at 60 degrees from the X-axial positive direction to the Y-axial negative direction; the strain gauges R25 to R28 can detect as a voltage V2 a force component at 90 degrees from the X-axial positive direction to the Y-axial negative direction; and the strain gauges R35 to R38 can detect as a voltage V3 a force component at 300 degrees from the X-axial positive direction to the Y-axial negative direction. R11 to R14, R25 to R28, and R31 to R34 can detect as V4, V5, and V6 Z-axial forces at the centers of the diaphragms 4 to 6, respectively.

When node voltages of the bridge circuits in FIG. 16 are e1 to e12, Equation 3 is obtained.

$V1=e1-e2$ $V2=e3-e4$ $V3=e5-e6$ $V4=e7-e8$ $V5=e9-e10$ $V6=e11-e12$ [Equation 3]

Of them, V1, V2, and V3 can be expressed by Equation 4 by resolving into X- and Y-axial vectors.

$V1=(V1X,V1Y)=(V1/2,V1\cdot\sqrt{3}/2)$ $V2=(V2X,V2Y)=(V2,0)$ $V3=(V3X,V3Y)=(V3/2,V3\cdot\sqrt{3}/2)$ [Equation 4]

Therefore, when the X-axial resultant force applied to the second member 3 is Fx and the Y-axial resultant force is Fy, they can be detected as in Equation 5.

$FX=(V1/2)+V2+(V3/2)$ $FY=(V1\cdot\sqrt{3}/2)+(V3\cdot\sqrt{3}/2)$ [Equation 5]

FIG. 17 shows a state of displacement of the diaphragm 5 when a Y-axial negative force Fy is applied. At this time, tensile strains are generated on the strain gauges R25 and R27 to increase their resistances, and compressive strains are generated on the strain gauges R26 and R28 to decrease their resistances. Strains are scarcely generated on the strain gauges R21 to R24 disposed perpendicularly to the force Fy.

Similar Y-axial displacements and strains are generated in the other two diaphragms 4 and 6. However, because the lines of the arrangements of the strain gauges R11 to R18 and R31 to R38 differ from the X and Y axes, the changes in the resistance values of the strain gauges differ from those of the strain gauges R21 to R28. Because the strain gauges are attached such that they have the maximum sensitivity in the line of the arrangement, the sensitivities of the strain gauges R11 to R18 and R31 to R38 are determined by the angles between the Y axis, along which the force Fy is applied, and the respective strain gauge groups.

The same can apply to an X-axial force Fx. Thus, an X- or Y-axial force can be calculated by Equation 5.

Next, FIG. 18 shows a state of displacement of the diaphragm 5 when a Z-axial force Fz is applied. FIG. 19 shows changes in the strain gauges R11 to R38. In the bridge circuits shown in FIG. 16, V1, V2, and V3 do not change because their changes in resistance value cancel each other. V4, V5, and V6 change in accordance with the Z-axial force Fz. Therefore, the force Fz can be obtained by Equation 6.

$Fz=V4+V5+V6$ [Equation 6]

Next, when a moment Mx is applied to the second member 3, a force to rotate around the X axis is applied. As a result, Z-axial forces Fz are applied to the diaphragms 4 to 6. In FIG. 20, suppose that the moment Mx is applied so that the diaphragms 4 and 6 are pushed from the front side toward the back side of FIG. 20, and the diaphragm 5 is pulled from the back side toward the front side of FIG. 20. When the distance from the origin O to the center of each of the diaphragms 4 to 6 is R, the distance from the center of each of the diaphragms 4 and 6 to the X axis is R/2, and the distance from the center of the diaphragm 5 to the X axis is R. Therefore, the moment Mx around the X axis is expressed by Equation 7.

$Mx=(V4\cdot R/2)-(V5\cdot R)+(V6\cdot R/2)$ [Equation 7]

Next, when a moment My is applied to the second member 3, the moment My around the Y axis is expressed by Equation 8 because the distance from the center of each of the diaphragms 4 and 6 to the Y axis is root 3R/2.

$$My = (V4 \cdot \sqrt{3R}/2) + V5 \cdot 0 - (V6 \cdot \sqrt{3R}/2)$$
$$= \sqrt{3R}/2(V4 - V6)$$
[Equation 8]

Next, FIG. 21 shows a state of displacement of diaphragms 4 to 6 when a clockwise moment Mz around the Z axis is applied. FIG. 22 shows changes in the strain gauges R11 to R38. Strains are generated on the strain gauge groups R15 to R18, R21 to R24, and R35 to R38 in directions that bring about the maximum sensitivities, and V1, V2, and V3 of FIG. 16 change with the highest sensitivities.

On the other hand, because the strain gauge groups R11 to R14, R25 to R28, and R31 to R34 are arranged on the lines that bring about the minimum sensitivities of the strain gauges, V4, V5, and V6 of FIG. 16 scarcely change. Therefore, the moment Mz is expressed by Equation 9.

$Mz=V1+V2+V3$ [Equation 9]

By calculating using Equations 5 to 9 as described above, the forces and moments can be obtained. For example, the calculation may be made with a micro controller or a computer after the output voltages V1 to V6 are A/D-converted.

When the output voltages corresponding to forces Fx, Fy, and Fz and moments Mx, My, and Mz to the multiaxial sensor 1 are Vfx, Vfy, Vfz, Vmx, Vmy, and Vmz, and the loads actually applied to the multiaxial sensor 1 are Fx, Fy, Fz, Mx, My, and Mz, they are in the relation of Equation 10.

$$\begin{bmatrix} Vfx \\ Vfy \\ Vfz \\ Vmx \\ Vmy \\ Vmz \end{bmatrix} = [A] \begin{bmatrix} Fx \\ Fy \\ Fz \\ Mx \\ My \\ Mz \end{bmatrix} \quad [A]: \text{Calibration matrix} \quad \text{[Equation 10]}$$

When both sides of the equation are multiplied by $[A]^{-1}$ from the left, Equation 11 is obtained.

$$\begin{bmatrix} Fx \\ Fy \\ Fz \\ Mx \\ My \\ Mz \end{bmatrix} = [A]^{-1} \begin{bmatrix} Vfx \\ Vfy \\ Vfz \\ Vmx \\ Vmy \\ Vmz \end{bmatrix} \quad \text{[Equation 11]}$$

Thereby, accurate 6-axial forces and moments can be obtained from the output voltages.

Next, a sixth embodiment of the present invention will be described with reference to FIGS. 23 and 24. FIG. 23 is a central vertical sectional front view of a multiaxial sensor 1 according to the sixth embodiment. FIG. 24 is a plan view showing the arrangement of strain gauges R11 to R48 when the multiaxial sensor 1 is transparently viewed in the reverse direction to the Z-axial direction. In the sixth embodiment, the multiaxial sensor 1 is made into one disk shape as a whole, and has four diaphragms 4 to 7. This multiaxial sensor 1 is a 6-axis sensor for measuring accelerations along perpendicular three axes in three-dimensional space, and angular accelerations around the respective axes. A portion of the multiaxial sensor 1 other than the diaphragms 4 to 7, for example, the outer peripheral portion, is fixed to an object 15 to be measured.

The diaphragms 4 to 7 are arranged like those of the first embodiment. However, differently from the first embodiment, no diaphragms 4 to 7 are opposed. Operative bodies 16, 17, 18, and 19 to be displaced when receiving accelerations are provided at the centers of the respective diaphragms 4 to 7. One end of each of the operative bodies 16 to 19 is fixed to the corresponding one of the diaphragms 4 to 7, and the other end is free. The operative bodies 16 to 19 have the same shape.

Each of the strain gauges R11 to R48 may be a metallic foil strain gauge like the first embodiment, or a piezoresistance element like the second embodiment. The other construction is the same as that of the first embodiment, and thus the description thereof is omitted.

In this embodiment, the origin O is defined at the center of a segment extending between the gravity point G of the operative body 16 and the gravity point G of the operative body 18; the X axis is defined to extend horizontally rightward; the Y axis is defined to extend frontward perpendicularly to FIG. 23; and the Z axis is defined to extend vertically downward.

A principle for detecting an acceleration or angular acceleration for each axis according to this embodiment will be described.

When receiving an X-axial acceleration, the operative bodies 16 to 19 are displaced as shown in FIG. 25 and strains are generated in the diaphragms 4 to 7. At this time, in the strain gauges R11 to R48, there are changes in the strain gauges that are X-axially disposed, as shown in FIG. 26.

A case wherein a Y-axial acceleration ay is received is different from the case wherein the X-axial acceleration ax is received, only in the feature of being shifted by 90 degrees, and thus the description thereof is omitted.

Next, when a Z-axial acceleration az is received, the operative bodies 16 to 19 are displaced as shown in FIG. 27. Thereby, the strain gauges R11 to R48 changes as shown in FIG. 28.

Next, cases wherein angular accelerations around the respective axes are applied will be described. Suppose that accelerations applied to the operative bodies 16 to 19 perpendicularly to the diaphragms 4 to 7 are az1, az2, az3, and az4. When an angular acceleration alpha y around the Y axis is applied, the accelerations az1 and az3 are applied to the operative bodies 16 and 18, and thereby the operative bodies 16 and 18 are displaced and strains are generated in the diaphragms 4 to 7. FIG. 30 shows changes in the strain gauges R11 to R48 at this time.

Next, when an angular acceleration alpha z around the Z axis is applied, the operative bodies 16 to 19 are displaced in the same rotation direction around the Z axis, and strains are generated in the diaphragms 4 to 7. FIG. 31 shows changes in the strain gauges R11 to R48 at this time.

Table 2 shows changes in the resistance values of the strain gauges R11 to R48 to the above-described accelerations and angular accelerations.

TABLE 2

| Force | R11 | R12 | R13 | R14 | R15 | R16 | R17 | R18 | R21 | R22 | R23 | R24 | R25 | R26 | R27 | R28 |
|---|---|---|---|---|---|---|---|---|---|---|---|---|---|---|---|---|
| ax | − | + | − | + | | | | | − | + | − | + | | | | |
| ay | | | | | − | + | − | + | | | | | − | + | − | + |
| az | + | − | − | + | + | − | − | + | + | − | − | + | + | − | − | + |
| αx | | | | | | | | | − | + | + | − | − | + | + | − |
| αy | − | + | + | − | − | + | + | − | | | | | | | | |
| αz | | | | | − | + | − | + | − | + | − | + | | | | |

| Force | R31 | R32 | R33 | R34 | R35 | R36 | R37 | R38 | R41 | R42 | R43 | R44 | R45 | R46 | R47 | R48 |
|---|---|---|---|---|---|---|---|---|---|---|---|---|---|---|---|---|
| ax | − | + | − | + | | | | | − | + | − | + | | | | |
| ay | | | | | − | + | − | + | | | | | − | + | − | + |
| az | + | − | − | + | + | − | − | + | + | − | − | + | + | − | − | + |
| αx | | | | | + | − | − | + | + | − | − | + | | | | |
| αy | + | − | − | + | + | − | − | + | | | | | | | | |
| αz | | | | | + | − | + | − | + | − | + | − | | | | |

Although this multiaxial sensor 1 is an aggregate of four 3-axis acceleration sensors, an angular acceleration can be detected from an acceleration by using the following principle. First, in circular movement, i.e., rotational movement, on the circumference of a circle having its radius r, the tangential acceleration a is a=r multiplied by alpha, that is, alpha=a/r where alpha is the angular acceleration.

When viewed from the center of the multiaxial sensor 1, the tangential acceleration a is the same as the acceleration applied to each of the operative bodies 16 to 19. Because the radius r is fixed, after all, angular accelerations can be obtained if X-, Y-, and Z-axial accelerations are obtained.

Using that, accelerations and angular accelerations can be detected by the calculation of Equation 12.

$$ax=(R22+R42)-(R23+R43)$$

$$ay=(R16+R36)-(R17+R37)$$

$$az=(R11+R28+R34+R45)-(R13+R26+R32+R47)$$

$$\alpha x=(R25+R46)-(R27+R48)$$

$$\alpha y=(R14+R33)-(R12+R31)$$

$$\alpha z=(R18+R24+R35+R41)-(R15+R21+R38+R44) \quad \text{[Equation 12]}$$

On the other hand, the accelerations and angular accelerations can be detected also by bridge circuits constructed as shown in FIG. 32, to which a constant voltage or a constant current is applied.

In this embodiment, the sensor sensitivity can be controlled by controlling the dimensions, such as the thickness of each of the diaphragms 4 to 7, the thickness and width of each beam, and the size of each of the operative bodies 16 to 19. Although an angular acceleration is obtained in this embodiment, the angular acceleration may be integrated to obtain an angular velocity.

Next, a seventh embodiment of the present invention will be described with reference to FIG. 33. In the seventh embodiment, although the structure of the multiaxial sensor 1 is the same as that of the sixth embodiment, the construction of each bridge is modified. As shown in FIG. 33, each bridge is constituted by four strain gauges linearly disposed on each of the diaphragms 4 to 7.

Vx1 and Vx2 are voltage signals indicating an X-axial acceleration, and Vy1 and Vy2 are voltage signals indicating a Y-axial acceleration. Vz1 to Vz4 are voltage signals indicating a Z-axial acceleration. By carrying out the calculation shown by Equation 13 on the basis of those signals, accelerations and angular accelerations can be sensitively detected.

$$ax = (Vx2) - (Vx1) \quad \text{[Equation 13]}$$
$$ay = (Vy2) - (Vy1)$$
$$az = (Vz1) + (Vz2) + (Vz3) + (Vz4)$$
$$\alpha x = (Vz2) - (Vz4)$$
$$\alpha y = (Vz1) - (Vz3)$$
$$\alpha z = (Vx1) + (Vx2) + (Vy1) + (Vy2)$$

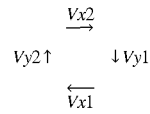

Accelerations ax and ay can be detected by using either Vx1 and Vx2 or Vy1 and Vy2. In any case, the sensitivity can be improved by differential.

Next, an eighth embodiment of the present invention will be described with reference to FIGS. 34 and 35. FIG. 34 is a plan view of a multiaxial sensor 1 of the eighth embodiment. FIG. 35 is a central vertical sectional front view of the multiaxial sensor 1. This multiaxial sensor 1 is a 6-axis sensor for measuring accelerations along perpendicular three axes in three-dimensional space, and angular accelerations around the respective axes, like the sixth embodiment. In this multiaxial sensor 1, piezoresistance elements 10 are formed on a silicon substrate 20 by using a semiconductor process, and bridge circuits for detecting accelerations and angular accelerations are constructed using the piezoresistance elements 10. Further, a glass substrate is bonded to a silicon wafer 11, and a pedestal 21 and operative bodies 16 to 19 are formed by using a micro machining technique. Although the gauge factor varies from plain orientation to plain orientation of the silicon wafer 11 on which the piezoresistance element 10 is formed, unevenness in sensitivity can be suppressed to the minimum by selecting a proper plain orientation.

In this embodiment, the piezoresistance elements 10, each of which is a detector, serve as beams 22 for connecting the operative bodies 16 to 19 and the pedestal 21. In addition, by providing openings 23, the operative bodies 16 to 19 become easy to be displaced when receiving accelerations, and thereby the sensitivity is improved. Each opening 23 may be rectangular or circular, or may not always be provided.

According to this embodiment, a processing circuit for sensor signals, and so on, can be simultaneously formed on the silicon substrate 20 by using a semiconductor process, and thus the signal processing circuit and the sensor can be integrated into a compact form. As a result, wires between the signal processing circuit and the detectors of the sensor can be shortened. This makes the sensor hard to be influenced by noise and enables a stable operation. In addition, because the multiaxial sensor 1 can be reduced in size, it is advantageous also in view of an area for setting. Further, by using such a semiconductor process and a micro machining technique, the sensor can be efficiently manufactured at a low cost, and the accuracy in assembling can be improved.

Next, a ninth embodiment of the present invention will be described with reference to FIGS. 36 and 37. FIG. 36 is a central vertical sectional front view of a multiaxial sensor 1 according to the ninth embodiment of the present invention. FIG. 37 is a plan view showing the arrangement of strain gauges when the multiaxial sensor 1 is Z-axially transparently viewed from the position of the second member 3. The multiaxial sensor 1 of this embodiment is a 6-axis force sensor for measuring forces of perpendicular three axes in three-dimensional space, and moments around the respective axes, like the multiaxial sensor 1 of the first embodiment. The multiaxial sensor 1 of this embodiment differs in construction from the multiaxial sensor 1 of the first embodiment mainly in the point that each of the first and second members 2 and 3 of this embodiment has only one diaphragm 4 while each of the first and second members 2 and 3 of the first embodiment has four diaphragms 4, 5, 6, and 7.

The multiaxial sensor 1 of this embodiment includes a first member 2, a second member 3, and operative bodies 16 to 19. The first and second members 2 and 3 are disposed so that the upper face of the first member 2 is opposed to the lower face of the second member 3. The first and second members 2 and 3 are connected by the operative bodies 16 to 19.

The diaphragms 4 provided in the respective first and second members 2 and 3 are formed into circular shapes having their radii equal to each other. An annular thick portion 24 is formed near the edge of each diaphragm. Four columnar operative bodies 16 to 19 are formed on the upper surface of the diaphragm 4 of the first member 2. The operative body 16 is formed in the X-axial positive direction; the operative body 17 is formed in the Y-axial negative direction; the operative body 18 is formed in the X-axial negative direction; and the operative body 19 is formed in the Y-axial positive direction. They are formed at the same distance from the origin O. The upper ends of the operative bodies 16 to 19 are bonded by welding to the lower surface of the diaphragm 4 of the second member 3 opposed to the first member 2.

The first member 2 and the operative bodies 16 to 19 may be formed by separate members, or the first and second members 2 and 3 and the operative bodies 16 to 19 may be formed from one body by cutting. The second member and the operative bodies 16 to 19 may be connected with bolts.

As shown in FIG. 37, twenty strain gauges R11 to R45 are disposed on the lower surface of the diaphragm 4 of the first member 2. The strain gauges R11 to R14 are disposed on the lower surface of the diaphragm 4 of the second member 2 at positions corresponding to the edge of the operative body 16. The strain gauges R11 and R12 are disposed on the X axis such that the strain gauge R12 is nearer to the origin O than the strain gauge R11. The strain gauges R13 and R14 are disposed on an axis perpendicular to the X axis and the central axis of the operative body 16 such that the strain gauge R13 corresponds to the Y-axial positive direction and the strain gauge R14 corresponds to the Y-axial negative direction. The strain gauge R15 is disposed on the edge of the diaphragm 4 at a position corresponding to the X-axial positive direction.

Likewise, on the lower surface of the diaphragm 4 of the second member 2, the strain gauges R21 to R24 are disposed at positions corresponding to the edge of the operative body 17; the strain gauges R31 to R34 are disposed at positions corresponding to the edge of the operative body 18; and the strain gauges R41 to R44 are disposed at positions corresponding to the edge of the operative body 19. Further, on the edge of the diaphragm 4, the strain gauge R25 is disposed at a position corresponding to the Y-axial negative direction; the strain gauge R35 is disposed at a position corresponding to the X-axial negative direction; and the strain gauge R45 is disposed at a position corresponding to the Y-axial positive direction.

The arrangement positions of the strain gauges R15, R25, R35, and R45 are not limited to the above. They can be disposed at any positions corresponding to the edge of the diaphragm 4 or the edges of the operative bodies 16 to 19 on the lower surface of the diaphragm 4 of the first member 2 as far as they are arranged around the origin O at angular intervals of 90 degrees and at the same distance from the origin O.

Next, a principle for detecting a force or moment for each component will be described. In the below description, it is assumed that the first member 2 is fixed and the force or moment is applied to the second member 3.

FIG. 38 shows a state of the multiaxial sensor 1 when an X-axial force Fx is applied to the second member 3. In this state, the diaphragms 4 of the first and second members 2 and 3 have been displaced as shown in FIG. 38, and strains are detected. FIG. 39 shows changes in the resistance values of the strain gauges R11 to R45 at this time. The description of a case wherein a Y-axial force Fy is applied to the second member 3 is omitted here because it can be understood by sifting by 90 degrees the state when the X-axial force Fx is applied. FIG. 40 shows a state of the multiaxial sensor 1 when a Z-axial force Fz is applied to the second member 3. FIG. 41 shows changes in the resistance values of the strain gauges R11 to R45 when the Z-axial force Fz is applied to the second member 3.

FIG. 42 shows a state of the multiaxial sensor 1 when an X-axial moment Mx is applied to the second member 3. FIG. 43 shows changes in the resistance values of the strain gauges R11 to R45 at this time. The description of a case wherein a Y-axial moment My is applied to the second member 3 is omitted here because it can be understood by sifting by 90 degrees the state when the X-axial moment Mx is applied. When a Z-axial moment Mz is applied to the second member 3, the second member 3 is rotated around the Z axis. FIG. 44 shows changes in the resistance values of the strain gauges R11 to R45 when the Z-axial moment Mz is applied to the second member 3.

Table 3 shows changes in the strain gauges R11 to R45 to the above-described forces and moments.

TABLE 3

| Force | R11 | R12 | R13 | R14 | R15 | R21 | R22 | R23 | R24 | R25 |
|---|---|---|---|---|---|---|---|---|---|---|
| Fx | + | − |   |   | − | + | − |   |   |   |
| Fy |   |   | + | − |   |   |   | + | − | + |
| Fz | + |   |   |   | − |   |   |   | + | − |
| Mx |   |   |   |   |   |   |   | − | − | + |
| My | + | + |   |   | − |   |   |   |   |   |
| Mz |   |   | − | + |   | − | + |   |   |   |

| Force | R31 | R32 | R33 | R34 | R35 | R41 | R42 | R43 | R44 | R45 |
|---|---|---|---|---|---|---|---|---|---|---|
| Fx | + | − |   |   | + | + | − |   |   |   |
| Fy |   |   | + | − |   |   |   | + | − | − |
| Fz | + |   |   |   | − |   |   | + |   | − |
| Mx |   |   |   |   |   |   |   | + | + | − |

TABLE 3-continued

| | | | | | |
|---|---|---|---|---|---|
| My | − | − | | + | |
| Mz | | + | − | + | − |

Using the above nature, the forces and moments can be detected by the calculation of Equation 14. As a matter of course, the calculation method is not limited to Equation 14.

$Fx = R41 - R22$ $Fy = R13 - R34$ $Fz = R15 + R25 + R35 + R45$ $Mx = (R43 + R44) - (R23 + R24)$ $My = (R11 + R12) - (R31 + R32)$ $Mz = (R14 + R33) - (R21 + R42)$ [Equation 14]

The above calculation can be efficiently carried out if bridge circuits are constructed as shown in FIG. 45 and a constant voltage or a constant current is applied to them to detect forces and moments. FIG. 45 shows a case wherein a constant voltage is applied. In this embodiment, as shown in FIG. 45, the circuits for detecting Fx and Fy are half bridges that can not compensate errors of output values due to a change in temperature. Therefore, a dummy circuit as shown in FIG. 46 is further provided, and the difference from the output voltage V1 of the dummy circuit is calculated. Thereby, drifts or common mode noises due to a change in the surrounding temperature cancel each other, and thus an output can be stably obtained. Strain gauges Rd1 and Rd2 in FIG. 46 are disposed at positions where strains are scarcely generated when a load is applied to the multiaxial sensor 1, such as a fixed portion 8.

Either of resistances Ra and Rb included in the bridge circuit for detecting Fz is a dummy fixed resistance on circuit. The values of the resistances Ra and Rb are preferably Ra=(R15+R25) and Rb=(R35+R45).

As described above, in the multiaxial sensor 1 of this embodiment, one diaphragm 4 is provided for each of the first and second members 2 and 3. Therefore, in comparison with a case wherein a plurality of diaphragms are provided for each of the first and second members 2 and 3, the multiaxial sensor 1 can be reduced in size. In addition, because the shape of the multiaxial sensor is simple, the cost required for cutting can be reduced.

Further, in the multiaxial sensor 1 of this embodiment, in comparison with a case wherein a plurality of diaphragms are provided for each of the first and second members 2 and 3, multiaxial forces and moments can be measured with less strain gauges. Therefore, the cost for the strain gauges and the cost for wiring can be reduced.

Next, a tenth embodiment of the present invention will be described with reference to FIG. 47. FIG. 47 is a plan view showing the arrangement of strain gauges R11 to R35 when a multiaxial sensor 1 according to the tenth embodiment is Z-axially transparently viewed from the position of the second member 3. The multiaxial sensor 1 of this embodiment is a 6-axis force sensor for measuring forces of perpendicular three axes in three-dimensional space, and moments around the respective axes, like the multiaxial sensor 1 of the first embodiment. The multiaxial sensor 1 of this embodiment differs in construction from the multiaxial sensor 1 of the first embodiment mainly in the point that each of the first and second members 2 and 3 of this embodiment has only one diaphragm 4 while each of the first and second members 2 and 3 of the first embodiment has four diaphragms 4, 5, 6, and 7.

The multiaxial sensor 1 of this embodiment includes a first member 2, a second member 3, and operative bodies 16 to 18. The first and second members 2 and 3 are disposed so that the upper face of the first member 2 is opposed to the lower face of the second member 3. The first and second members 2 and 3 are connected by the operative bodies 16 to 18.

The diaphragms 4 provided in the respective first and second members 2 and 3 are formed into circular shapes having their radii equal to each other. An annular thick portion 24 is formed near the edge of each diaphragm. Three columnar operative bodies 16 to 18 are formed on the upper surface of the diaphragm 4 of the first member 2. The operative body 16 is formed on a segment CO extending from the origin O so as to form an angle of 120 degrees from the Y-axial negative direction to the X-axial positive direction; the operative body 17 is formed on the Y axis in the negative direction; and the operative body 18 is formed on a segment DO extending from the origin O so as to form an angle of 120 degrees from the Y-axial negative direction to the X-axial negative direction. They are formed at the same distance from the origin O. The upper ends of the operative bodies 16 to 18 are bonded by welding to the lower surface of the diaphragm 4 of the second member 3 opposed to the first member 2.

As shown in FIG. 47, fifteen strain gauges R11 to R35 are disposed on the lower surface of the diaphragm 4 of the first member 2. On the lower surface of the diaphragm 4 of the second member 2, the strain gauges R11 to R14 are disposed at positions corresponding to the edge of the operative body 16; the strain gauges R21 to R24 are disposed at positions corresponding to the edge of the operative body 17; the strain gauges R31 to R34 are disposed at positions corresponding to the edge of the operative body 18; and the strain gauges R15, R25, and R35 are disposed on the edge of the diaphragm 4.

A principle for detecting a force or moment for each axis will be described. A strain gauge group constituted by a plurality of strain gauges arranged on a straight line becomes the highest in rate of the change in resistance value and increases in sensitivity to a strain when the tensile or compressive strain is applied along the line of the arrangement. Six strain gauge groups of this embodiment, constituted by the strain gauges R11 and R12, the strain gauges R13 and R14, the strain gauges R21 and R22, the strain gauges R23 and R24, the strain gauges R31 and R32, and the strain gauges R33 and R34, differ from one another in direction in which the sensitivity increases. However, when the sensitivity of each strain gauge group is considered by resolving into X-, Y-, and Z-axial vectors, a force or moment having 6-axial components can be detected.

Bridge circuits as shown in FIG. 48 are constructed for the strain gauges R11 to R33 shown in FIG. 47, and a constant voltage or a constant current is applied to them. In this embodiment, any of resistances Ra to Ro included in the bridge circuits of FIG. 48 is a dummy fixed resistance on circuit. The values of the resistances Ra to Ro are preferably substantially equal to the respective strain gauges R11 to R33.

By the full bridge circuits of FIG. 48, the strain gauges R11 and R12 can detect as a voltage Va a force component at 30 degrees from the X-axial positive direction to the Y-axial positive direction; the strain gauges R13 and R14 can detect as a voltage Vb a force component at 60 degrees from the X-axial positive direction to the Y-axial negative direction; the strain gauges R21 and R22 can detect as a voltage Vc a force component at 180 degrees from the X-axial positive direction to the Y-axial positive direction; the strain gauges R23 and R24 can detect as a voltage Vd a force component at 90 degrees from the X-axial positive direction to the Y-axial negative direction; the strain gauges R31 and R32 can detect as a voltage Ve a force component at 150 degrees from the X-axial positive direction to the Y-axial positive direction; and the strain gauges R33 and R34 can detect as a voltage Vf a force component at 120 degrees from the X-axial positive direction to the Y-axial negative direction. On the other hand, by the half bridge circuits of FIG. 48, the strain gauge R15 can detect as a voltage Vz1 a Z-axial force component at the center of the operative body 16; the strain gauge R25 can detect as a voltage Vz2 a Z-axial force component at the center of the operative body 17; and the strain gauge R35 can detect as a voltage Vz1 a Z-axial force component at the center of the operative body 18.

When the output voltages Va to Vf from the full bridge circuits are resolved into X- and Y-axial vectors, they can be expressed by Equation 15.

$$Va=(Vax,Vax)=(Va/2, Va \cdot \sqrt{3}/2)$$

$$Vb=(Vbx,Vby)=(Vb \cdot \sqrt{3}/2, -Vb/2)$$

$$Vc=(Vcx,Vcy)=(Vc,0)$$

$$Vd=(Vdx,Vdy)=(0,Vd)$$

$$Ve=(Vex,Vey)=(Ve/2,-Ve \cdot \sqrt{3}/2)$$

$$Vf=(Vfx,Vfy)=(Vf \cdot \sqrt{3}/2, Vf/2) \quad \text{[Equation 15]}$$

Therefore, when the X-axial resultant force applied to the second member 3 is Fx and the Y-axial resultant force is Fy, they can be detected as in Equation 16.

$$Fx = Vax + Vbx + Vcx + Vdx + Vex + Vfx \quad \text{[Equation 16]}$$
$$= (Va/2) + (Vb \cdot \sqrt{3}/2) + Vc + (Ve/2) + (Vf \cdot \sqrt{3}/2)$$
$$Fy = Vay + Vby + Vcy + Vdy + Vey + Vfy$$
$$= (Va \cdot \sqrt{3}/2) - (Vb/2) + Vd - (Ve \cdot \sqrt{3}/2) + (Vf/2)$$

On the other hand, the output voltages Vz1, Vz2, and Vz3 of the half bridge circuits change in accordance with the Z-axial force Fz. Therefore, the force fz can be obtained by Equation 17.

$$Fz = Vz1 + Vz2 + Vz3 \quad \text{[Equation 17]}$$

Next, when a moment Mx is applied to the second member 3, a force to rotate around the X axis is applied. In this example, it is supposed that the moment Mx acts so as to push a Y-axial positive portion from the Z-axial negative direction to the Z-axial positive direction, and pull a Y-axial negative portion from the Z-axial positive direction to the Z-axial negative direction. When the distance from the origin O to the center of each of the operative bodies 16 to 18 is R, the distance from the center of each of the operative bodies 16 and 18 to the X axis is R/2, and the distance from the center of the operative body 17 to the X axis is R. Therefore, in consideration of the direction of the force acting on the center of each of the operative bodies 16 to 18, the moment Mx around the X axis is expressed by Equation 18.

$$Mx=(Fz1 \cdot R/2)-(Fz2 \cdot R)+(Fz3 \cdot R/2) \quad \text{[Equation 18]}$$

Next, a case will be described wherein a moment My is applied to the second member 3 so as to push an X-axial positive portion from the Z-axial positive direction to the Z-axial negative direction, and pull an X-axial negative portion from the Z-axial negative direction to the Z-axial positive direction. In this embodiment, the distance from the center of each of the operative bodies 16 and 18 to the Y axis is root 3R/2, and the center of the operative body 17 is on the Y axis. Therefore, in consideration of the direction of the force acting on the center of each of the operative bodies 16 to 18, the moment My around the Y axis is expressed by Equation 19.

$$My = (Fz1 \cdot \sqrt{3R/2}) + Fz2 \cdot 0 - (Fz3 \cdot \sqrt{3R/2}) \quad \text{[Equation 19]}$$
$$= \sqrt{3}/2(Fz1 - Fz3)$$

Next, a case will be described wherein a clockwise moment Mz around the Z axis is applied to the second member 3. In this case, strains are generated on three strain gauge groups constituted by the strain gauges R13 and R14; R21 and R22; and R33 and R34, in directions that bring about the maximum sensitivities. Thus, the output voltages Vb, Vc, and Vf of the circuits of FIG. 48 change with the highest sensitivities. On the other hand, three strain gauge groups constituted by the strain gauges R11 and R12; R23 and R24; and R31 and R32 are arranged on the lines that bring about the minimum sensitivities of the strain gauges. Thus, the output voltages Va, Vd, and Ve of the circuits of FIG. 48 scarcely change. Therefore, in consideration of the direction of the force acting on the center of each of the operative bodies 16 to 18, the moment Mz is expressed by Equation 20.

$$Mz=-Vb+Vc-Vf \quad \text{[Equation 20]}$$

By calculating using Equations 15 to 20 as described above, the forces and moments can be obtained. For example, the calculation may be made with a micro controller or a computer after the output voltages Va to Vf and Vz1 to Vz3 are A/D-converted.

As described above, in the multiaxial sensor 1 of this embodiment, a similar effect to that of the ninth embodiment can be obtained. In addition, because multiaxial forces and moments can be calculated by forming three operative bodies on the diaphragm, the construction of the multiaxial sensor 1 can be further simplified.

Although the preferred embodiments of the present invention have been described as above, the present invention is never limited to the above-described embodiments, and various changes in design can be made within the description of the claims. For example, in the above-described first to tenth embodiments, the strain gauges are individually attached to the first member 2. However, the present invention is not limited to that. Utilizing the feature that all the strain gauges are attached on one plane, strain gauges may be integrated on one base plate for each of the diaphragms 4 to 7 to be attached to the diaphragms 4 to 7. Otherwise, all the strain gauges may be integrated on one base plate to be attached. Conductive wiring for constructing each gauge or circuit may be made of a thin film of chromium oxide formed by sputtering or deposition on a thin insulating film formed on each of the diaphragms 4 to 7 by sputtering or deposition. Because a strain gauge thus constructed is ten times or more higher in gauge factor than a general foil strain gauge, the sensitivity can be improved ten times or more in comparison with a case wherein such a general foil strain gauge is used. In addition, the work process for attaching the strain gauges to the diaphragms 4 to 7 is simplified; the work efficiency is improved; the productivity is remarkably improved; and a reduction of cost can be intended.

In the above-described first to tenth embodiments, the multiaxial sensors for detecting 6-axis forces and moments or accelerations and angular accelerations have been described. However, the present invention is not limited to those. For example, a multiaxial sensor may be used as a 2-axis sensor for detecting only forces along two axes of X and Y axes.

In the above-described first to tenth embodiments, the diaphragms are arranged at regular angular intervals. However, the present invention is not limited to that. Further, the diaphragms may not always be arranged at the same distance from the origin O.

In the above-described ninth and tenth embodiments. the operative bodies are arranged at regular angular intervals. However, the present invention is not limited to that. Further, the operative bodies may not always be arranged at the same distance from the origin O.

INDUSTRIAL APPLICABILITY

The present invention is optimum as a multiaxial sensor capable of measuring the direction and magnitude of at least one of six components of externally applied forces along perpendicular three axes, and externally applied moments around the respective axes. Therefore, for example, in a humanoid robot expected to be put in practice in the field of amusement, if a multiaxial sensor of the present invention is set in a hand or leg of the humanoid robot, forces and moments applied to the hand or leg of the humanoid robot can be detected in high responsibility and high accuracy at a cost lower than a conventional sensor.

DESCRIPTION OF REFERENCE NUMERAL

Figure 1A:
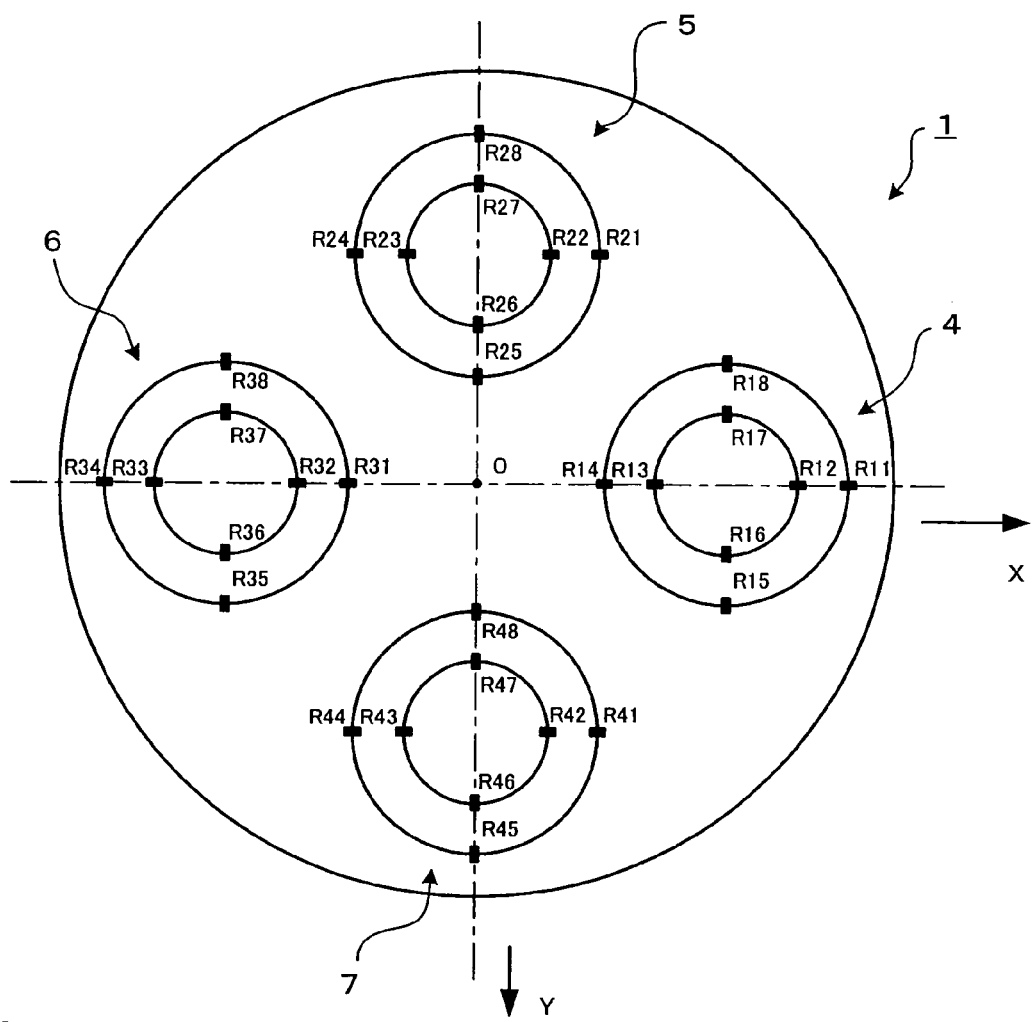
[FIG. 1A]
A view showing a multiaxial sensor according to a first embodiment of the present invention, which is a plan view showing the arrangement of strain gauges when Z-axially transparently viewed from the position of a second member.
Figure 1B:
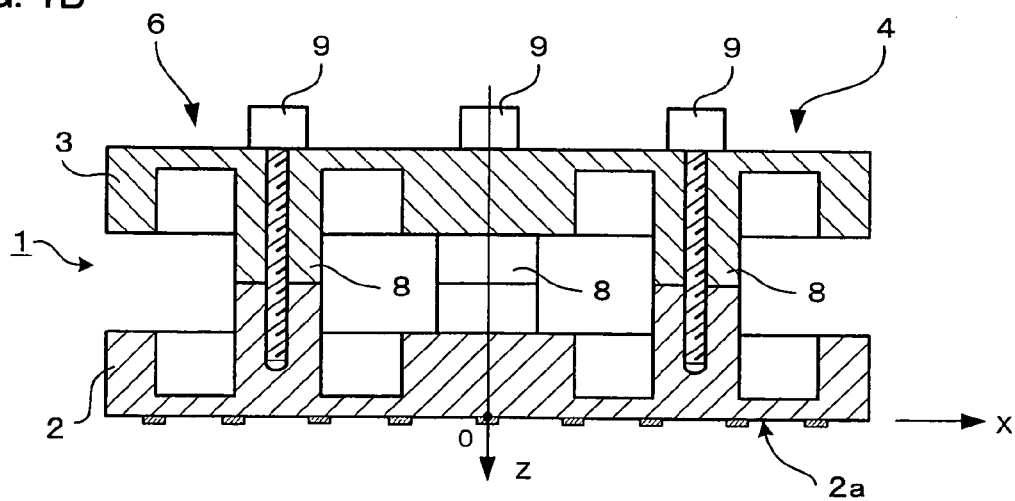
[FIG. 1B]
A view showing the multiaxial sensor according to the first embodiment of the present invention, which is a central vertical sectional front view.
Figure 2:
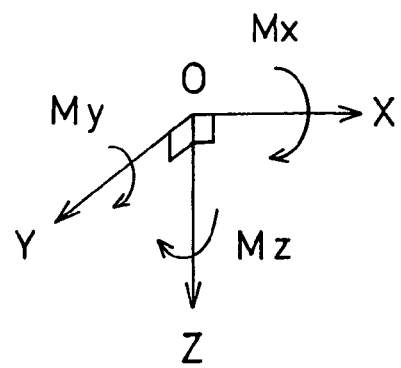
[FIG. 2]
A perspective representation showing Cartesian coordinate axes.
Figure 3:
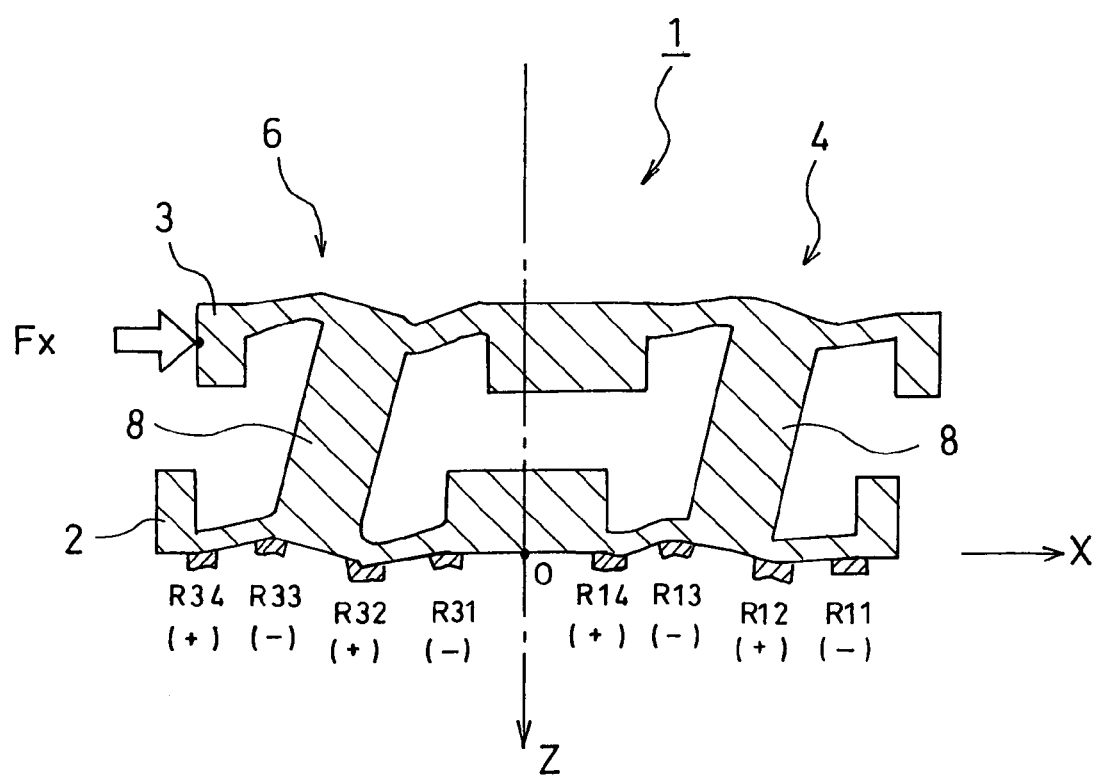
[FIG. 3]
A central vertical sectional front view showing displacement when a force Fx is applied to the multiaxial sensor.
Figure 4:
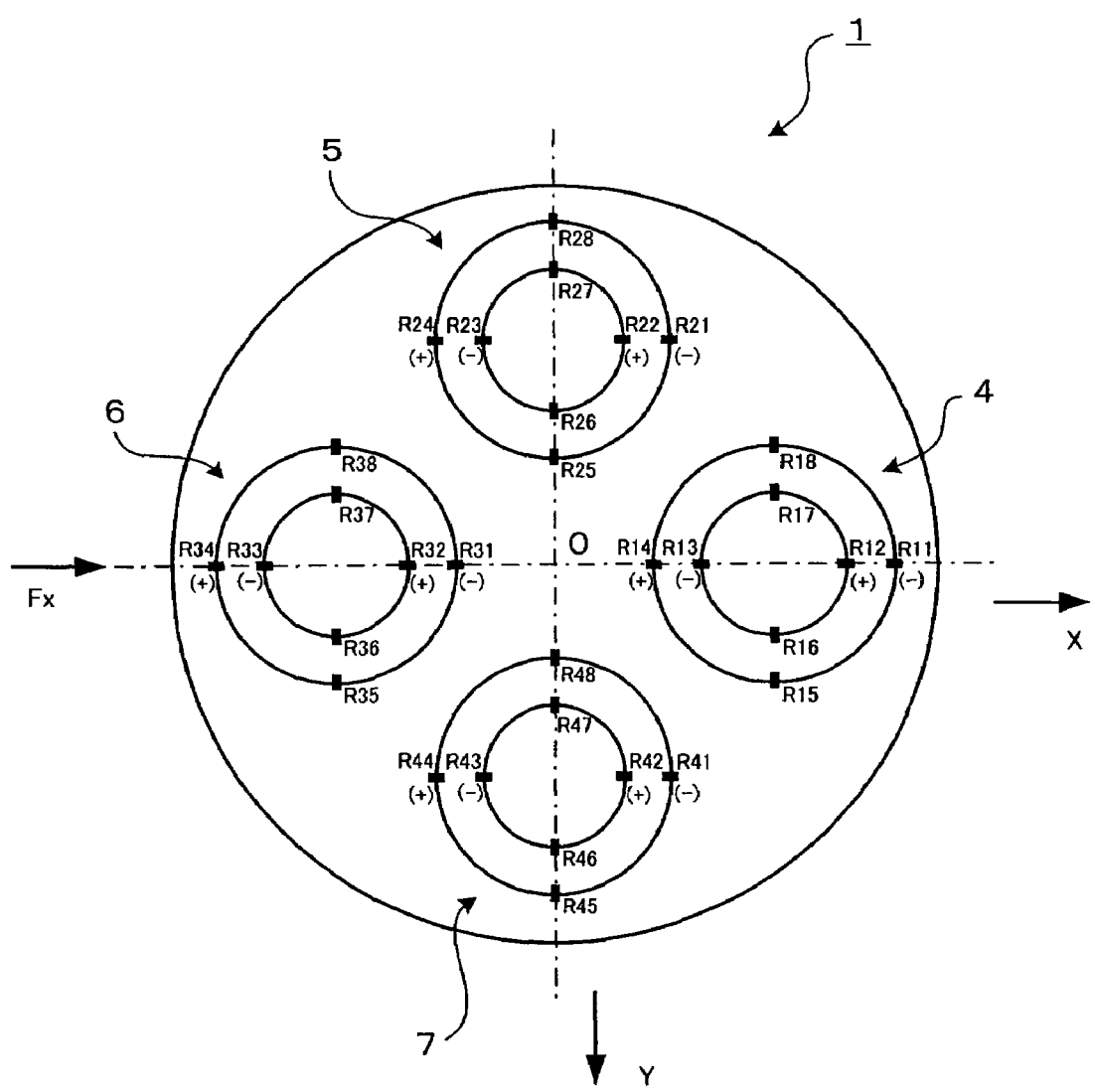
[FIG. 4]
A plan view showing changes in the resistance values of the strain gauges when the force Fx is applied to the multiaxial sensor.
Figure 5:
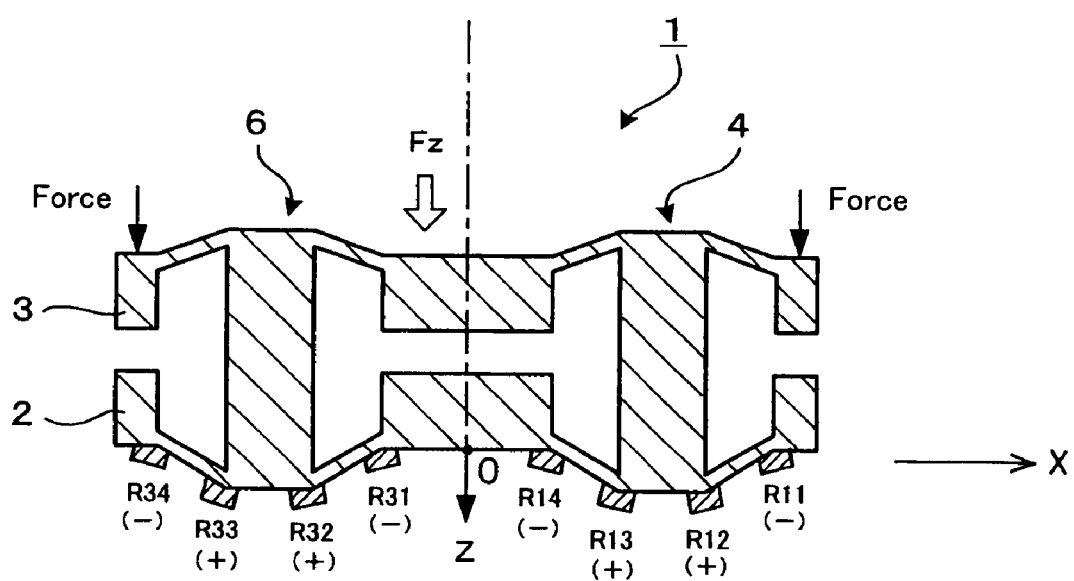
[FIG. 5]
A central vertical sectional front view showing displacement when a force Fz is applied to the multiaxial sensor.
Figure 6:
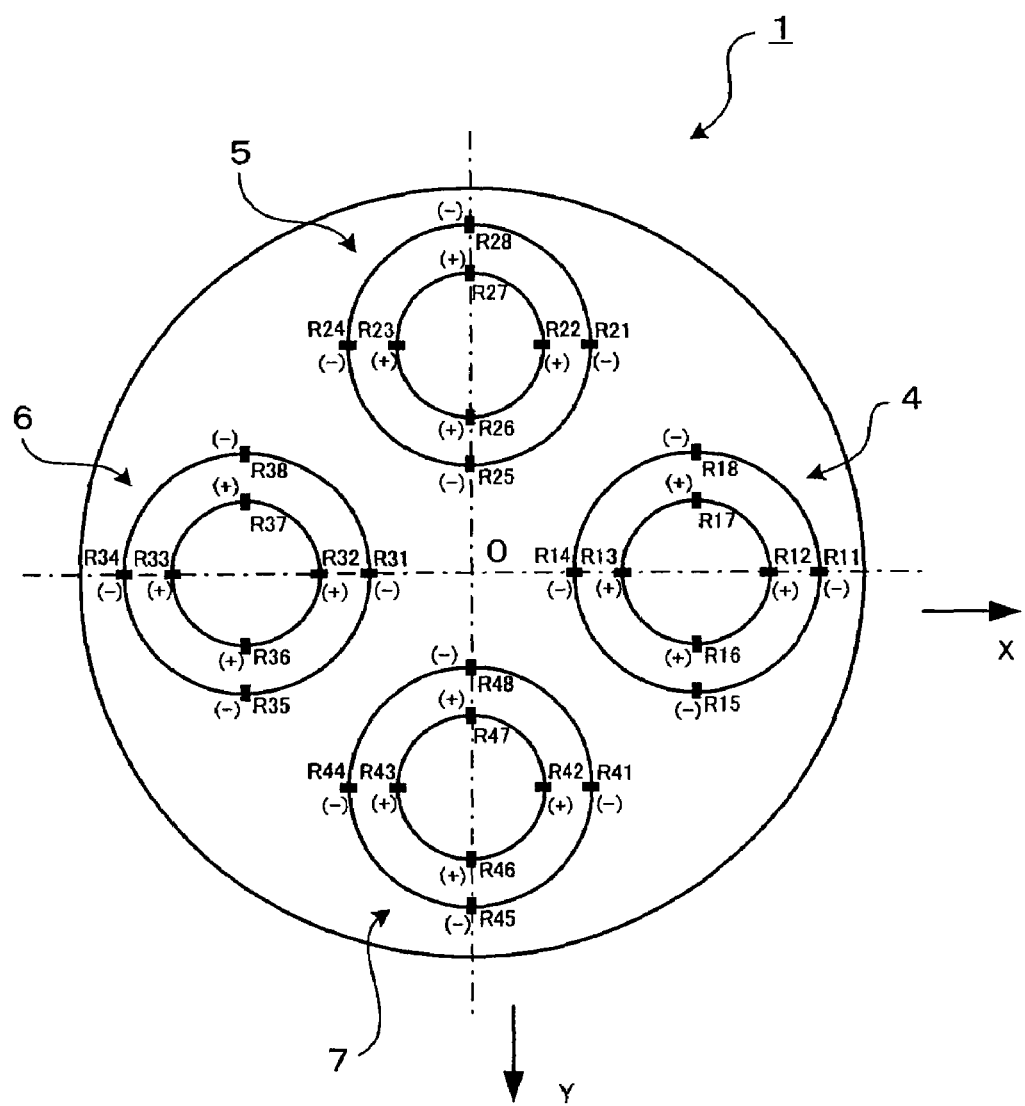
[FIG. 6]
A plan view showing changes in the resistance values of the strain gauges when the force Fz is applied to the multiaxial sensor.
Figure 7:
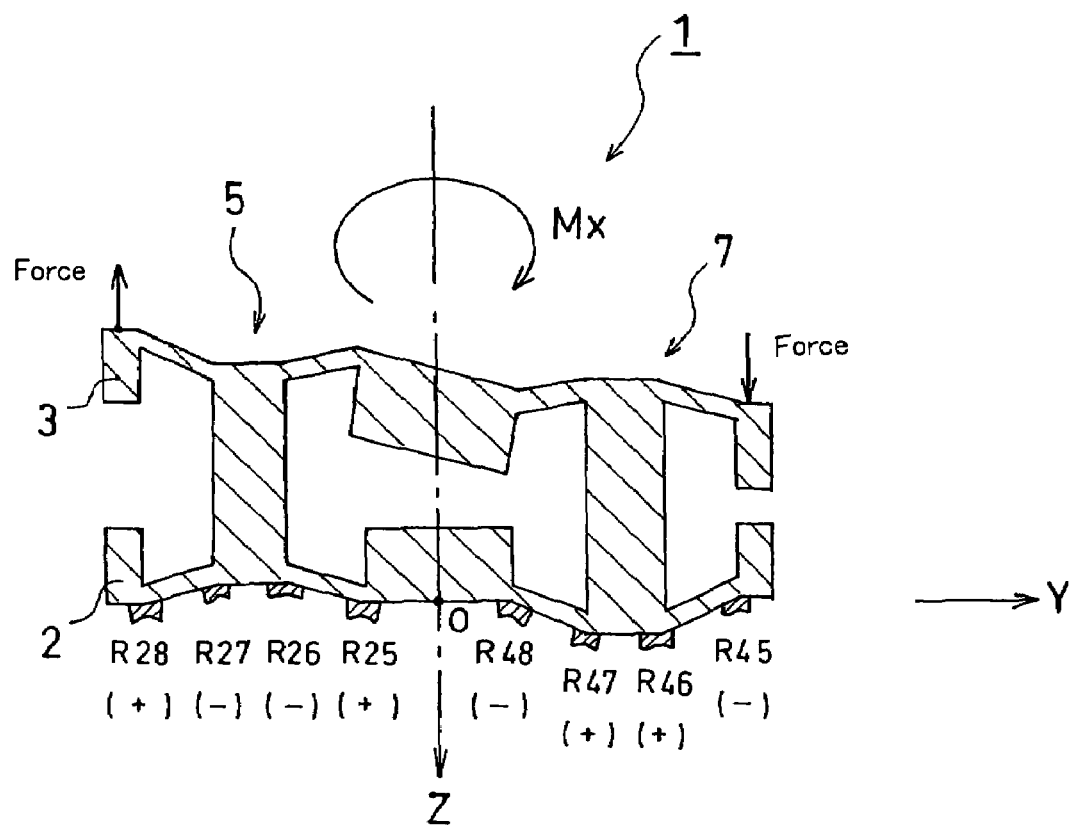
[FIG. 7]
A central vertical sectional front view showing displacement when a moment Mx is applied to the multiaxial sensor.
Figure 8:
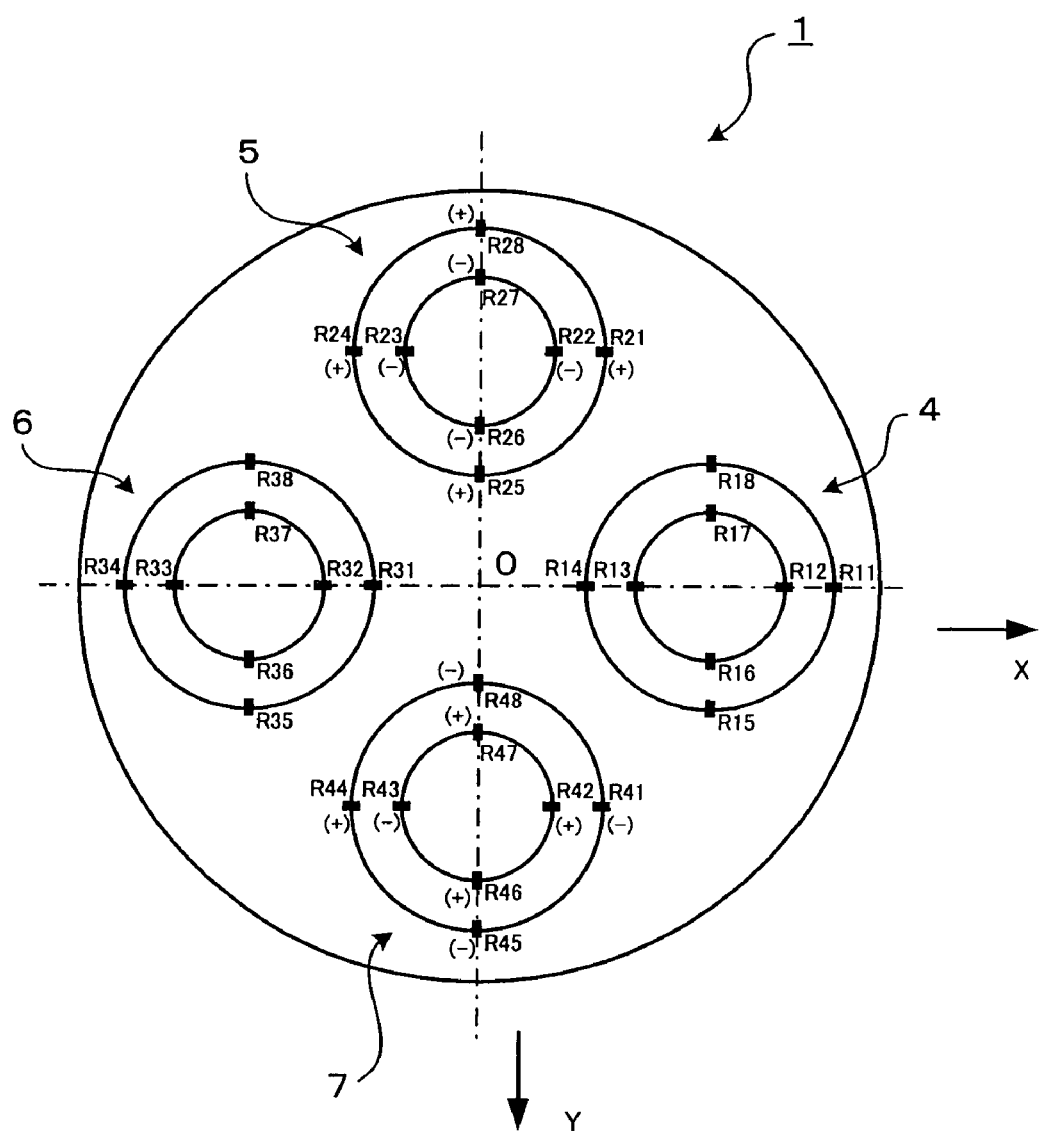
[FIG. 8]
A plan view showing changes in the resistance values of the strain gauges when the moment Mx is applied to the multiaxial sensor.
Figure 9:
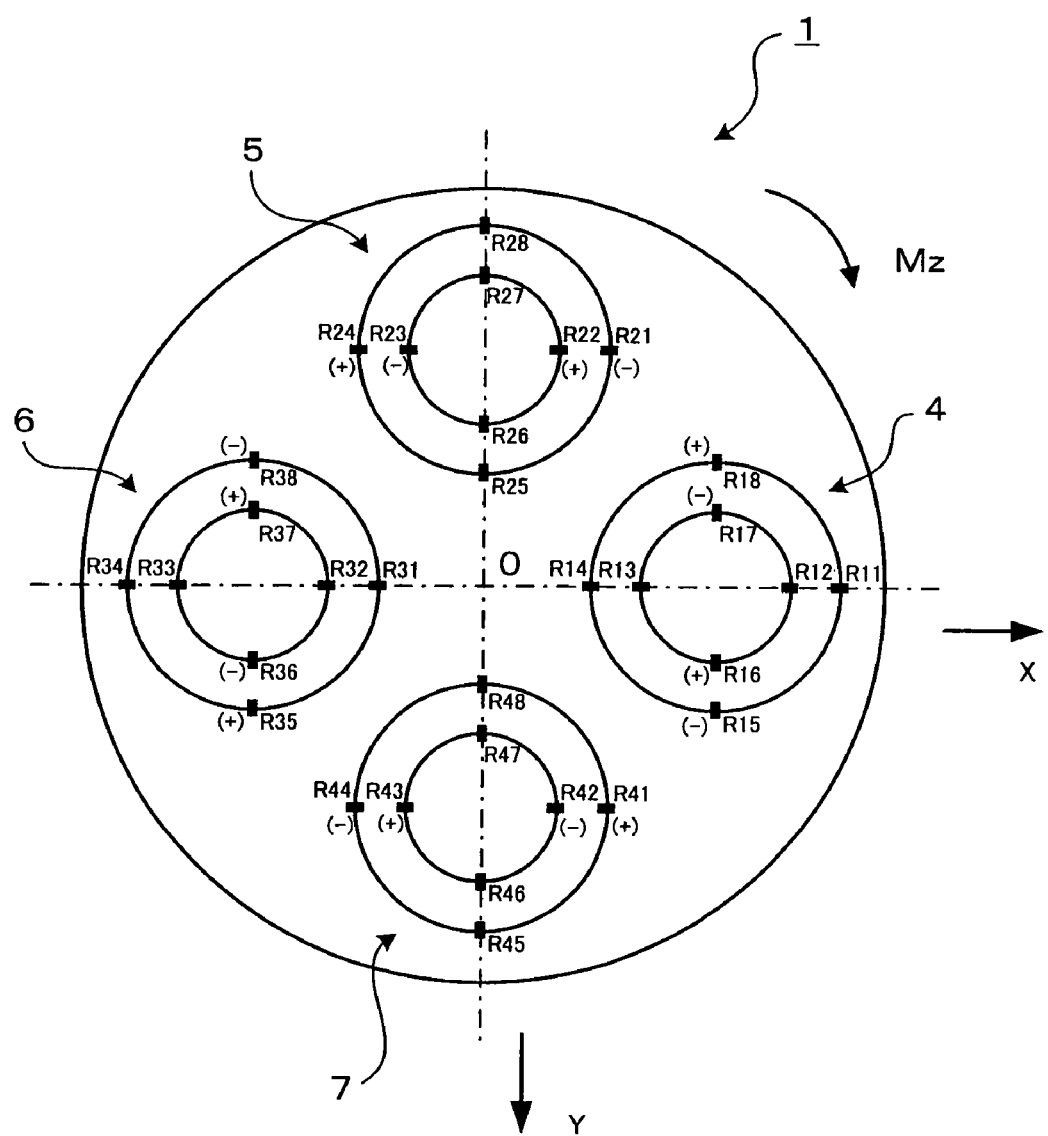
[FIG. 9]
A plan view showing changes in the resistance values of the strain gauges when a moment Mz is applied to the multiaxial sensor.
Figure 10:
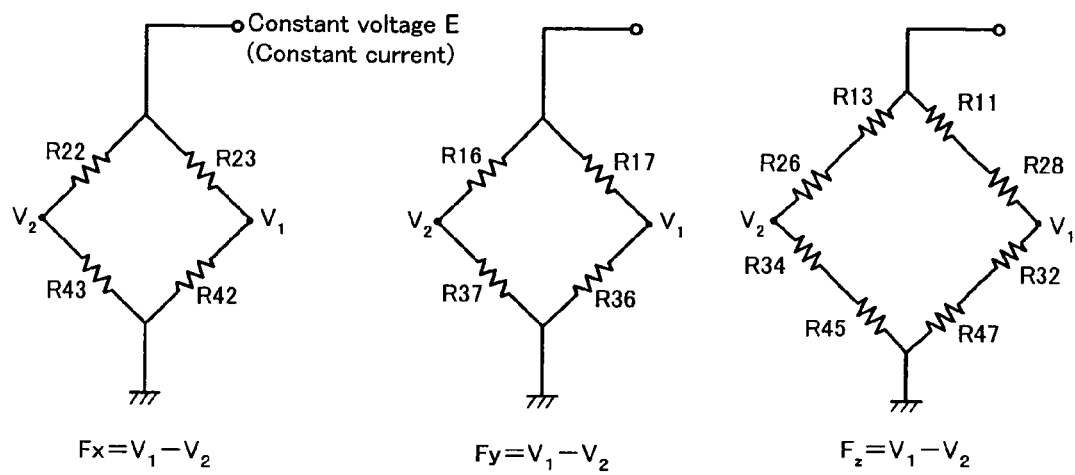
[FIG. 10]
Circuit diagrams showing examples of bridge circuits for the multiaxial sensor.
Figure 10:
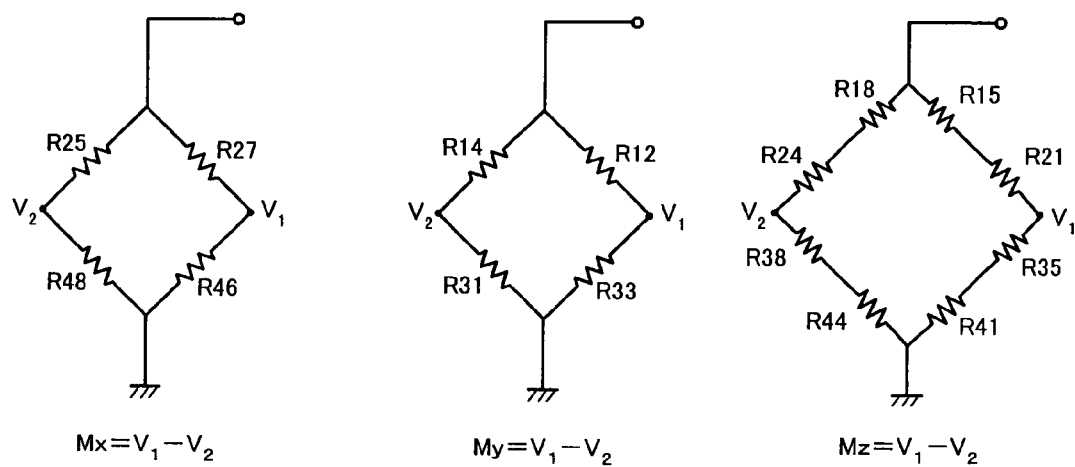
Figure 11:
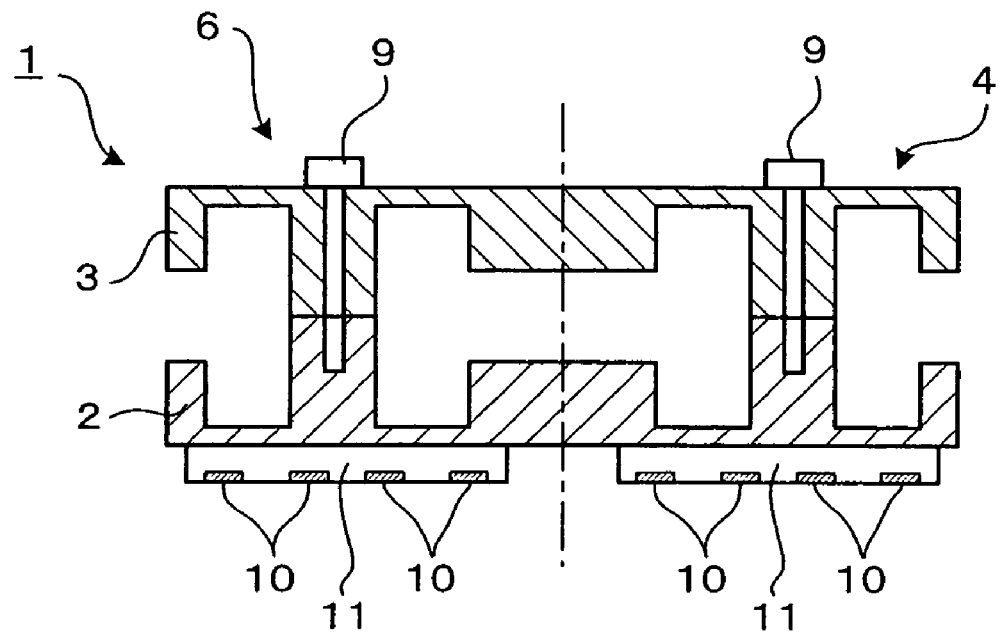
[FIG. 11]
A central vertical sectional front view showing a multiaxial sensor according to a second embodiment.
Figure 12:
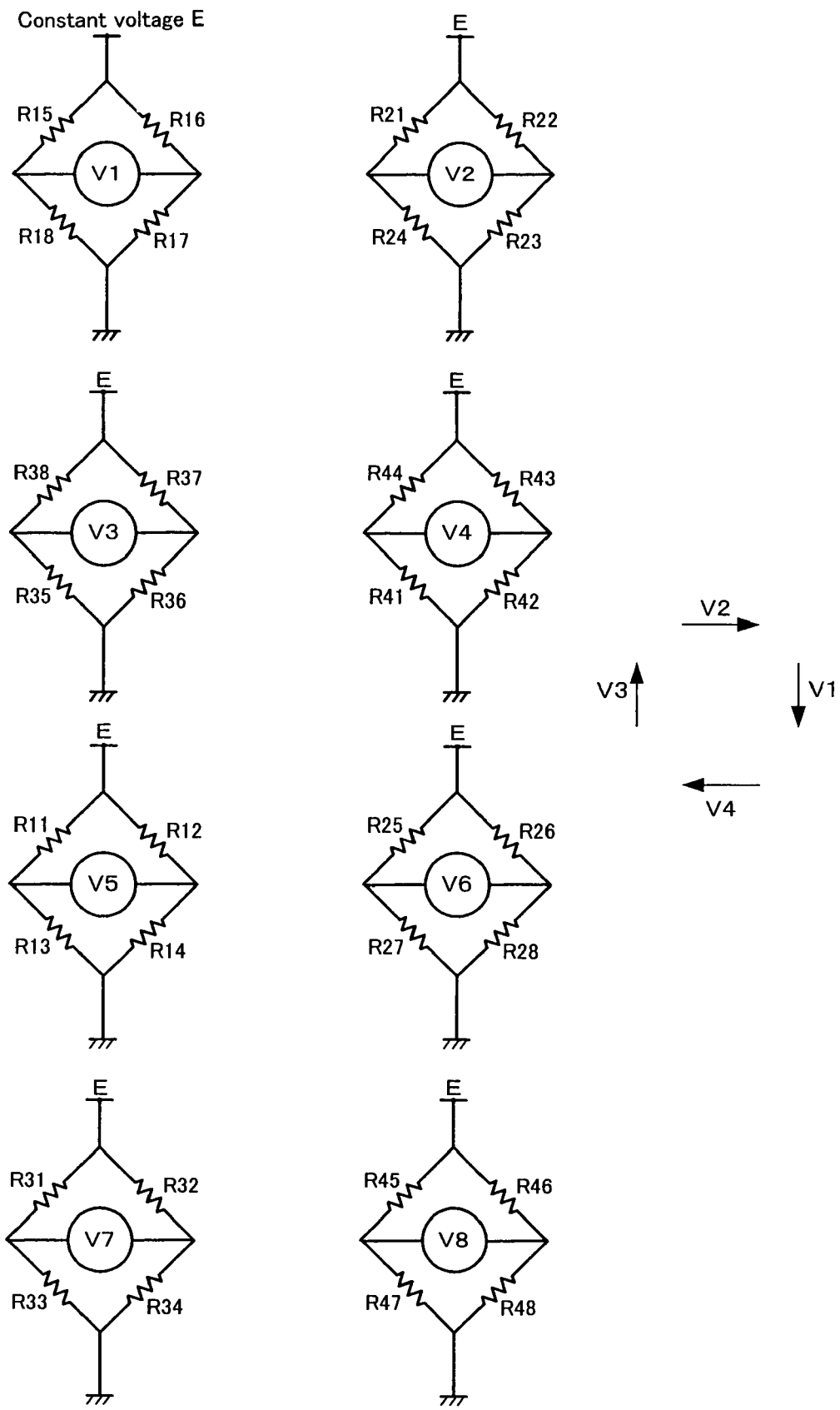
[FIG. 12]
Circuit diagrams showing examples of bridge circuits according to a third embodiment.
Figure 13:
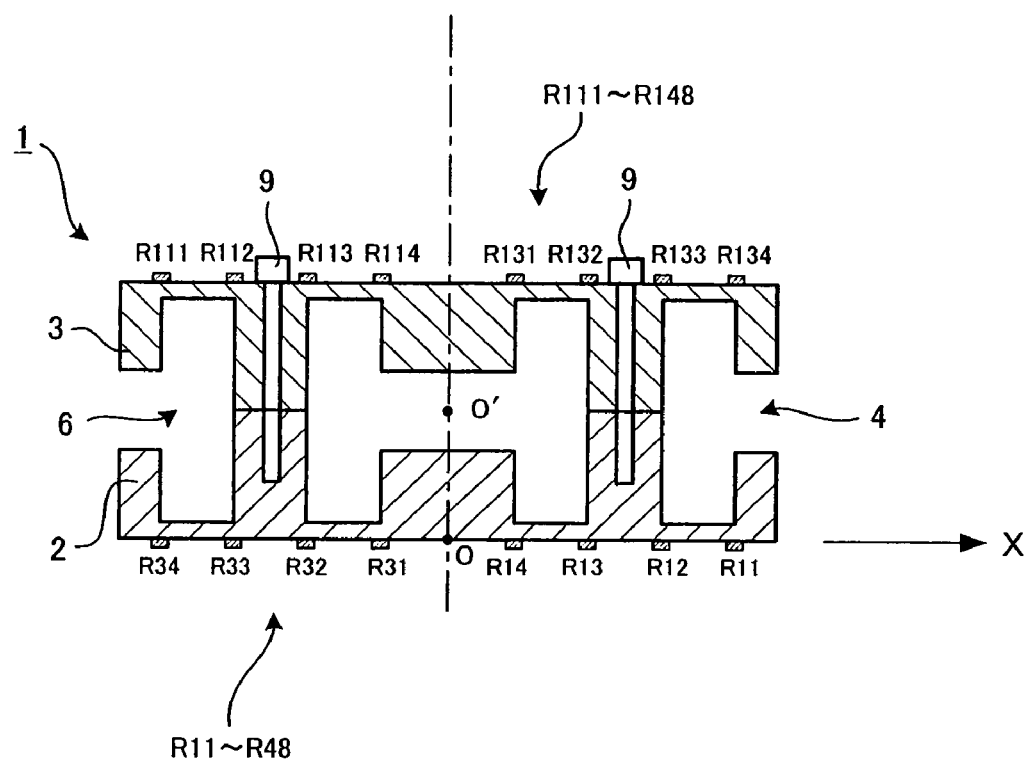
[FIG. 13]
A central vertical sectional front view showing a multiaxial sensor according to a fourth embodiment.
Figure 14:
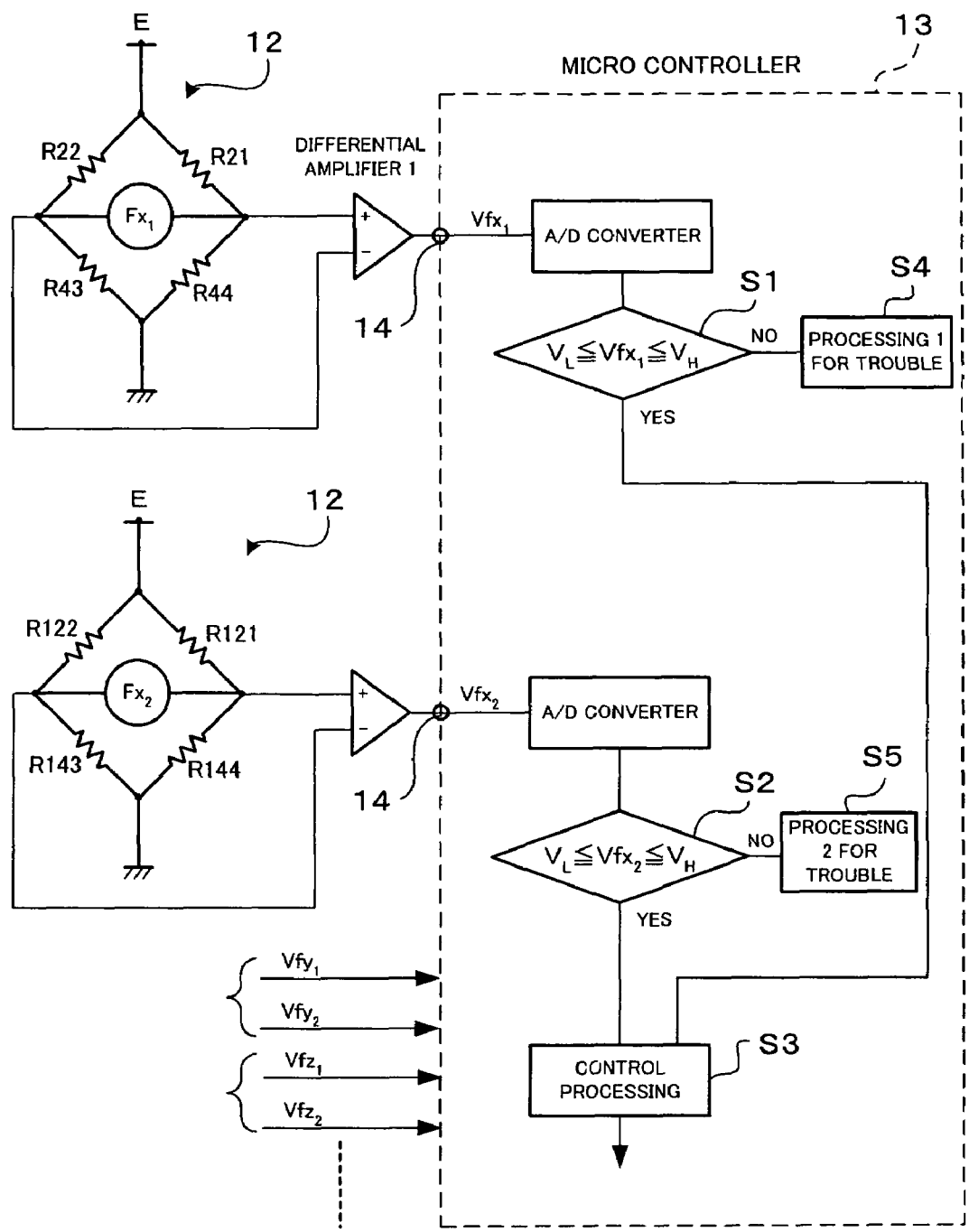
[FIG. 14]
A block diagram showing amplifier circuits and a judgment procedure of the multiaxial sensor according to a fourth embodiment.
Figure 15:
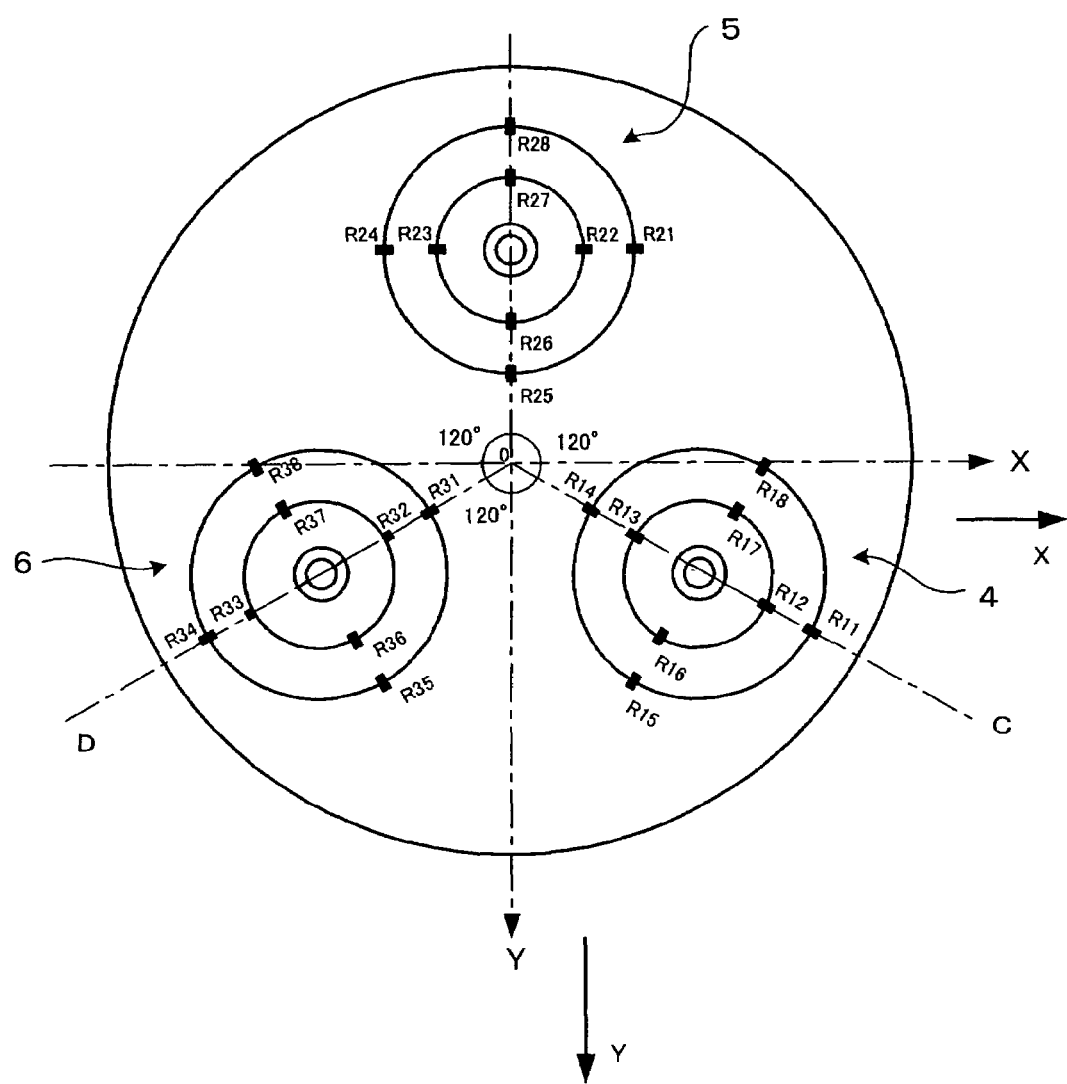
[FIG. 15]
A plan view showing the arrangement of strain gauges when a multiaxial sensor according to a fifth embodiment is Z-axially transparently viewed from the position of a second member.
Figure 16:
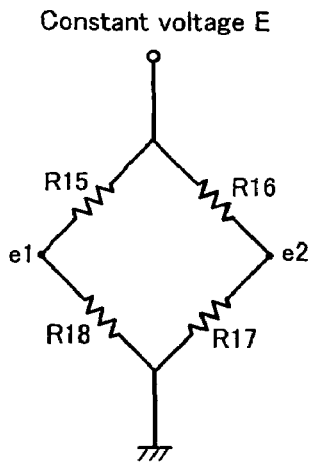
[FIG. 16]
Circuit diagrams showing examples of bridge circuits for the multiaxial sensor.
Figure 16:
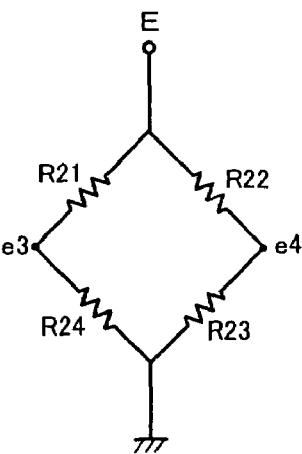
Figure 16:
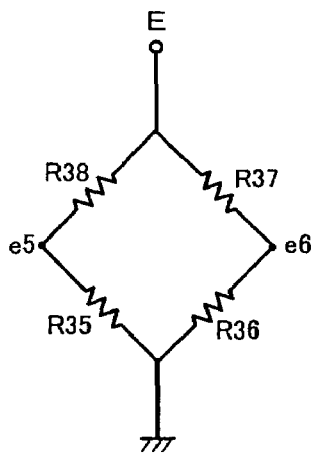
Figure 16:
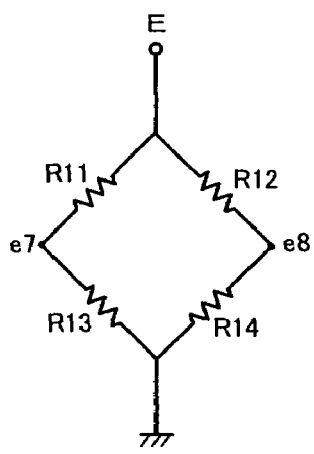
Figure 16:
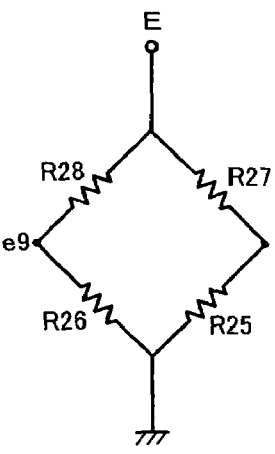
Figure 16:
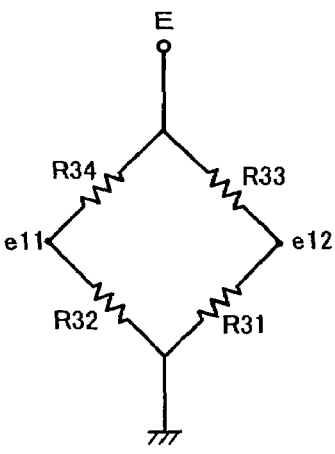
Figure 17:
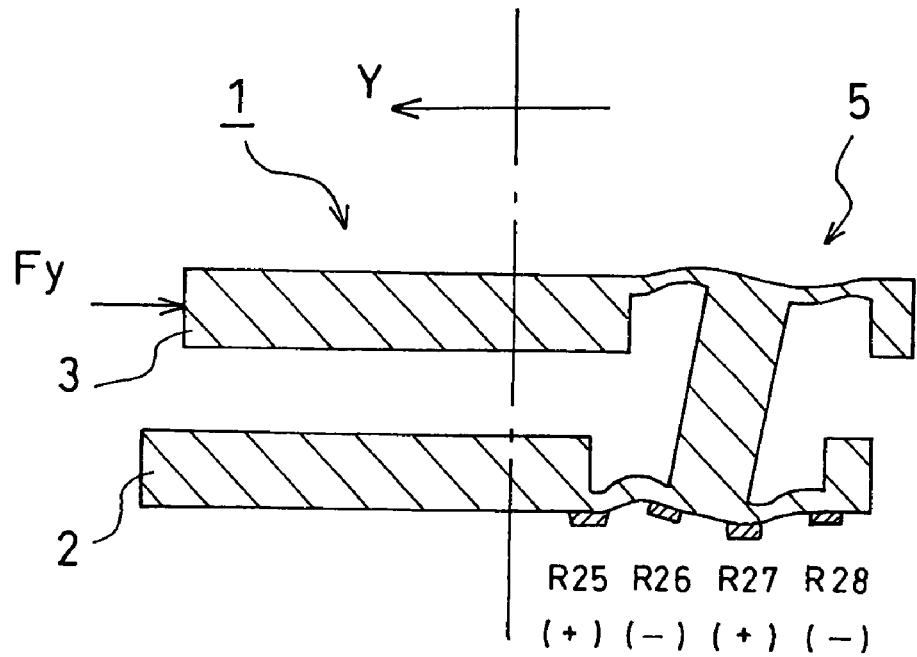
[FIG. 17]
A central vertical sectional front view showing displacement when a force Fy is applied to the multiaxial sensor.
Figure 18:
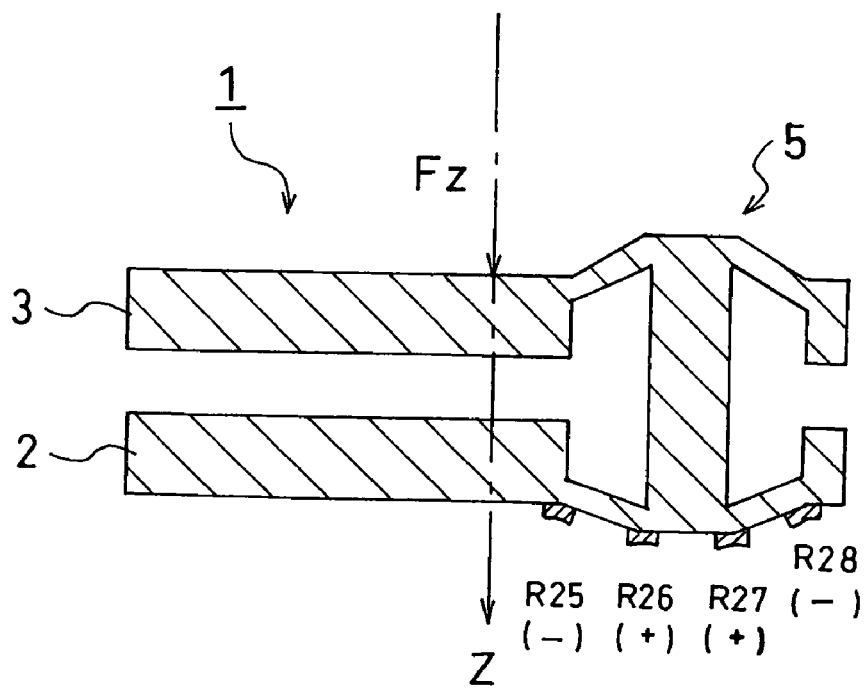
[FIG. 18]
A central vertical sectional front view showing displacement when a force Fz is applied to the multiaxial sensor.
Figure 19:
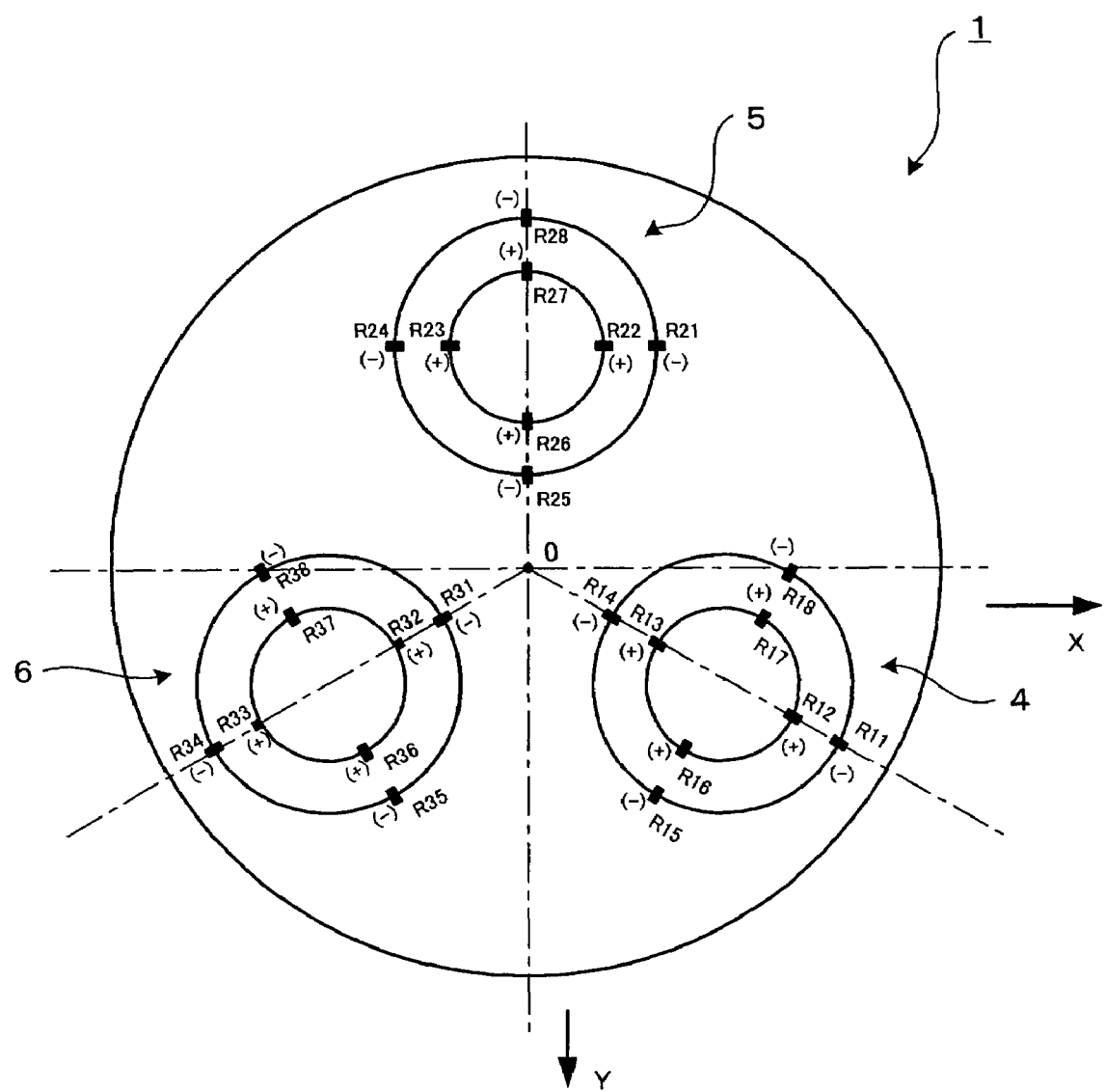
[FIG. 19]
A plan view showing changes in the resistance values of the strain gauges when the force Fz is applied to the multiaxial sensor.
Figure 20:
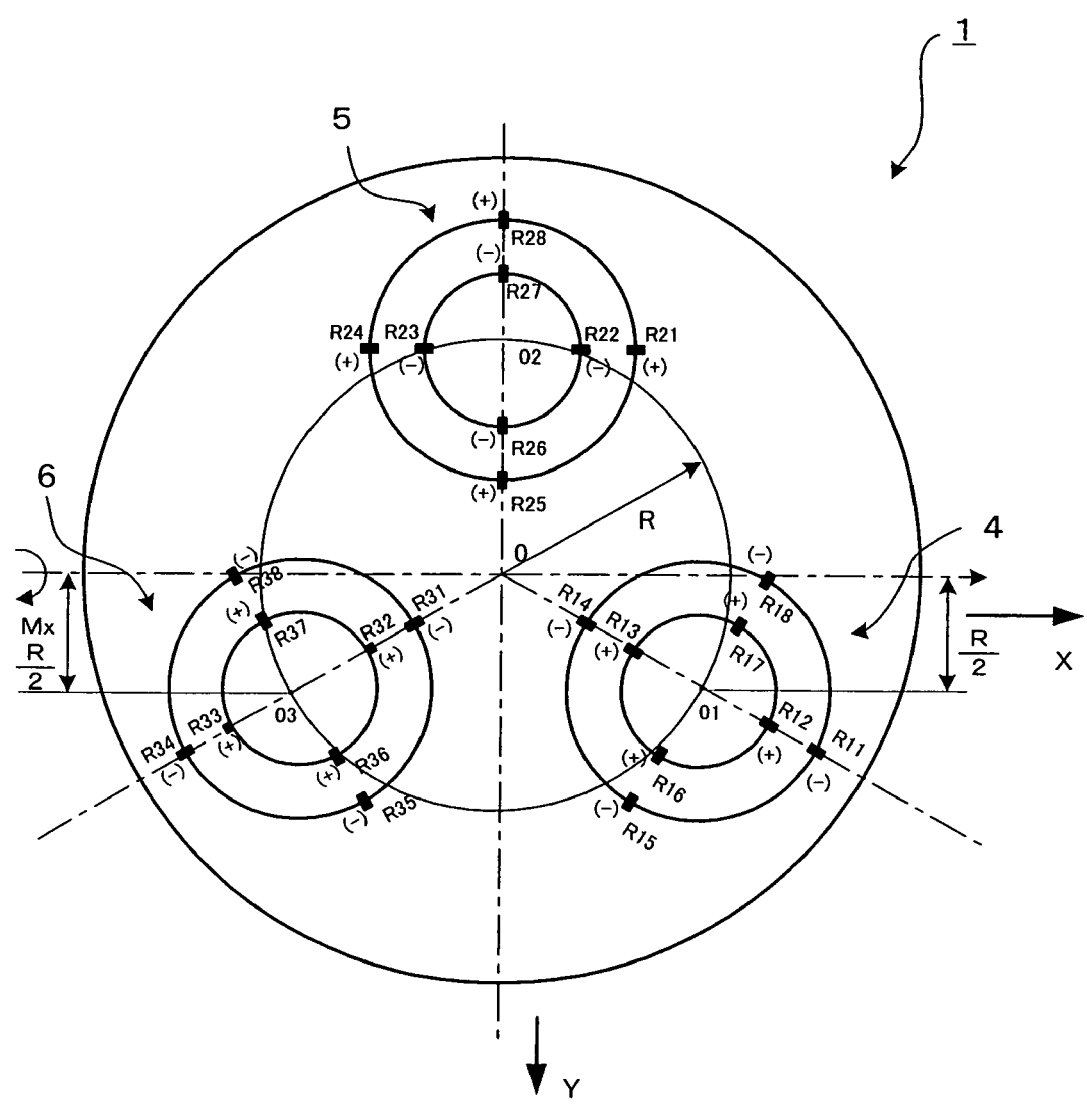
[FIG. 20]
A central vertical sectional front view showing displacement when a moment Mx is applied to the multiaxial sensor.
Figure 21:
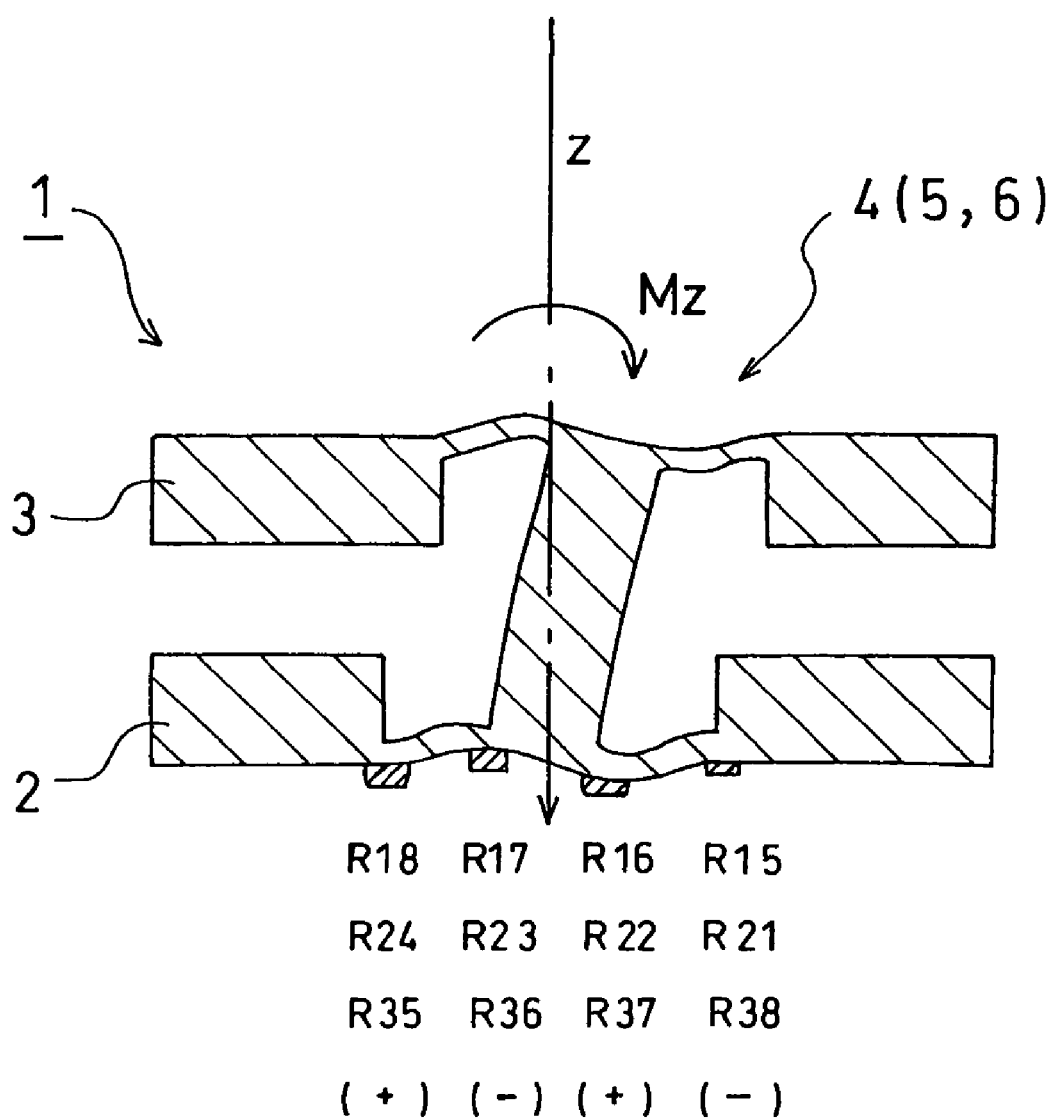
[FIG. 21]
A central vertical sectional front view showing displacement when a moment Mz is applied to the multiaxial sensor.
Figure 22:
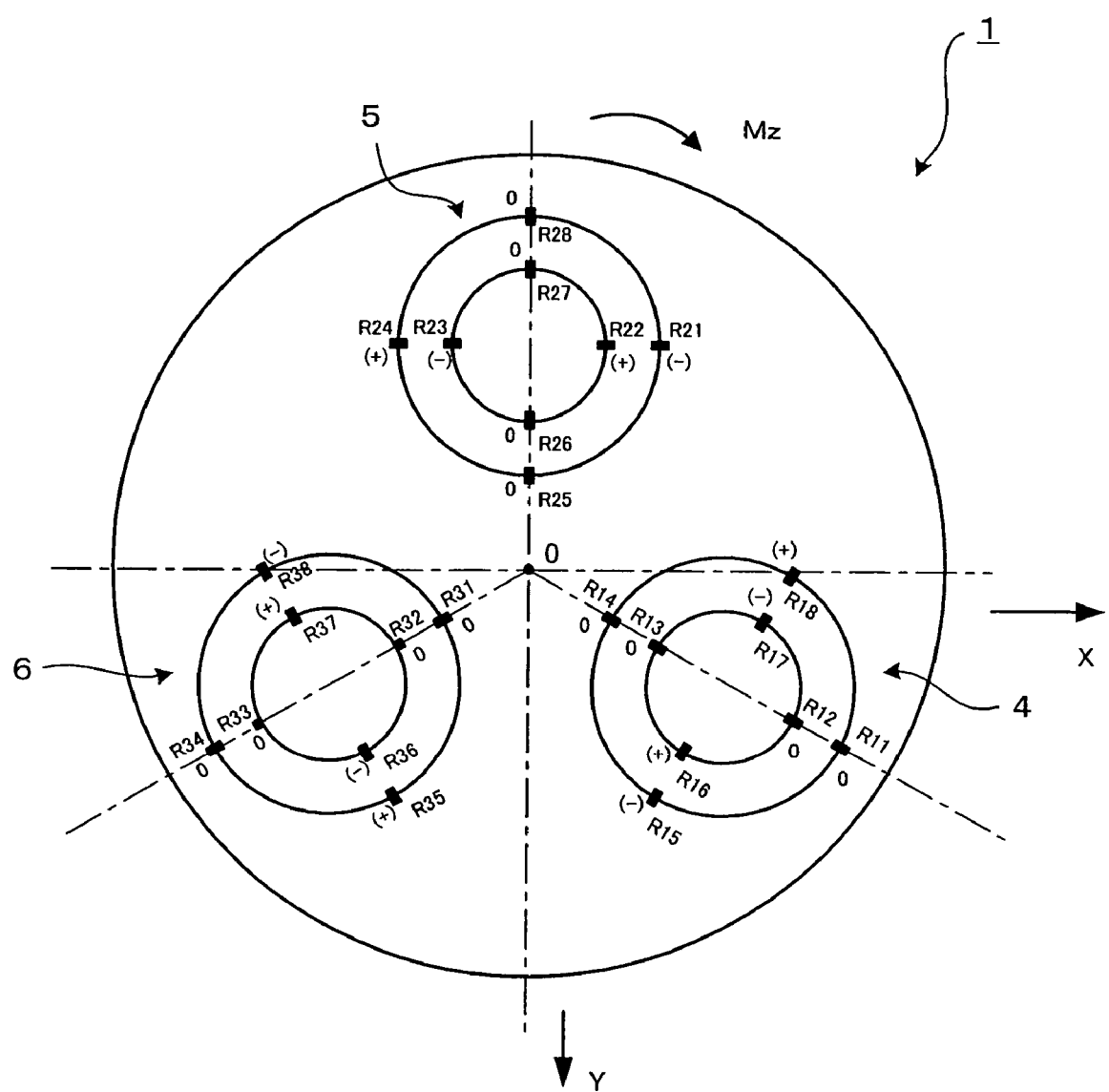
[FIG. 22]
A plan view showing changes in the resistance values of the strain gauges when the moment Mz is applied to the multiaxial sensor.
Figure 23:
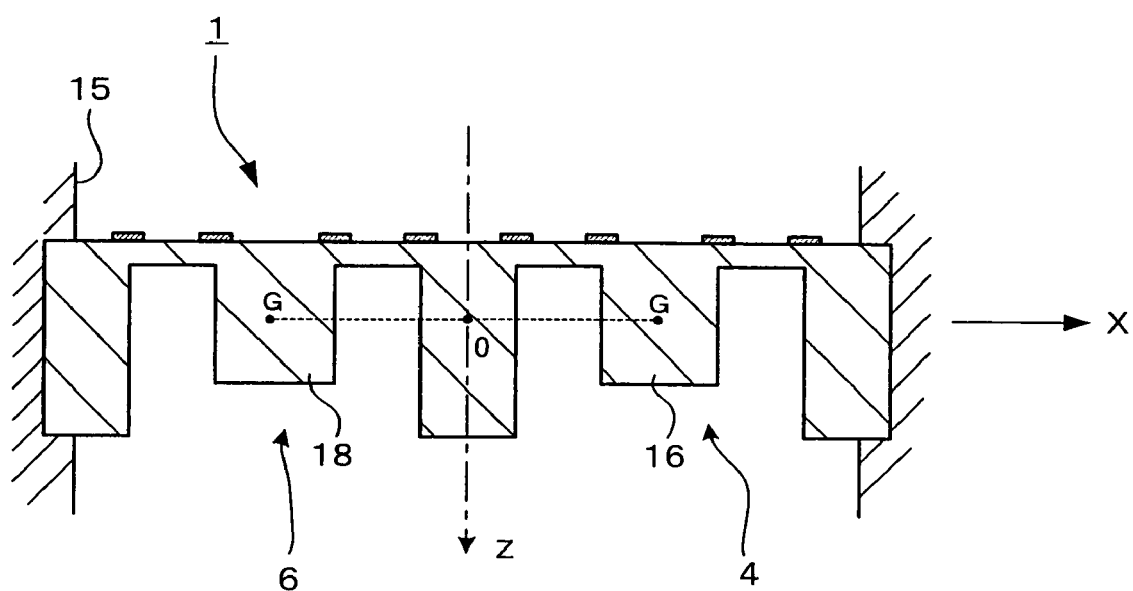
[FIG. 23]
A central vertical sectional front view showing a multiaxial sensor according to a sixth embodiment.
Figure 24:
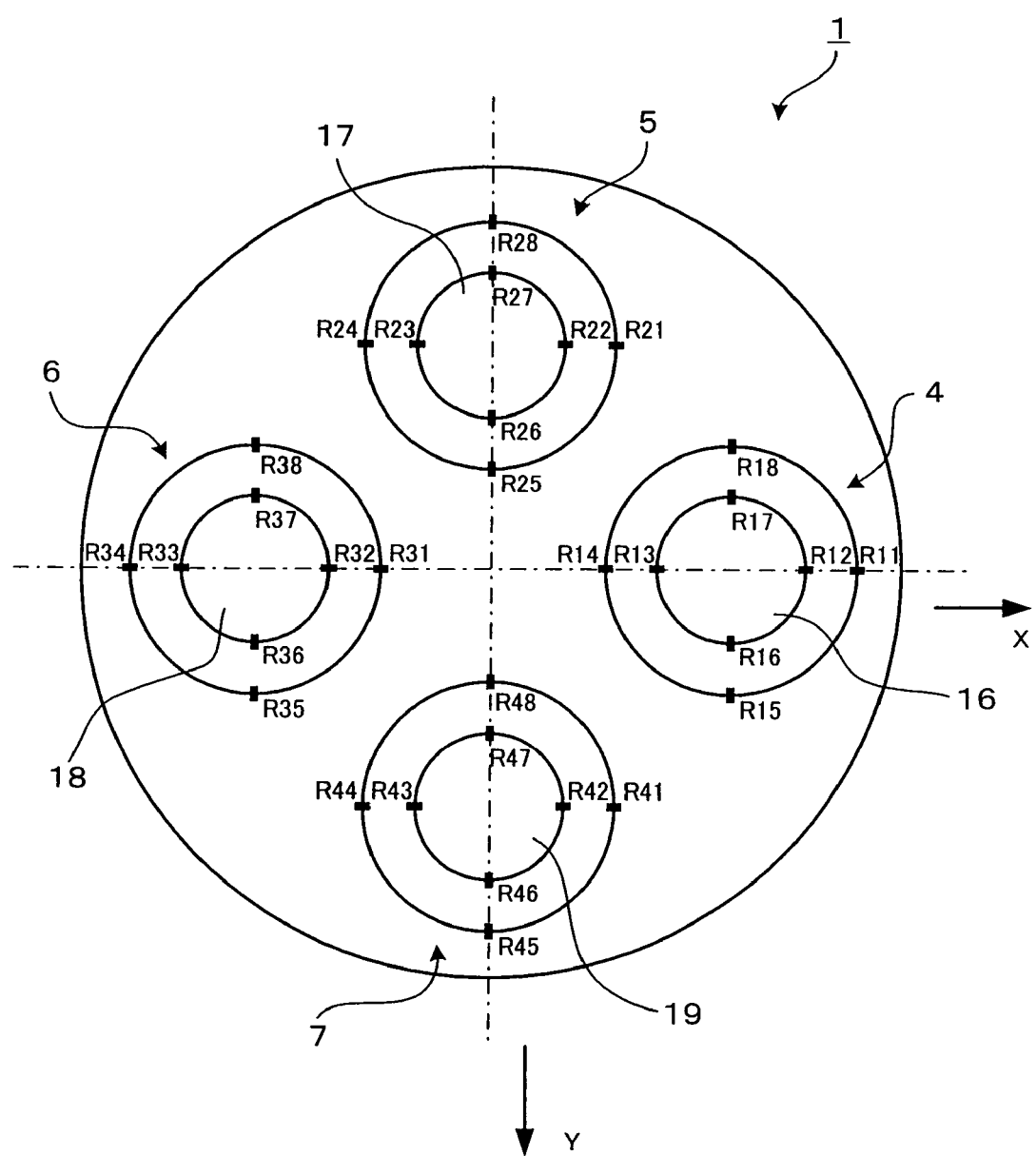
[FIG. 24]
A plan view showing the arrangement of strain gauges when the multiaxial sensor according to the sixth embodiment is transparently viewed in the reverse direction of the Z axis.
Figure 25:
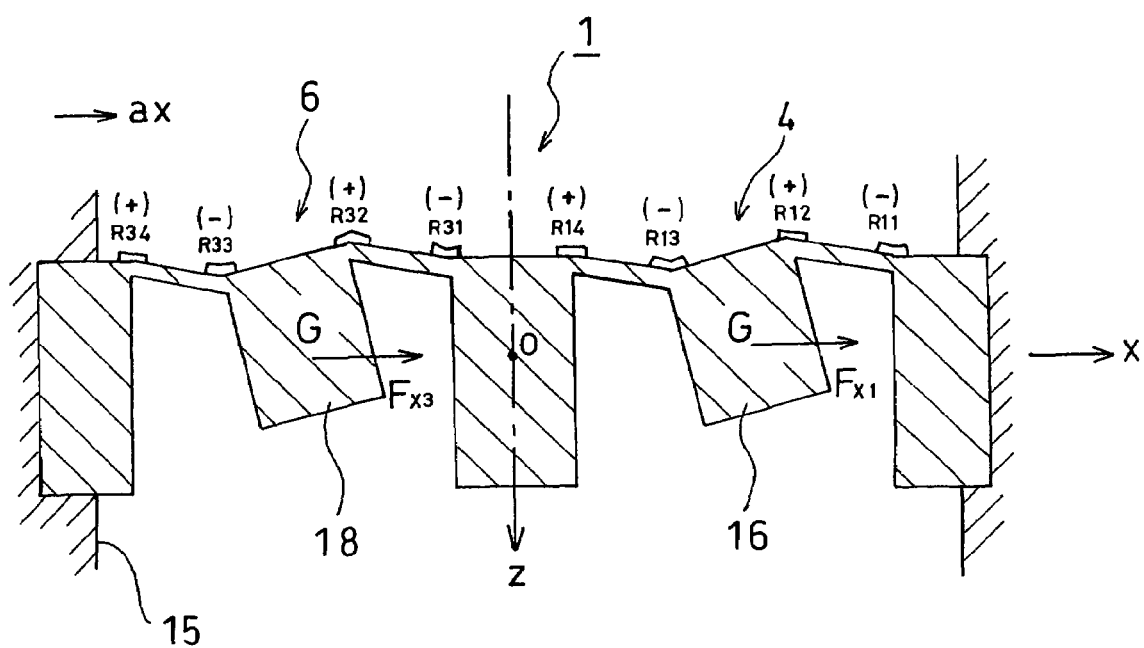
[FIG. 25]
A central vertical sectional front view showing displacement when an acceleration ax is applied to the multiaxial sensor.
Figure 26:
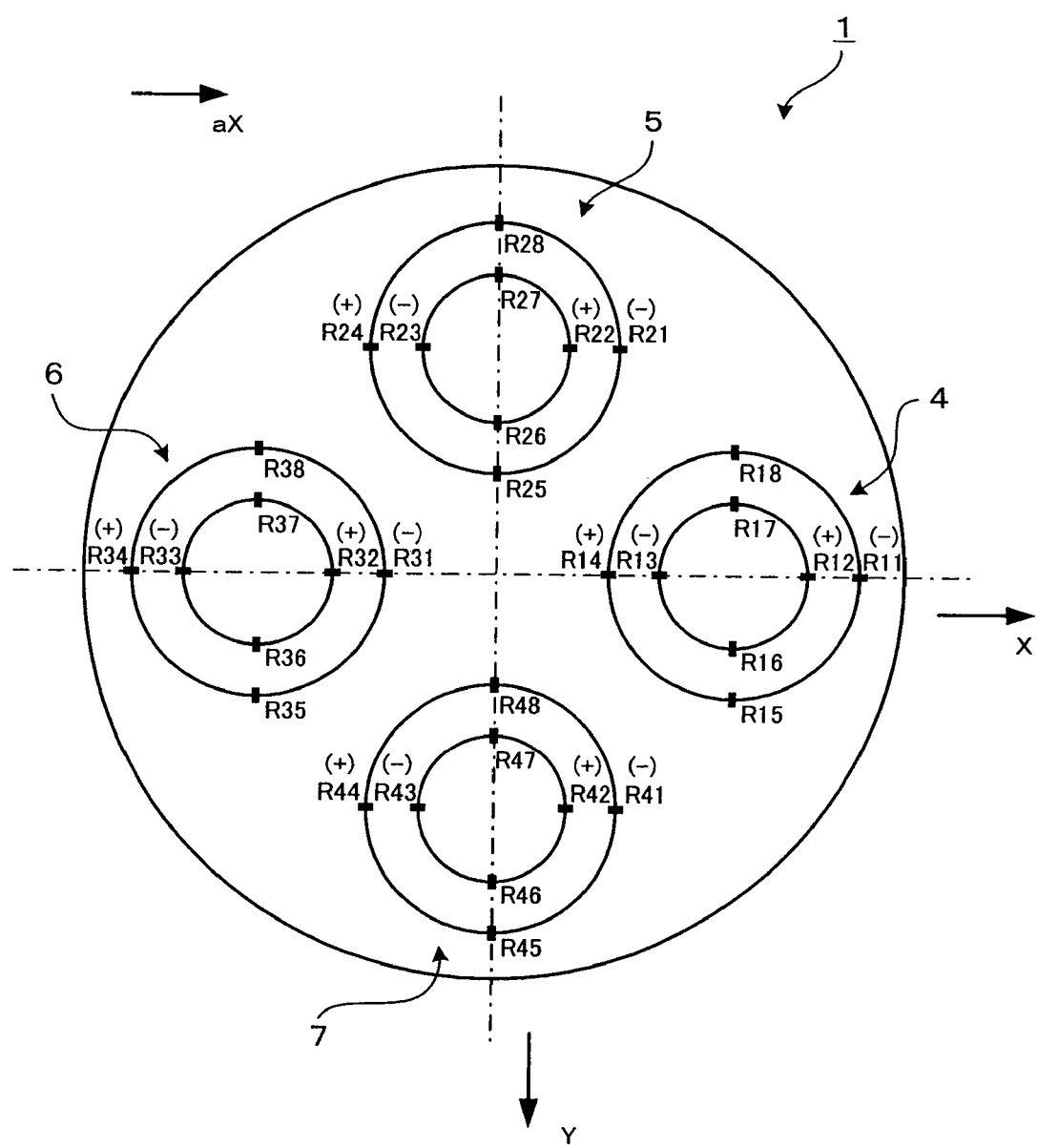
[FIG. 26]
A plan view showing changes in the resistance values of the strain gauges when the acceleration ax is applied to the multiaxial sensor.
Figure 27:
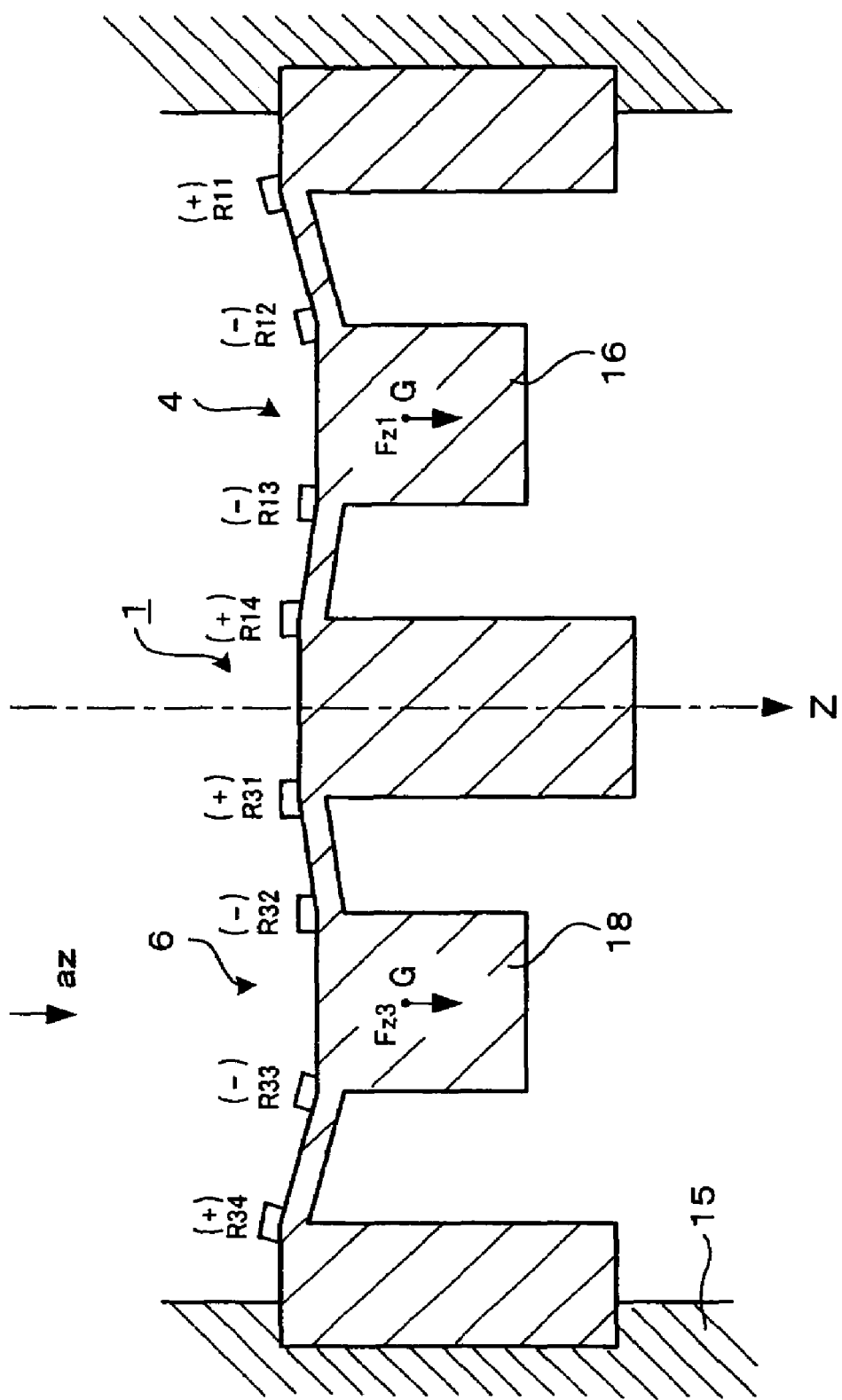
[FIG. 27]
A central vertical sectional front view showing displacement when an acceleration az is applied to the multiaxial sensor.
Figure 28:
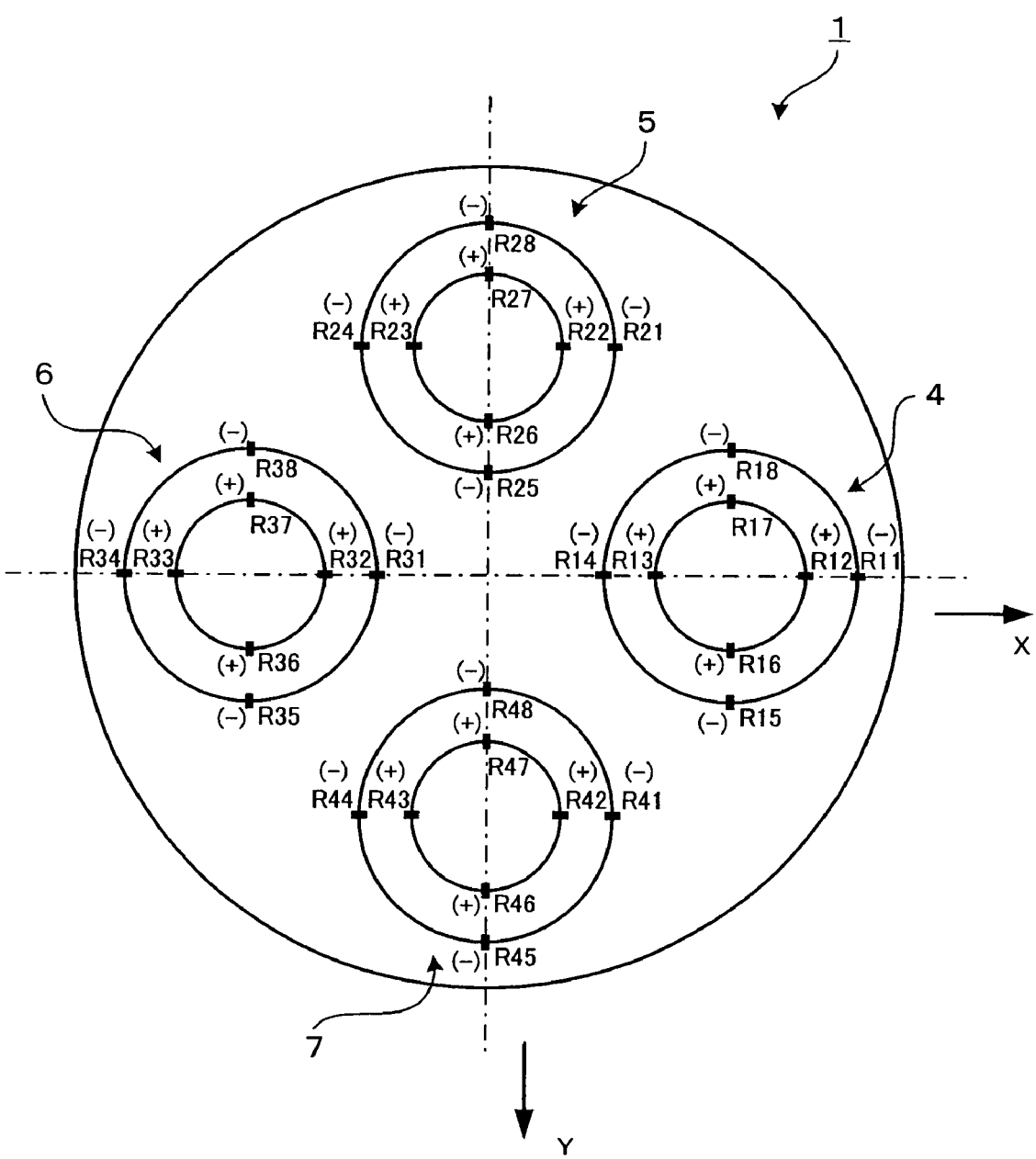
[FIG. 28]
A plan view showing changes in the resistance values of the strain gauges when the acceleration ax is applied to the multiaxial sensor.
Figure 29:
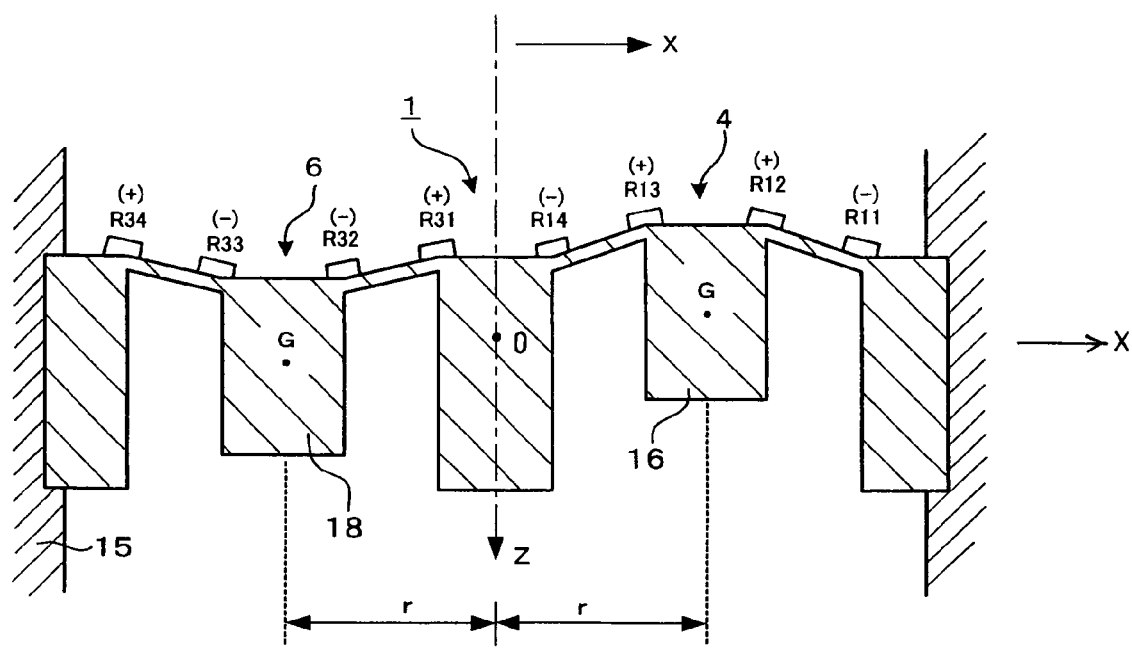
[FIG. 29]
A central vertical sectional front view showing displacement when an angular acceleration alpha y is applied to the multiaxial sensor.
Figure 29:
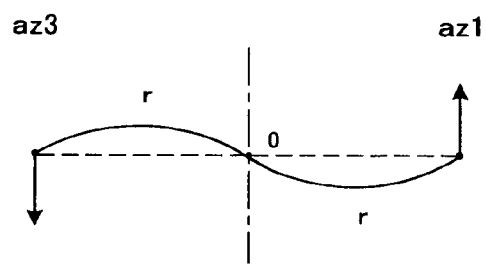
Figure 30:
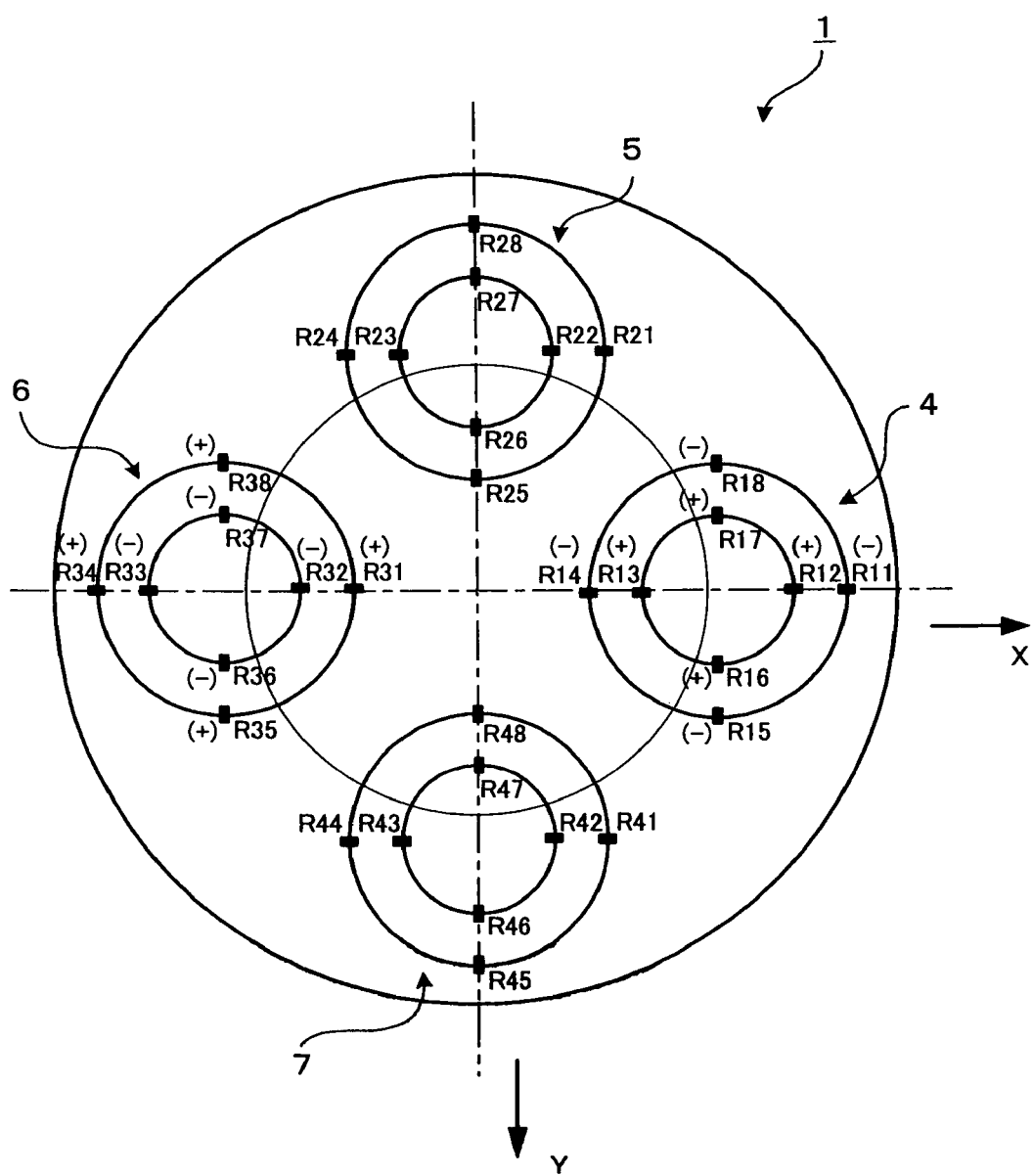
[FIG. 30]
A plan view showing changes in the resistance values of the strain gauges when the angular acceleration alpha y is applied to the multiaxial sensor.
Figure 31:
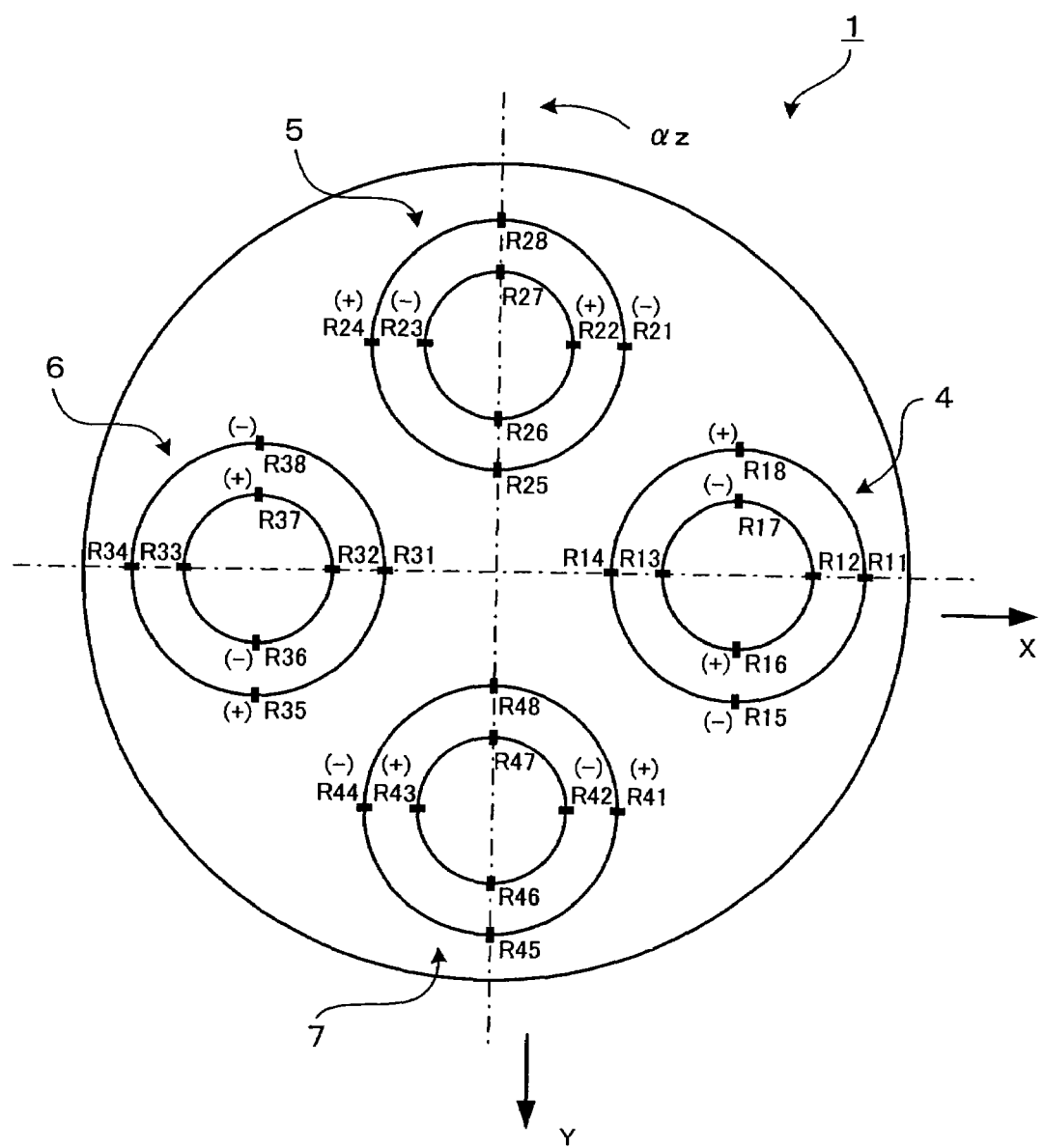
[FIG. 31]
A plan view showing changes in the resistance values of the strain gauges when an angular acceleration alpha z is applied to the multiaxial sensor.
Figure 32:
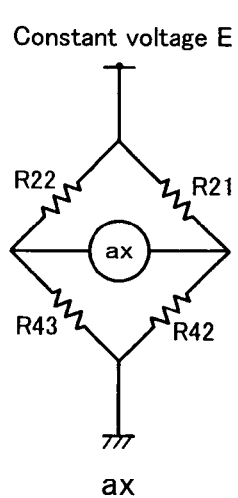
[FIG. 32]
Circuit diagrams showing examples of bridge circuits for the multiaxial sensor.
Figure 32:
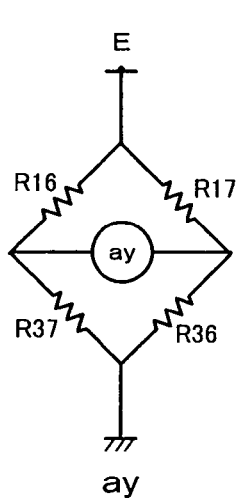
Figure 32:
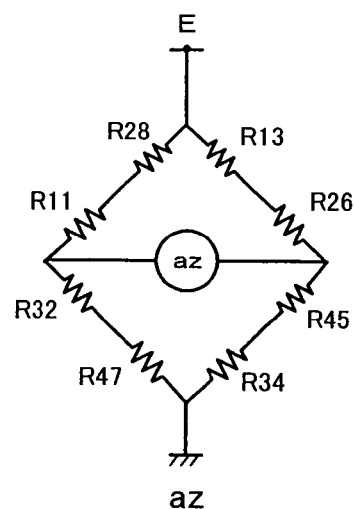
Figure 32:
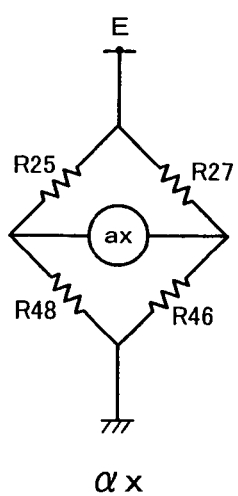
Figure 32:
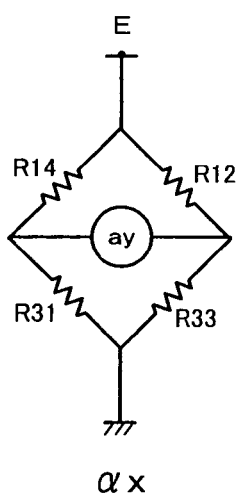
Figure 32:
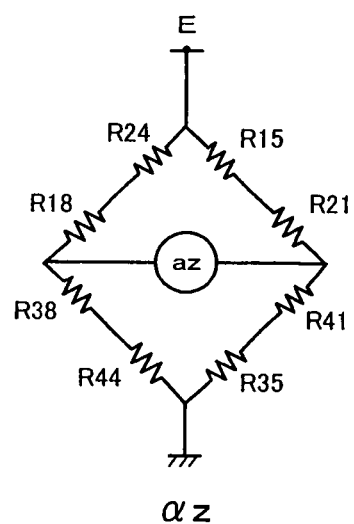
Figure 33:
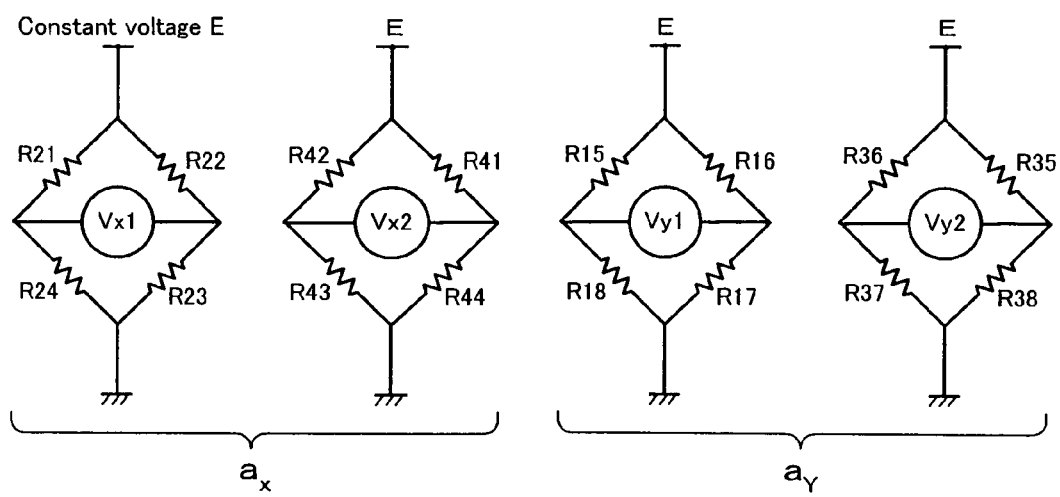
[FIG. 33]
Circuit diagrams showing examples of bridge circuits according to a seventh embodiment.
Figure 33:
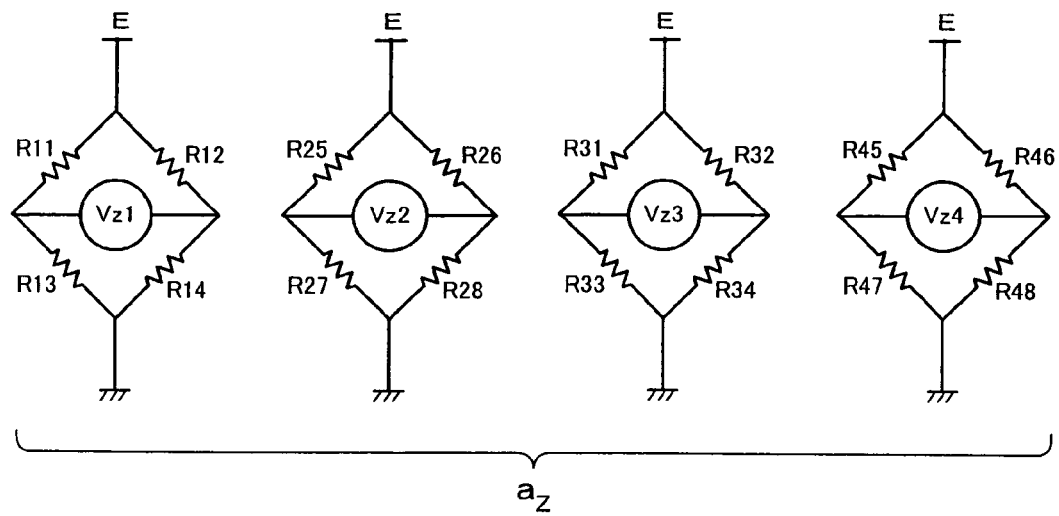
Figure 34:
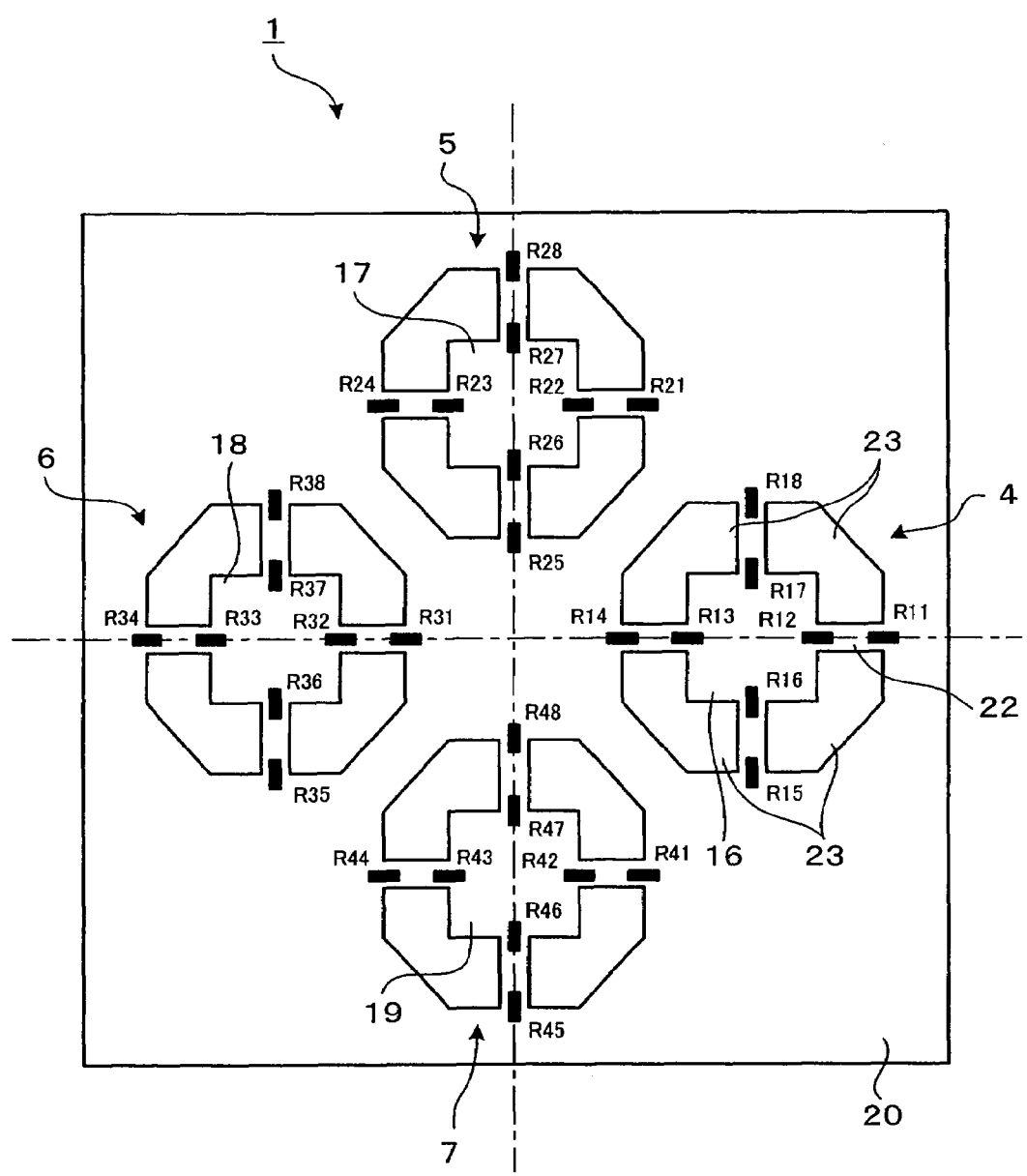
[FIG. 34]
A plan view showing a multiaxial sensor according to an eighth embodiment.
Figure 35:
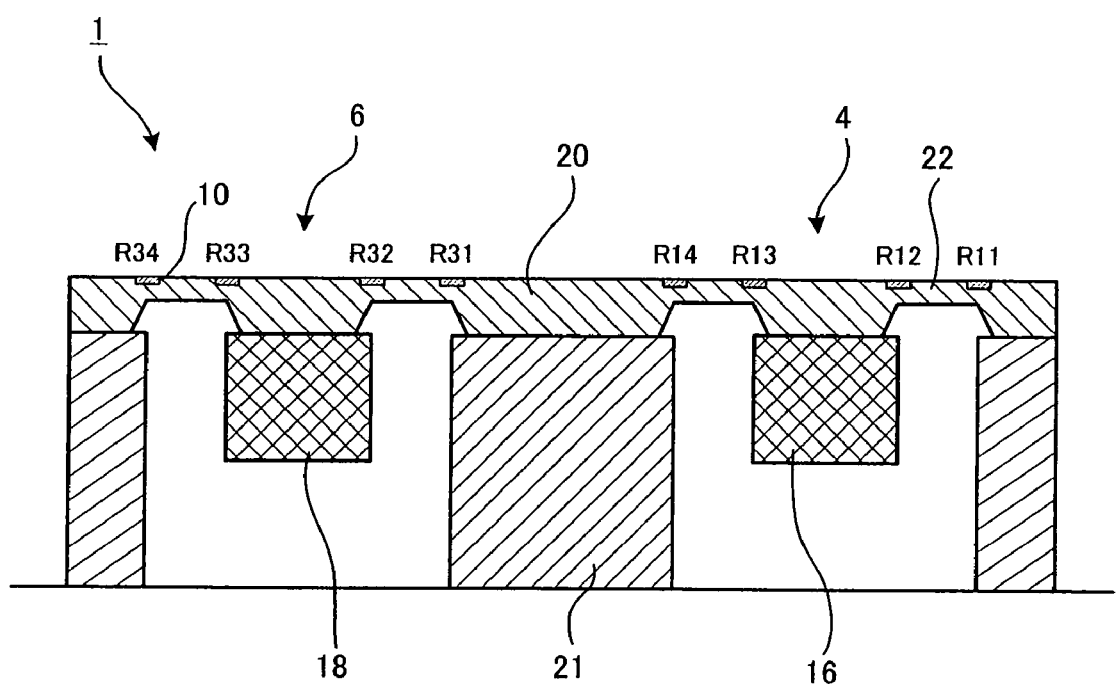
[FIG. 35]
A central vertical sectional front view showing the multiaxial sensor according to the eighth embodiment.
Figure 36:
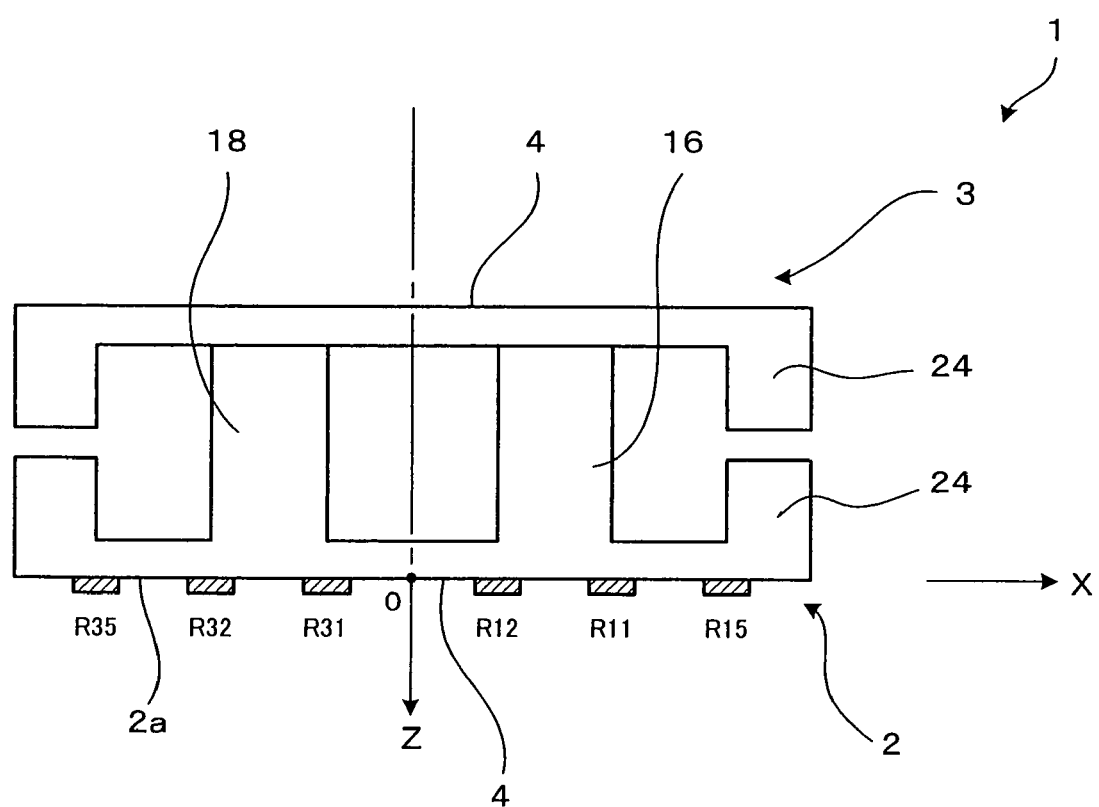
[FIG. 36]
A central vertical sectional front view showing a multiaxial sensor according to a ninth embodiment.
Figure 37:
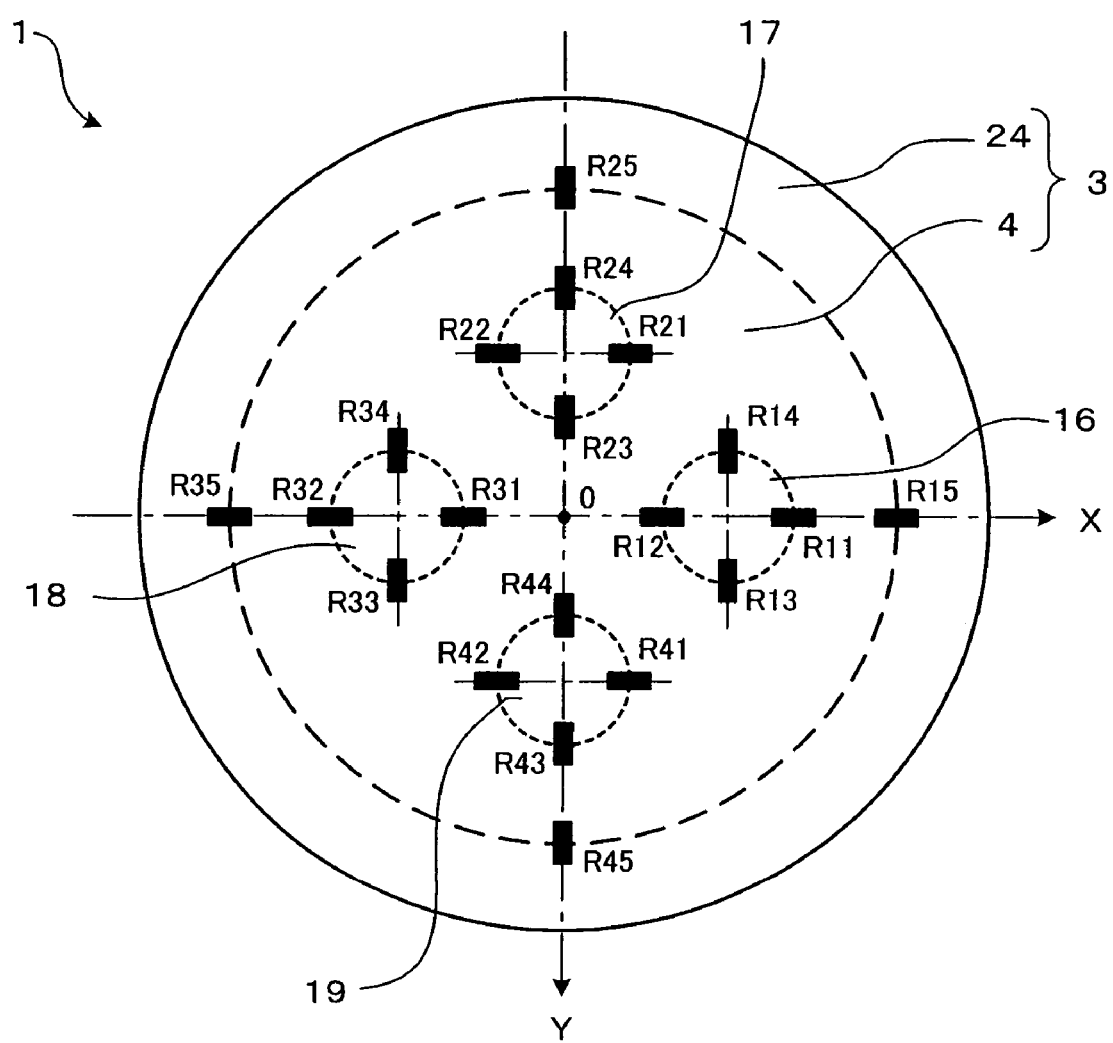
[FIG. 37]
A plan view showing the arrangement of strain gauges when a multiaxial sensor according to the ninth embodiment is Z-axially transparently viewed from the position of a second member.
Figure 38:
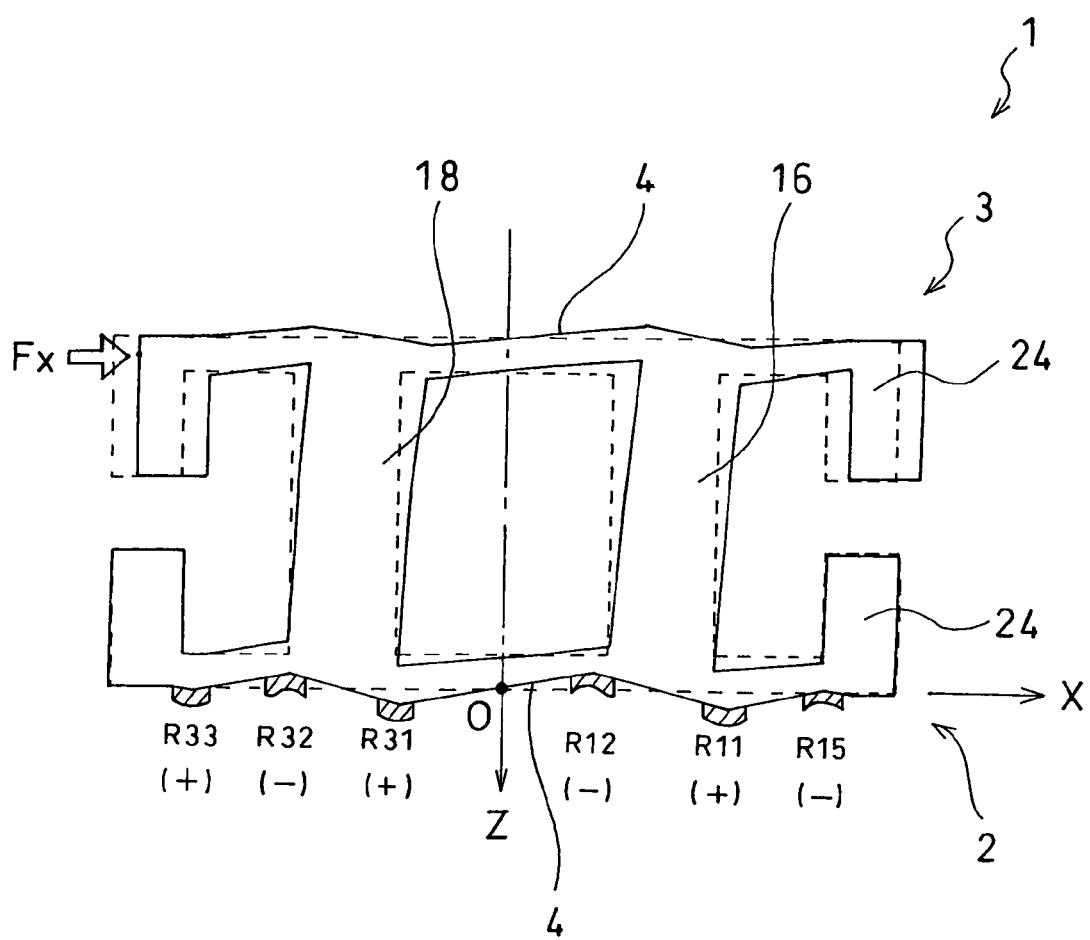
[FIG. 38]
A central vertical sectional front view showing displacement when a force Fx is applied to the multiaxial sensor.
Figure 39:
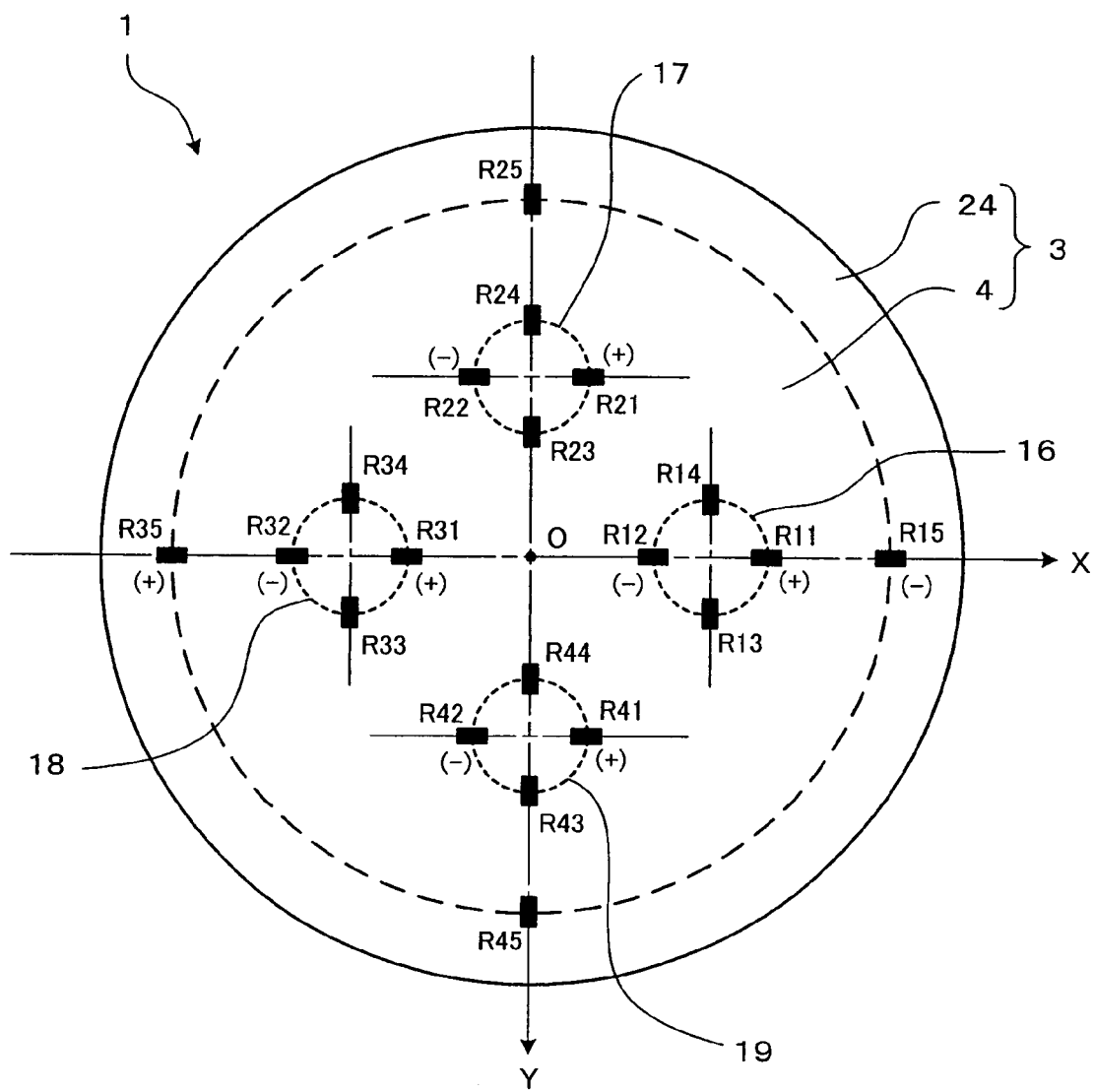
[FIG. 39]
A plan view showing changes in the resistance values of the strain gauges when the force Fx is applied to the multiaxial sensor.
Figure 40:
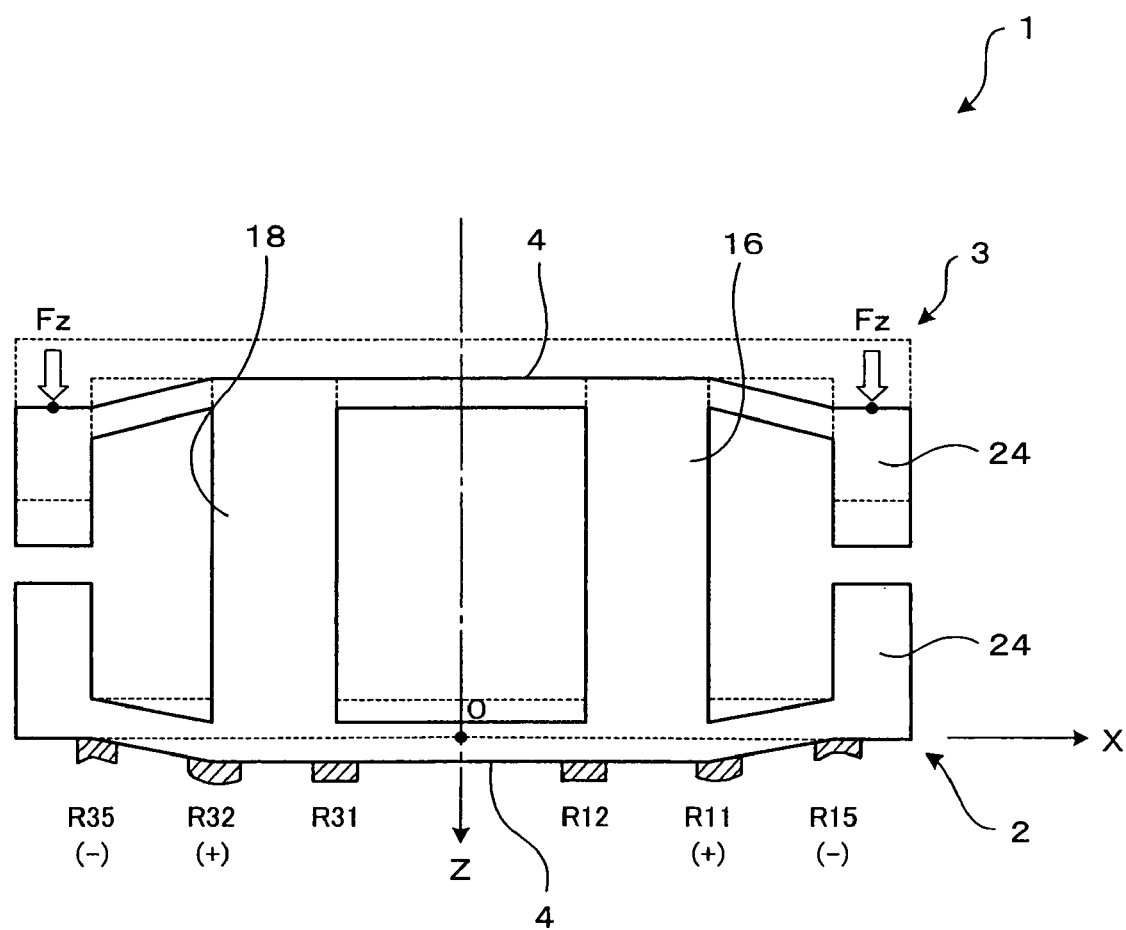
[FIG. 40]
A central vertical sectional front view showing displacement when a force Fz is applied to the multiaxial sensor.
Figure 41:
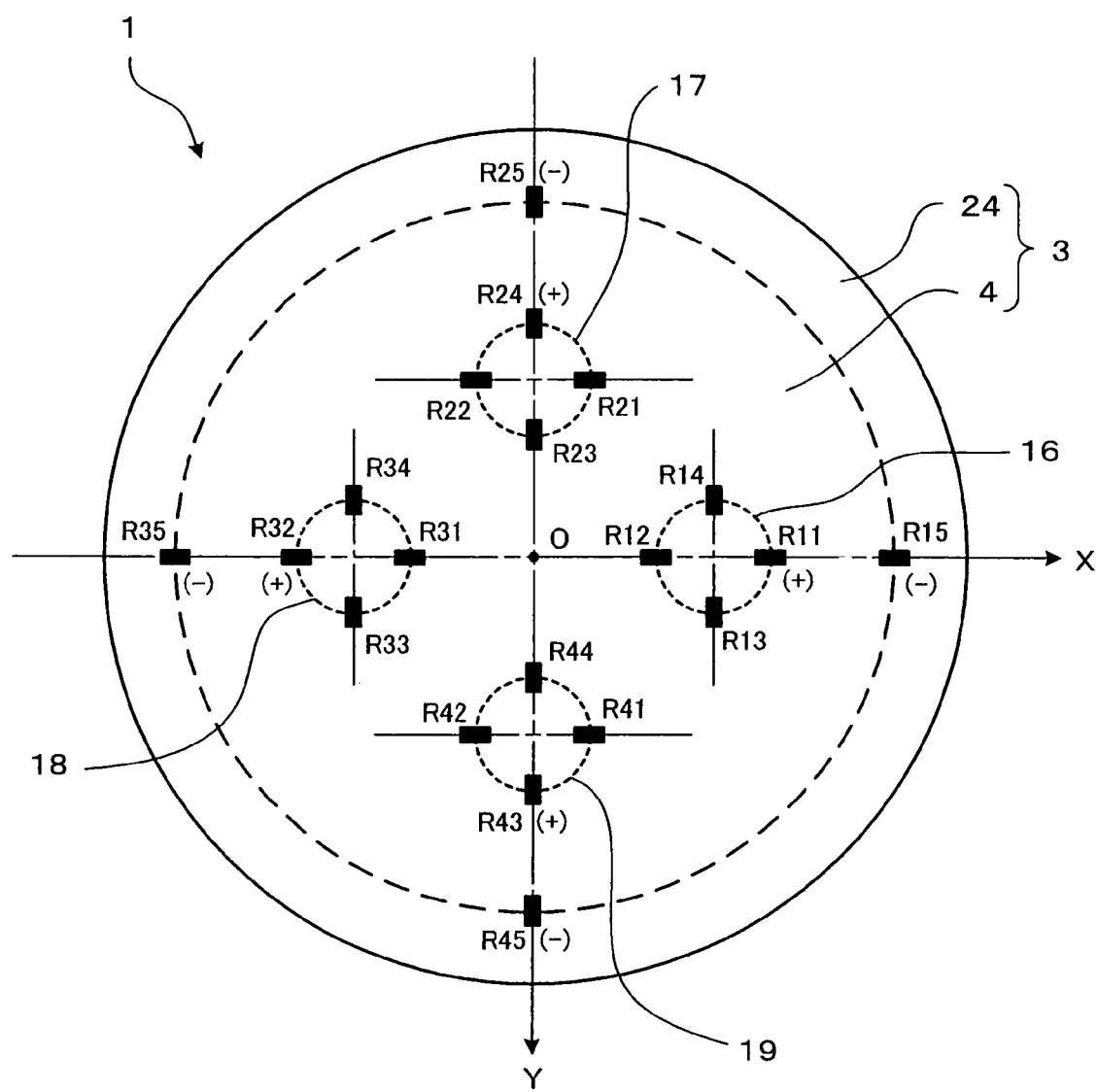
[FIG. 41]
A plan view showing changes in the resistance values of the strain gauges when the force Fz is applied to the multiaxial sensor.
Figure 42:
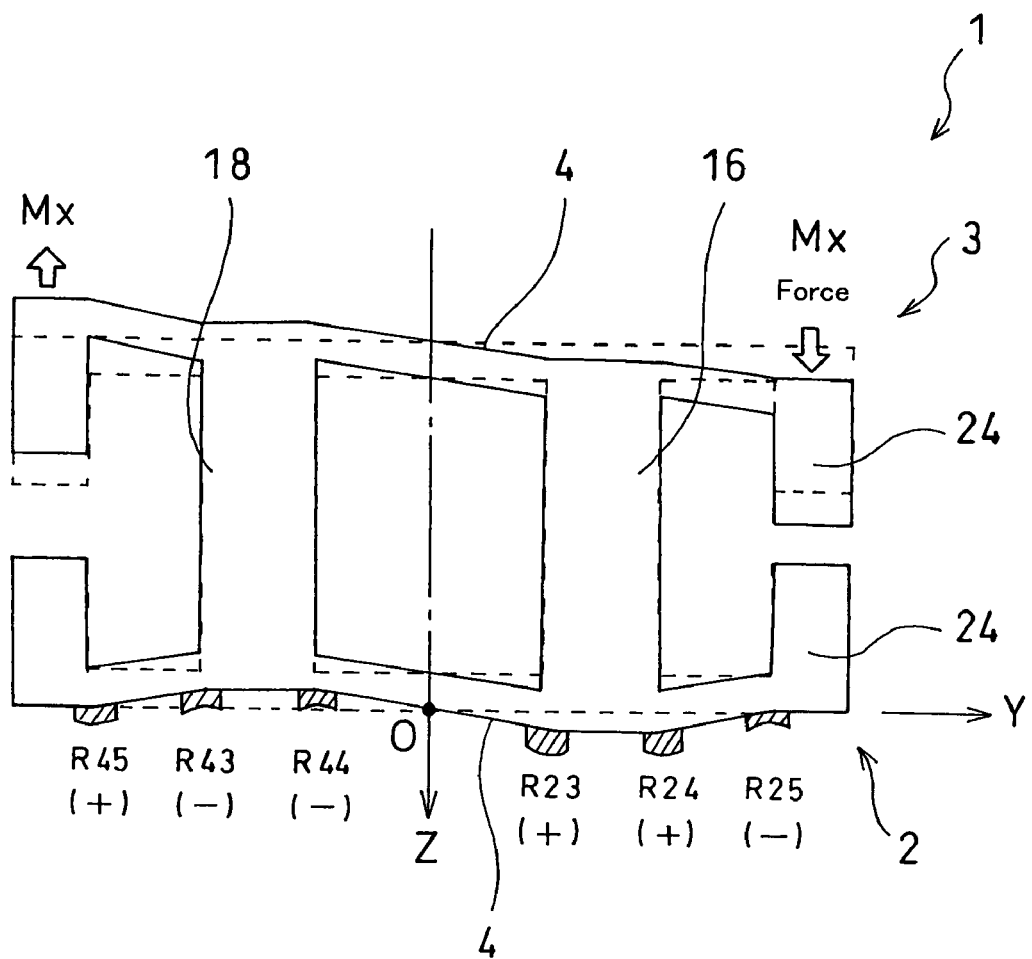
[FIG. 42]
A central vertical sectional front view showing displacement when a force Mx is applied to the multiaxial sensor.
Figure 43:
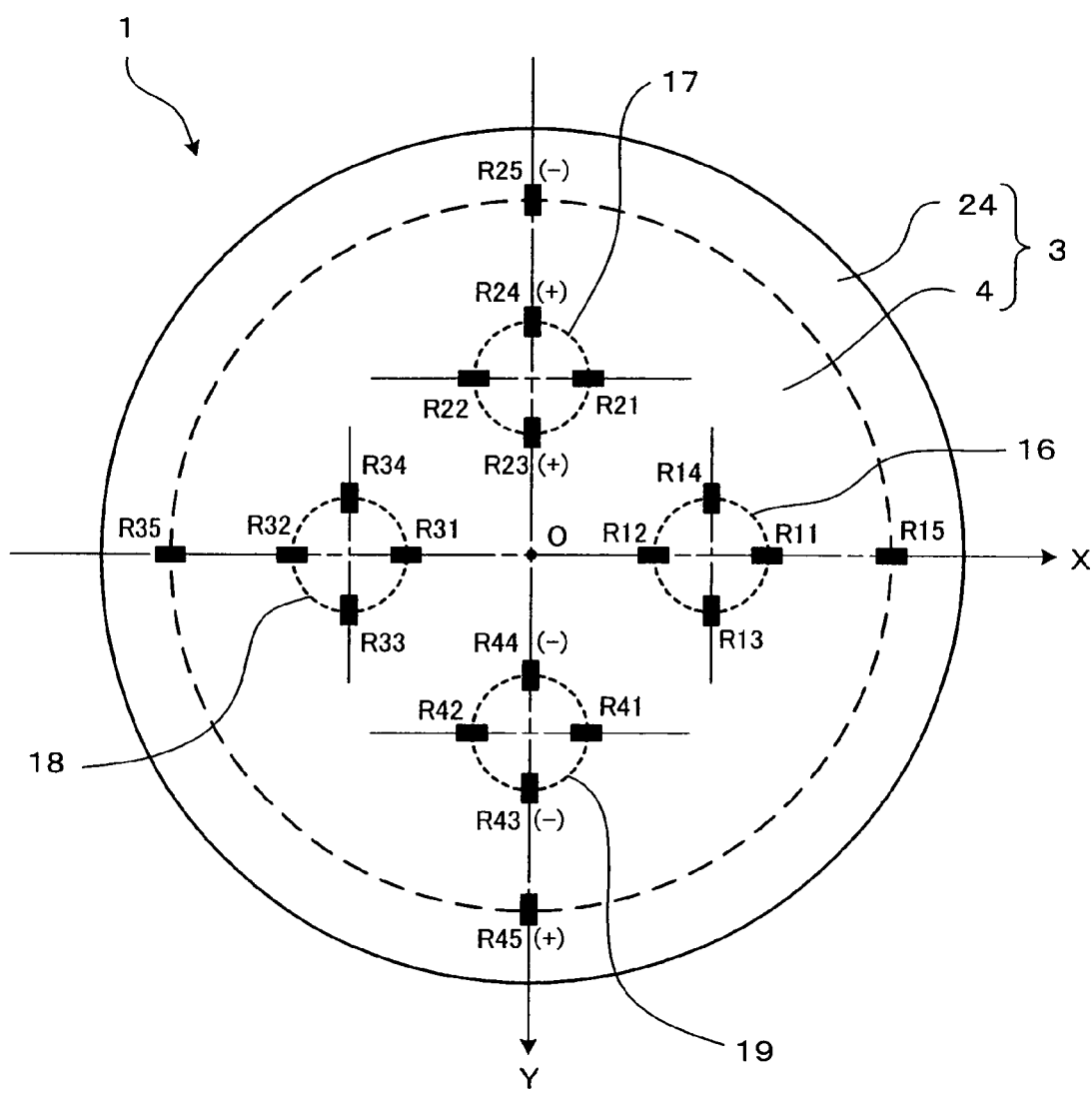
[FIG. 43]
A plan view showing changes in the resistance values of the strain gauges when the force Mx is applied to the multiaxial sensor.
Figure 44:
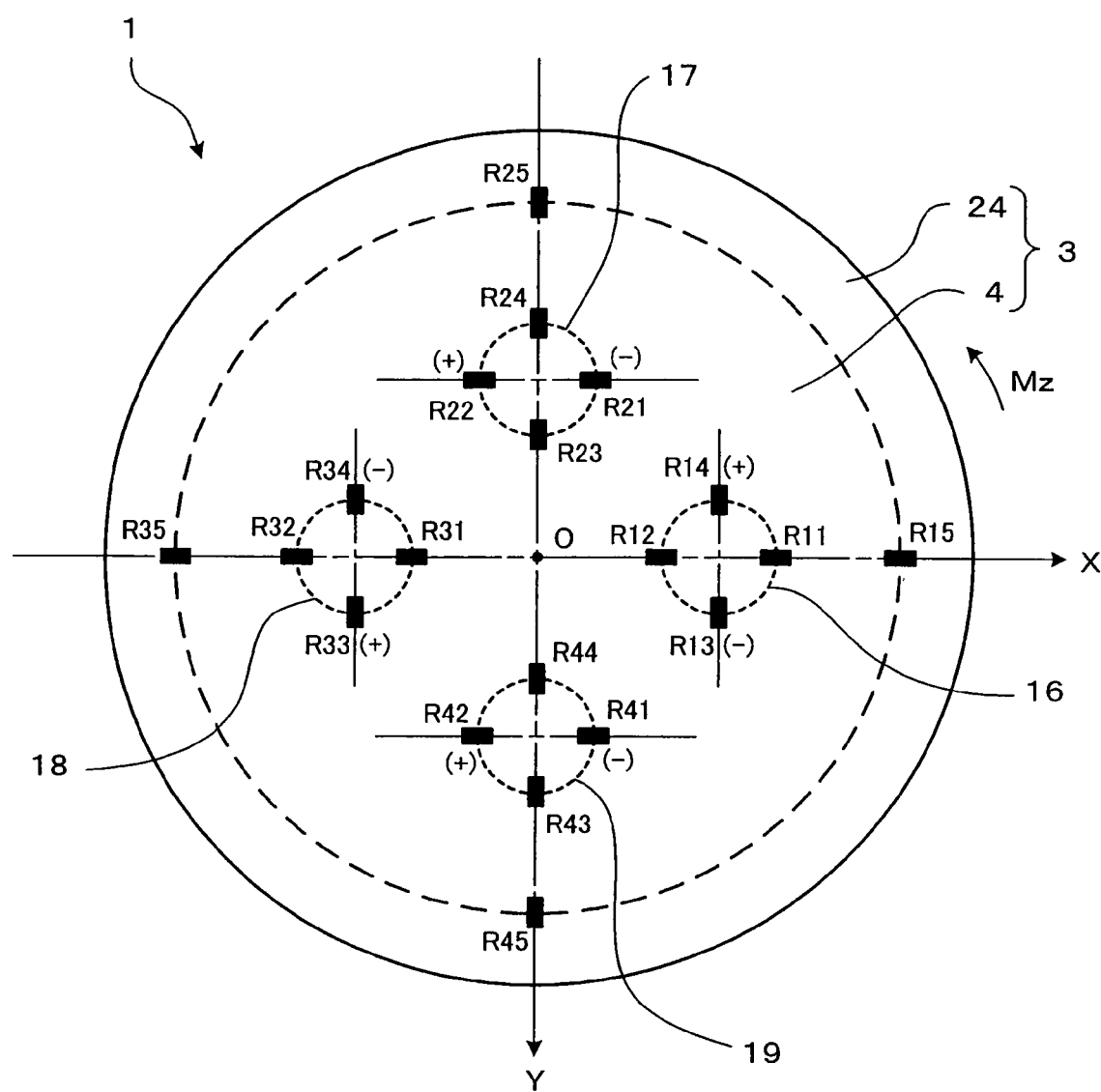
[FIG. 44]
A plan view showing changes in the resistance values of the strain gauges when a force Mz is applied to the multiaxial sensor.
Figure 45:
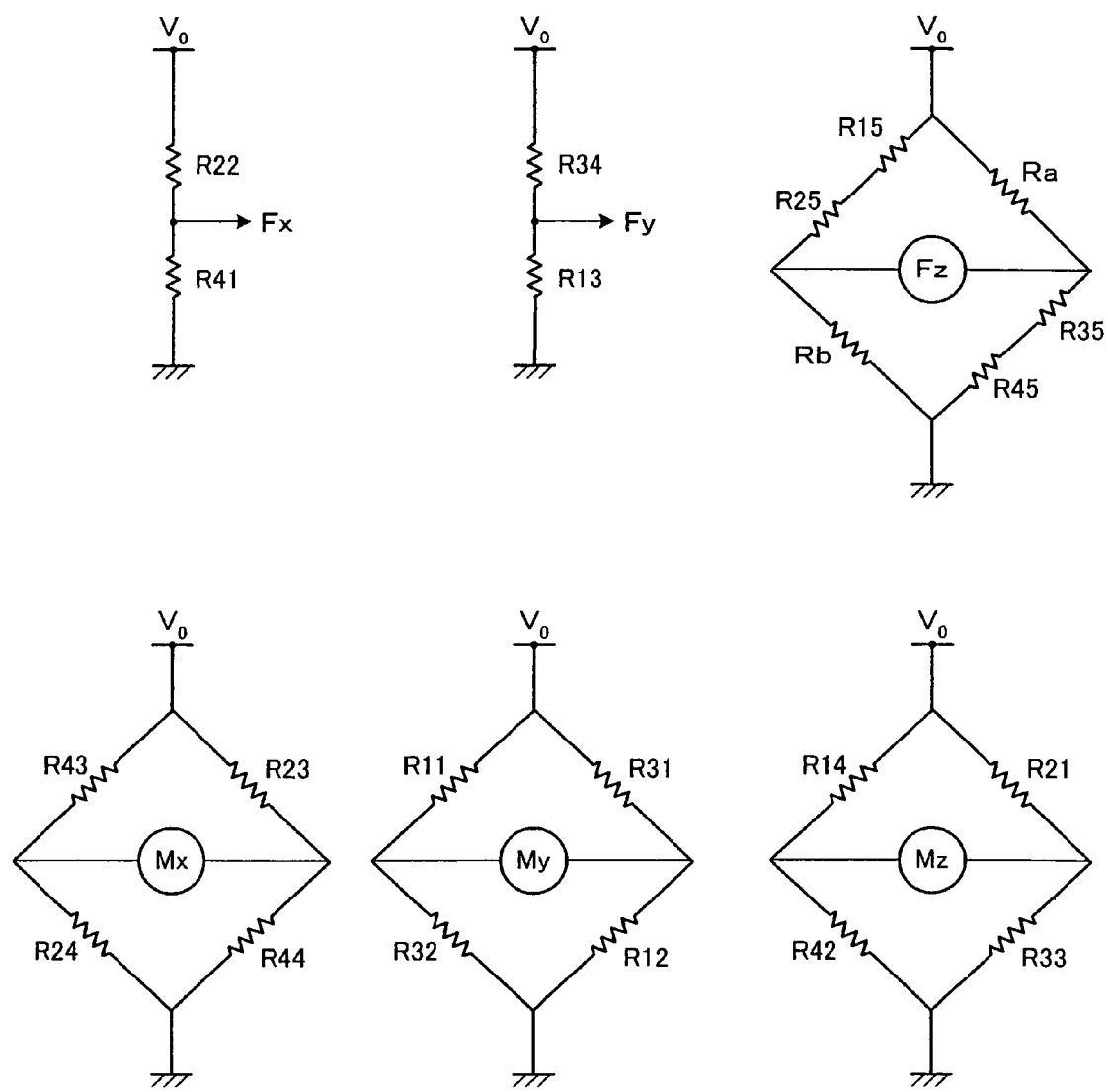
[FIG. 45]
Circuit diagrams showing examples of bridge circuits for the multiaxial sensor.
Figure 46:
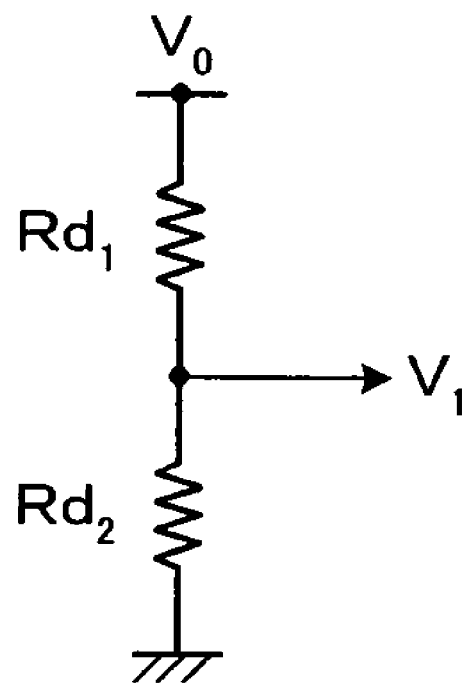
[FIG. 46]
A circuit diagram showing an example of a dummy circuit.
Figure 47:
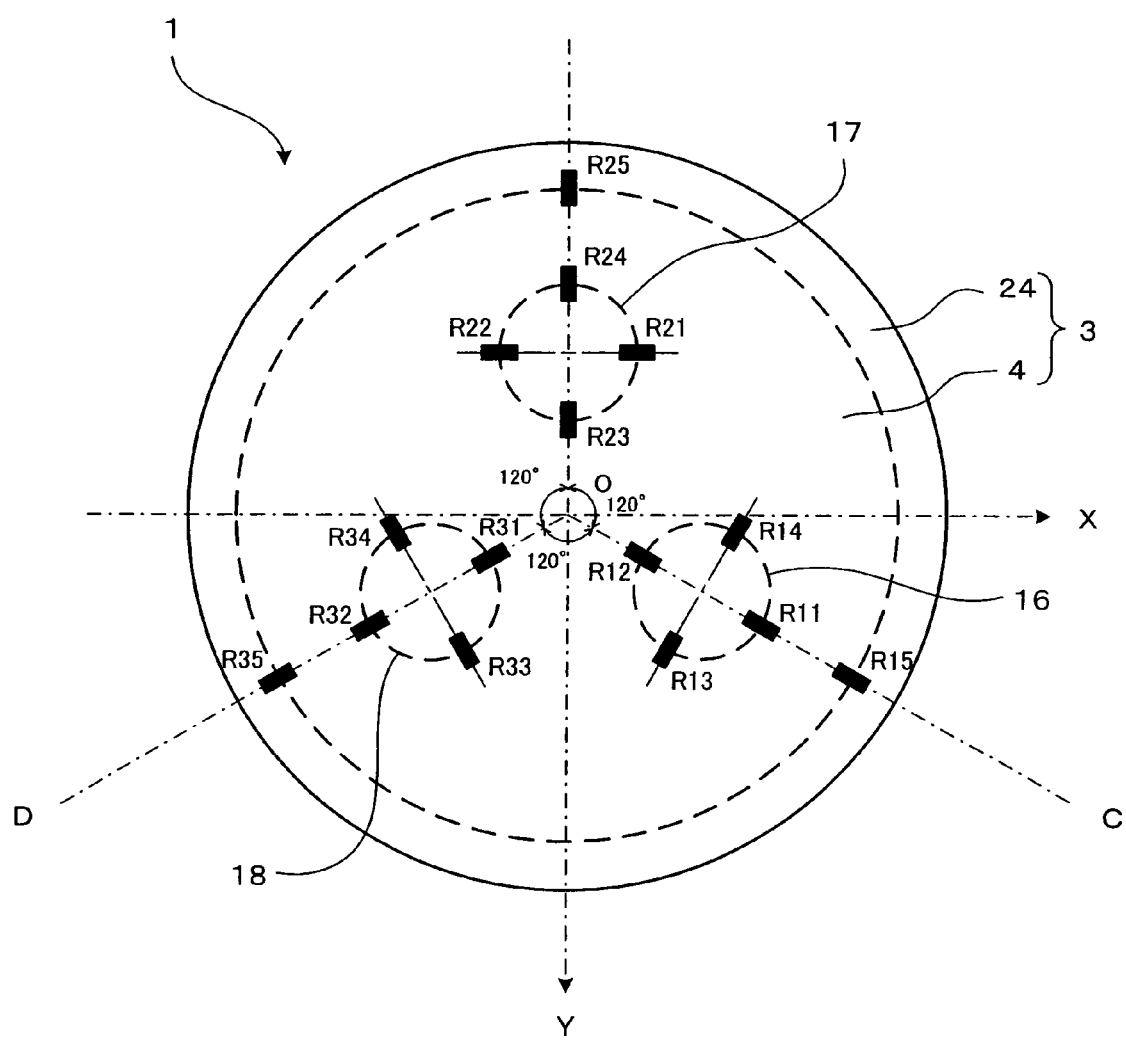
[FIG. 47]
A plan view showing the arrangement of strain gauges when a multiaxial sensor according to a tenth embodiment is Z-axially transparently viewed from the position of a second member.
Figure 48:
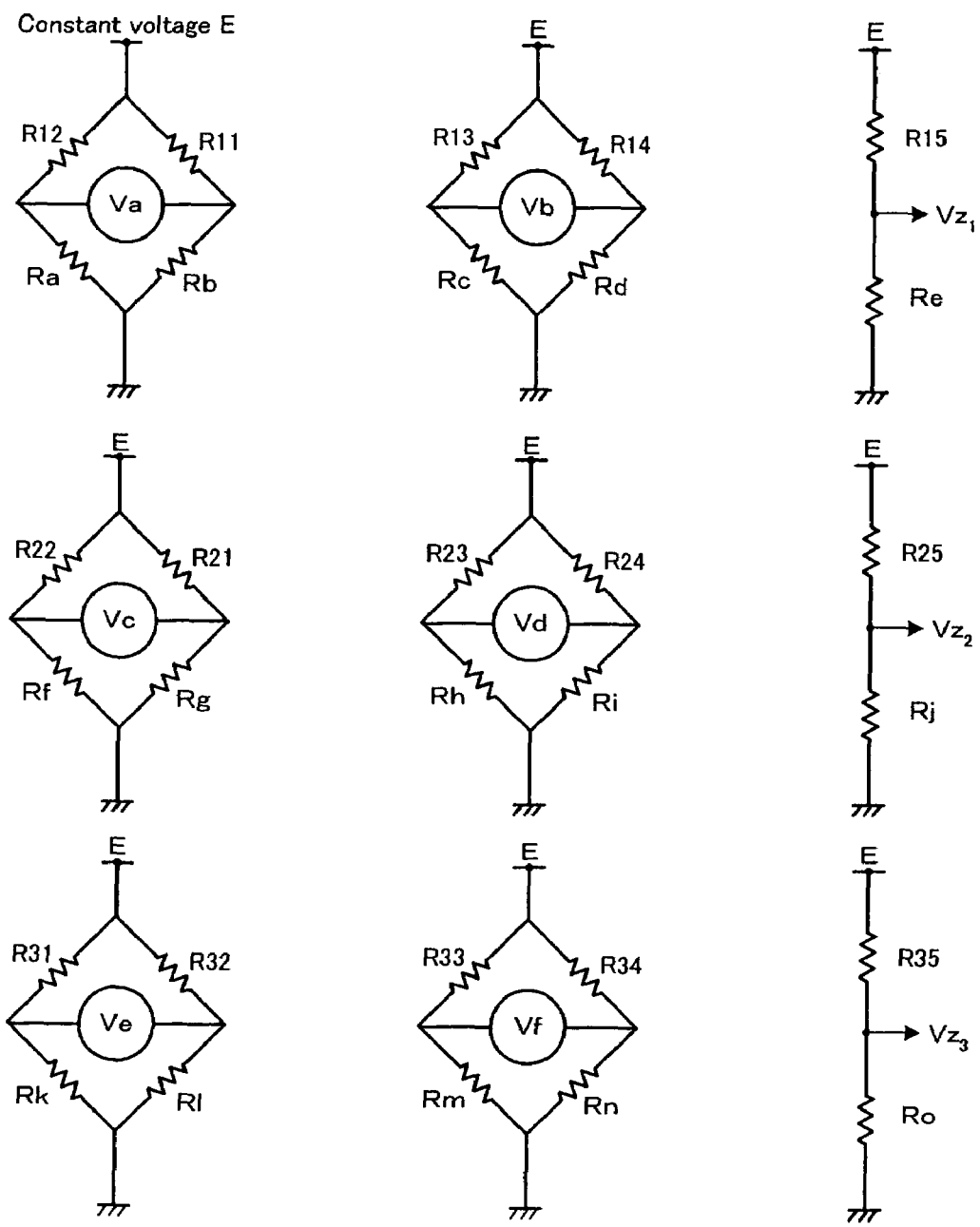
[FIG. 48]
Circuit diagrams showing examples of bridge circuits according to the tenth embodiment.
Figure 48:
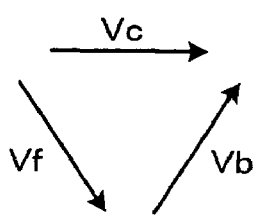
Figure 49:
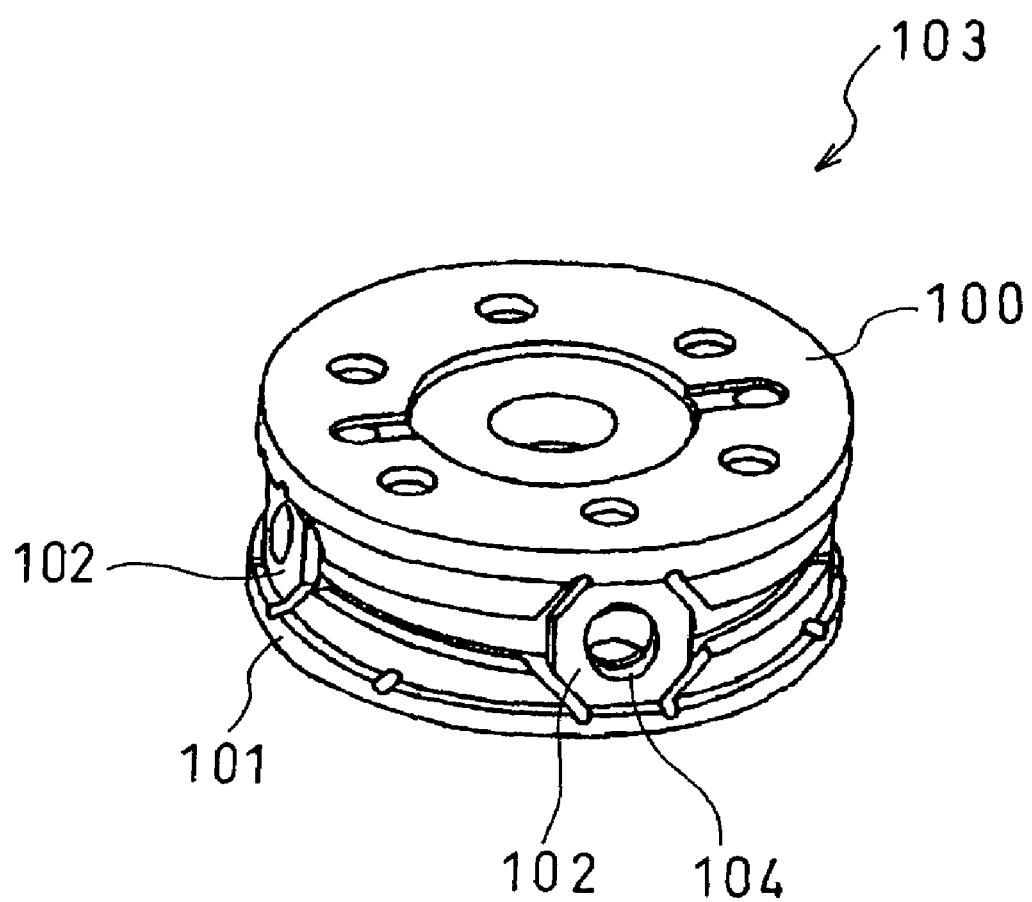
[FIG. 49]
A perspective view showing a prior art multiaxial sensor.

1: multiaxial sensor
2: first member
3: second member
4, 5, 6, 7: diaphragm
8: central shaft
10: piezoresistance element
16, 17, 18, 19: operative body
R11 to R48, R111 to R148: strain gauge

The invention claimed is:
1. A 6-axis sensor for measuring 6-axis forces and moments or 6-axis accelerations and angular accelerations, externally applied, characterized by comprising:
　　a plurality of strain gauges disposed on one plane;
　　a plurality of first diaphragms to which the plurality of strain gauges are attached;
　　a first member comprising one of the plurality of first diaphragms;
　　a second member comprising a second diaphragm opposed to the one of the plurality of first diaphragms and provided with a plurality of strain gauges disposed on one plane; and
　　a connecting shaft connecting the opposed first and second diaphragms;
　　wherein the plurality of first diaphragms are arranged around a central point of the plane at regular angular intervals and at the same distance from the central point;
　　6-axis forces and moments applied between the first and second members are measured;
　　the strain gauges of the first member and the strain gauges of the second member are disposed symmetrically with respect to a barycentric point of the 6-axis sensor; and either outputs of the strain gauges of the first member and the strain gauges of the second member are adopted if the other ouputs are out of a predetermined range.

2. The 6-axis sensor according to claim 1, characterized in that the angular interval in 90 degrees.

3. The 6-axis sensor according to claim 1, characterized in that the diaphragms are disposed in positive and negative direction on X and Y axes with an origin being defined at the central point.

4. The 6-axis sensor according to claim 1, characterized in that the angular interval is 120 degrees.

5. The 6-axis sensor according to claim 1, characterized in that a thin portion of each of the plurality of first diaphragms is annular and provided with eight strain gauges, and
the strain gauges are disposed at outer and inner edge portions of each of the plurality of first diaphragms on a line extending between a central point of each of the plurality of first diaphragms and the central point of the plane, and at outer and inner edge portions of each of the plurality of first diaphragms on a line perpendicular to the former line at the central point of each of the plurality of first diaphragms.

6. The 6-axis sensor according to claim 1, characterized in that the 6-axis sensor further comprises an operative body provided on a central portion of one or more of the plurality of first diaphragms, and
6-axis accelerations and angular accelerations applied to the 6-axis sensor are measured.

7. The 6-axis sensor according to claim 1, characterized in that each of the strain gauges is made of a piezoresistance element.

8. The 6-axis sensor according to claim 1, characterized in that each of the strain gauges is made of a thin film of chromium oxide formed on an insulating film.

9. A 6-axis sensor for measuring 6-axis forces and moments or 6-axis accelerations and angular accelerations, externally applied, the 6-axis sensor comprising:
a plurality of strain gauges disposed on one plane;
a plurality of first diaphragms to which the plurality of strain gauges are attached;
wherein only one of the plurality of first diaphragms is disposed on the plane;
a first member comprising one of the plurality of first diaphragms;
a second member comprising a second diaphragm provided with a plurality of strain gauges disposed on one plane; and
operative bodies connecting the first and second diaphragms,
wherein the first and second members are disposed so that a central point of the first diaphragm of the first member is opposed to a central point of the second diaphragm of the second member,
wherein the operative bodies connects the first and second diaphragms at positions arranged around the central points of the first and second diaphragms at regular angular intervals and at the same distance from the central points, and 6-axis forces and moments applied between the first and second members are measured,
wherein the strain gauges of the first member and the strain gauges of the second member are disposed symmetrically with respect to a barycentric point of the 6-axis sensor, and
wherein either outputs of the strain gauges of the first member and the strain gauges of the second member are adopted if the other outputs are out of a predetermined range.

10. The 6-axis sensor according to claim 9, characterized in that the angular interval is 90 degrees.

11. The 6-axis sensor according to claim 9, characterized in tat the operative bodies are disposed in positive and negative directions on X and Y axes with an origin being defined at the central point of the first diaphragm.

12. The 6-axis sensor according to claim 9, characterized in that the angular interval is 120 degrees.

13. The 6-axis sensor according to claim 9, characterized in that the strain gauges are disposed:
at edge portions of the operative bodies on a line extending between a central point of a portion on the plane corresponding to the operative bodies, and the central point of the first diaphragm;
at edge portions of the operative bodies on a line perpendicular to the former line at the central point of the portion on the plane corresponding to the operative bodies; and
at either of edge portions of the operative bodies and edge portions of the first diaphragm, at positions arranged around the central point of the first diaphragm at regular angular intervals and at the same distance from the central point.

14. The 6-axis sensor according to claim 9, characterized in that each of the strain gauges is made of a piezoresistance element.

15. The 6-axis sensor according to claim 9, characterized in that each of the strain gauges is made of a thin film of chromium oxide formed on an insulating film.

* * * * *

UNITED STATES PATENT AND TRADEMARK OFFICE
CERTIFICATE OF CORRECTION

| | | |
|---|---|---|
| PATENT NO. | : 7,360,456 B2 | Page 1 of 1 |
| APPLICATION NO. | : 10/560995 | |
| DATED | : April 22, 2008 | |
| INVENTOR(S) | : Hideo Morimoto | |

It is certified that error appears in the above-identified patent and that said Letters Patent is hereby corrected as shown below:

In the Claims:

In Claim 2, column 27, line 5, "in" should be --is--.
In Claim 11, column 28, line 22, "tat" should be --that--.

Signed and Sealed this

Twelfth Day of August, 2008

JON W. DUDAS
*Director of the United States Patent and Trademark Office*